US006289391B1

(12) United States Patent
Smith et al.

(10) Patent No.: US 6,289,391 B1
(45) Date of Patent: Sep. 11, 2001

(54) SYSTEM AND METHOD FOR PERFORMING EXTERNAL PROCEDURE CALLS FROM A SERVER PROGRAM TO A CLIENT PROGRAM WHILE BOTH ARE RUNNING IN A HETEROGENEOUS COMPUTER

(75) Inventors: Norman Roy Smith, Lake Forest; J. Calvin Hale, Rancho Santa Margarita; Mark Joseph Rentmeesters, Irvine, all of CA (US); Andrew D. Milligan, Bucks (GB)

(73) Assignee: Unisys Corp., Blue Bell, PA (US)

( * ) Notice: Subject to any disclaimer, the term of this patent is extended or adjusted under 35 U.S.C. 154(b) by 0 days.

(21) Appl. No.: 08/882,640

(22) Filed: Jun. 25, 1997

(51) Int. Cl.[7] ............................. G06F 9/46; G06F 15/167
(52) U.S. Cl. .......................................................... 709/312
(58) Field of Search ..................... 395/200.33; 364/200; 709/312, 319, 330

(56) References Cited

U.S. PATENT DOCUMENTS

| 4,297,743 | * | 10/1981 | Appell et al. | 364/200 |
|---|---|---|---|---|
| 4,590,551 | * | 5/1986 | Mathews | 711/150 |
| 4,722,048 | * | 1/1988 | Hirsch et al. | 364/200 |
| 4,823,257 | * | 4/1989 | Tonomura | 364/200 |
| 4,862,354 | * | 8/1989 | Fiacconi et al. | 364/200 |
| 4,882,674 | * | 11/1989 | Quint et al. | 364/200 |
| 5,027,271 | * | 6/1991 | Curley et al. | 364/200 |
| 5,222,215 | | 6/1993 | Chou et al. | 395/275 |
| 5,230,065 | * | 7/1993 | Curley et al. | 395/200 |
| 5,329,619 | | 7/1994 | Page et al. | 395/200 |
| 5,339,422 | | 8/1994 | Brender | 395/700 |
| 5,357,612 | * | 10/1994 | Alaiwan | 395/200 |
| 5,442,791 | * | 8/1995 | Wrabetz et al. | 395/650 |
| 5,619,685 | * | 4/1997 | Schiavone | 395/500 |
| 5,659,701 | * | 8/1997 | Amit et al. | 395/684 |
| 5,793,965 | * | 8/1998 | Vanderbilt et al. | 395/200.32 |

OTHER PUBLICATIONS

Aho "Compilers Principles, Techniques, and Tools" Bell Telephone Laboratories, Incorporated, p. 402–427, and 522–529, Mar. 1988.*

Aschmann, Hans–Reudi, et al. "Alphorn: A Remote Procedure Call Environment for Fault–Tolerant, Heterogenous, Distributed Systems", 1991.*

"Remote Procedure Calls", IBM TDB, p. 237–238, Jun. 1992.*

"Stimulating Shared Buffer Communication in a Distributed Processing Environment", IBM TDB, pp. 340–350, Apr. 1992.*

"Data Type Transformation in Heterogeneous Shared Memory Multiprocessing", p. 164–170 of the Journal of Paralled and Distributed Computing, 12, by Stravell et al Mar. 1988.*

Oracle. "Oracle8 Enterprise Edition Getting Started for Windows NT" and "PL/SQL User's Guide and Reference" Chapter 10 External Procedures, Jun. 1997.*

Benjamin. "Taking the fourth", Apr. 1988.*

* cited by examiner

Primary Examiner—Alvin E. Oberley
Assistant Examiner—Lewis A. Bullock, Jr.
(74) Attorney, Agent, or Firm—Alfred W. Kozak; Mark T. Starr; Rocco L. Adornato

(57) ABSTRACT

In a heterogeneous computer system including at least one Client CPU, at least one Server CPU and a common memory disposed therebetween for storing first and second operating systems that control operation of the Client and Server CPUs, respectively. There is provided Client and Server Programs, both of which are stored in the same common memory. The Client Program is executed by the Client CPU and the Server Program is executed by the Server CPU. A method and system is disclosed wherein the Server Program is adapted for making function calls to the Client Program and the Client Program is adapted for returning results of the called function to the Server Program. The Server Program includes Procedures for invoking a Client Program function, converting parameters and result data from a format compatible with the first operating system to one compatible with the second operating system.

25 Claims, 86 Drawing Sheets

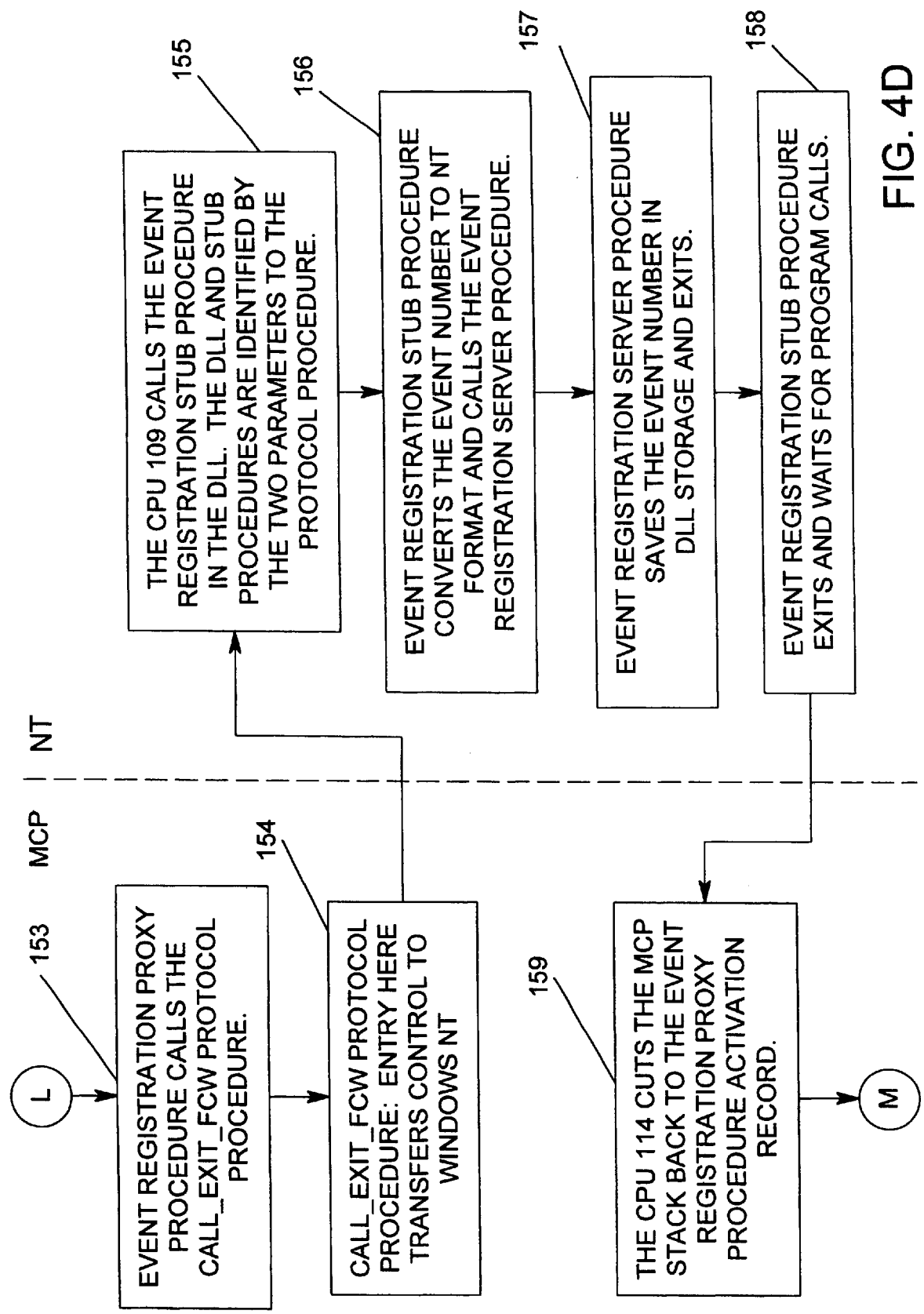

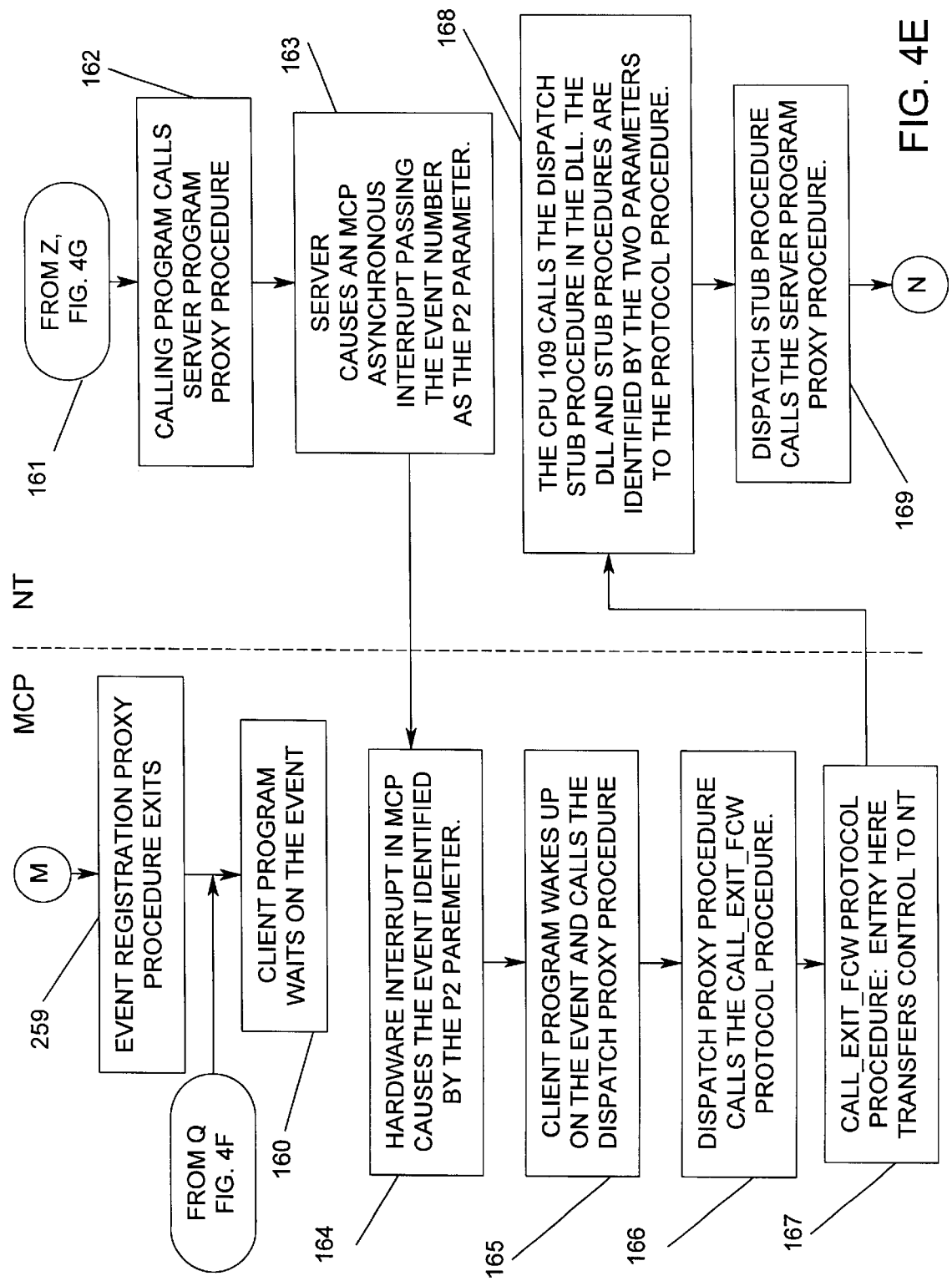

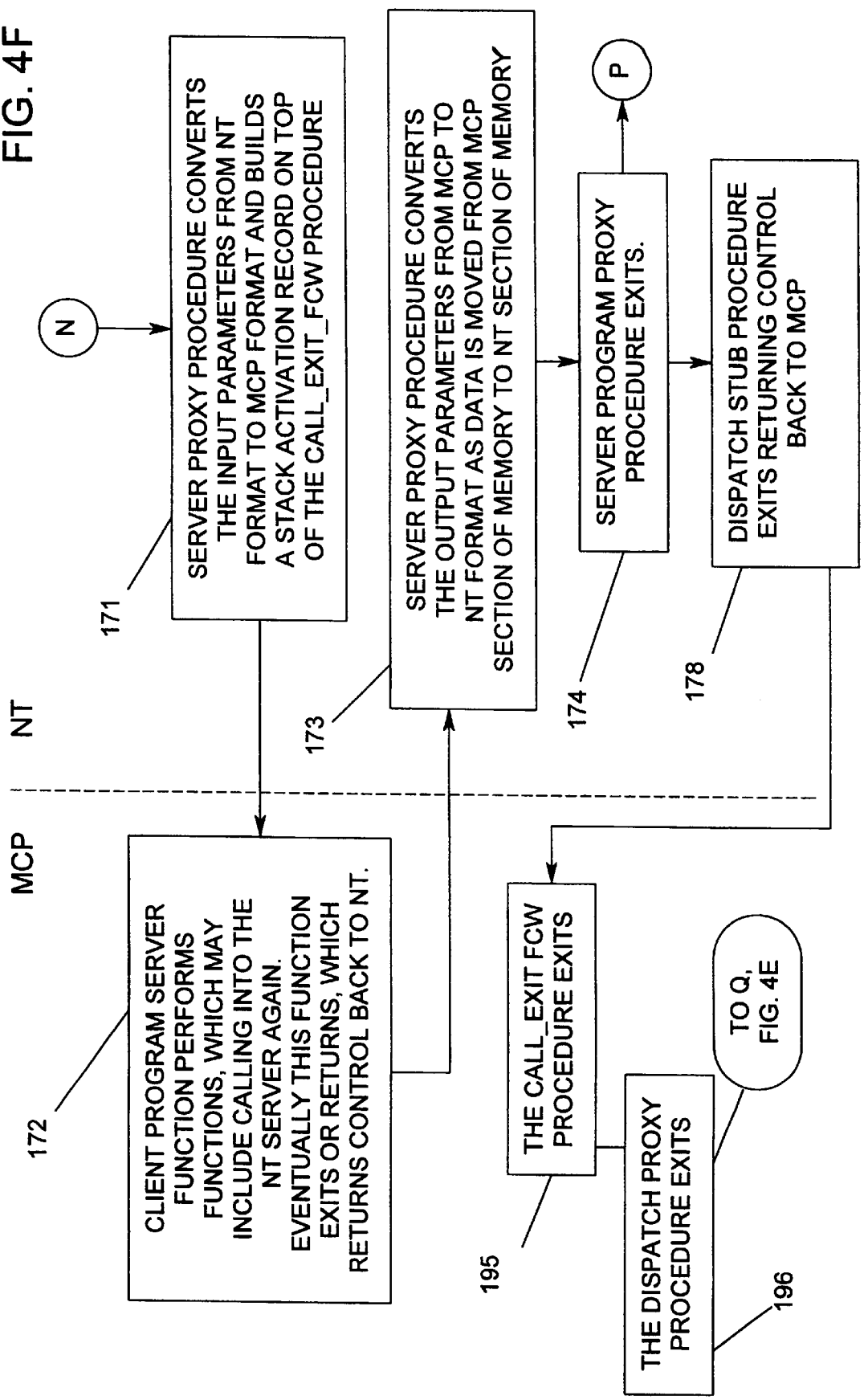

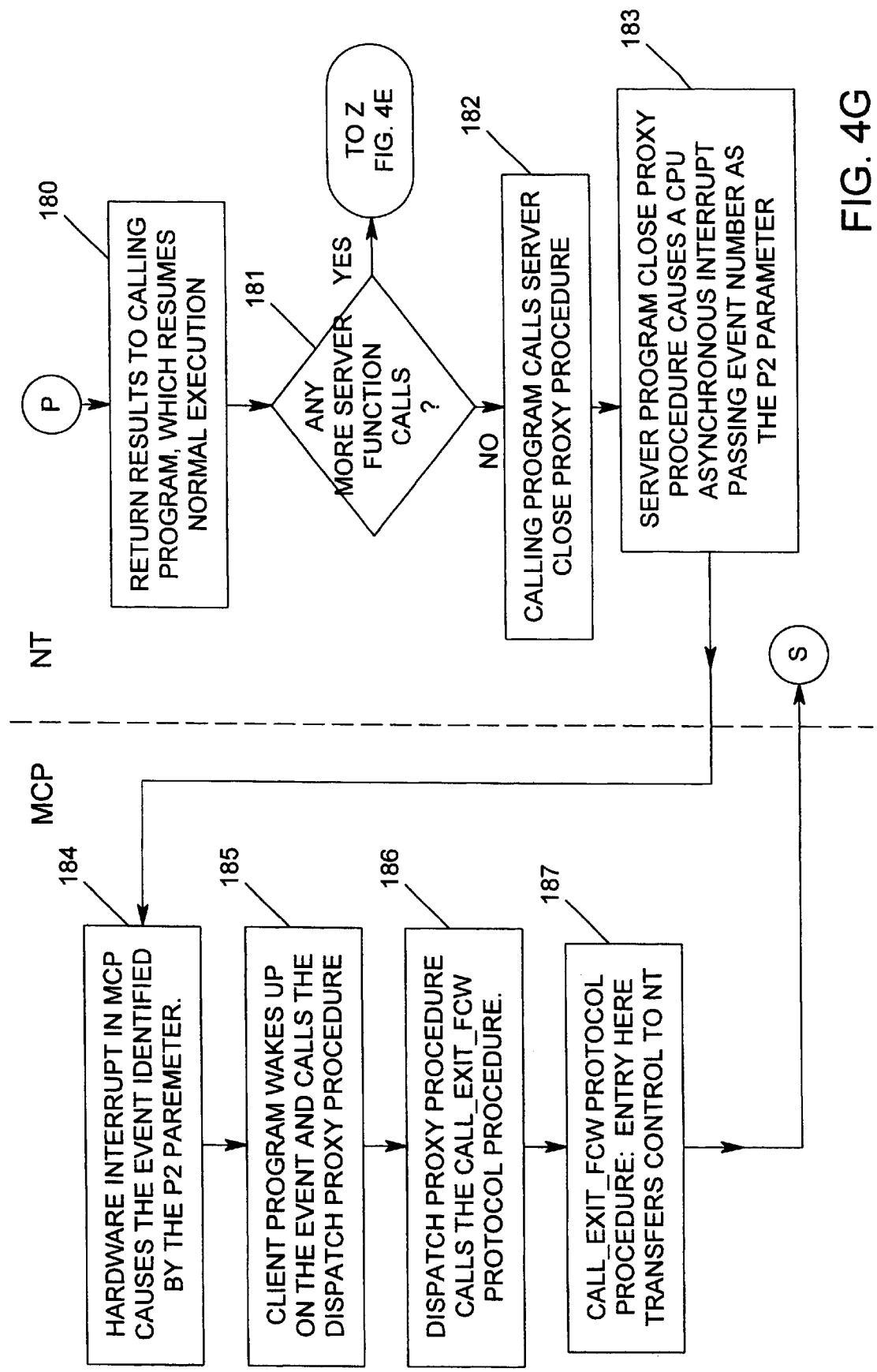

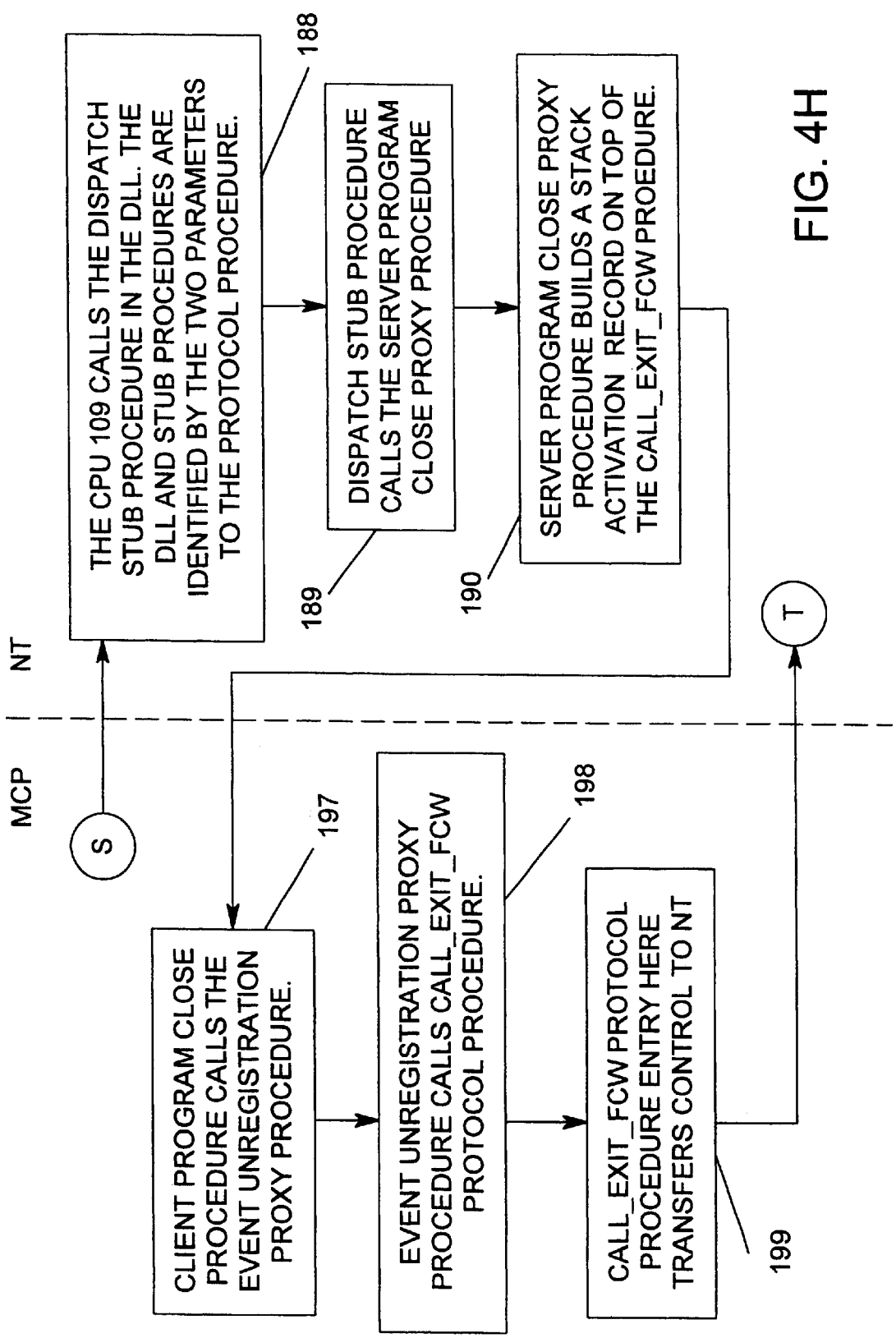

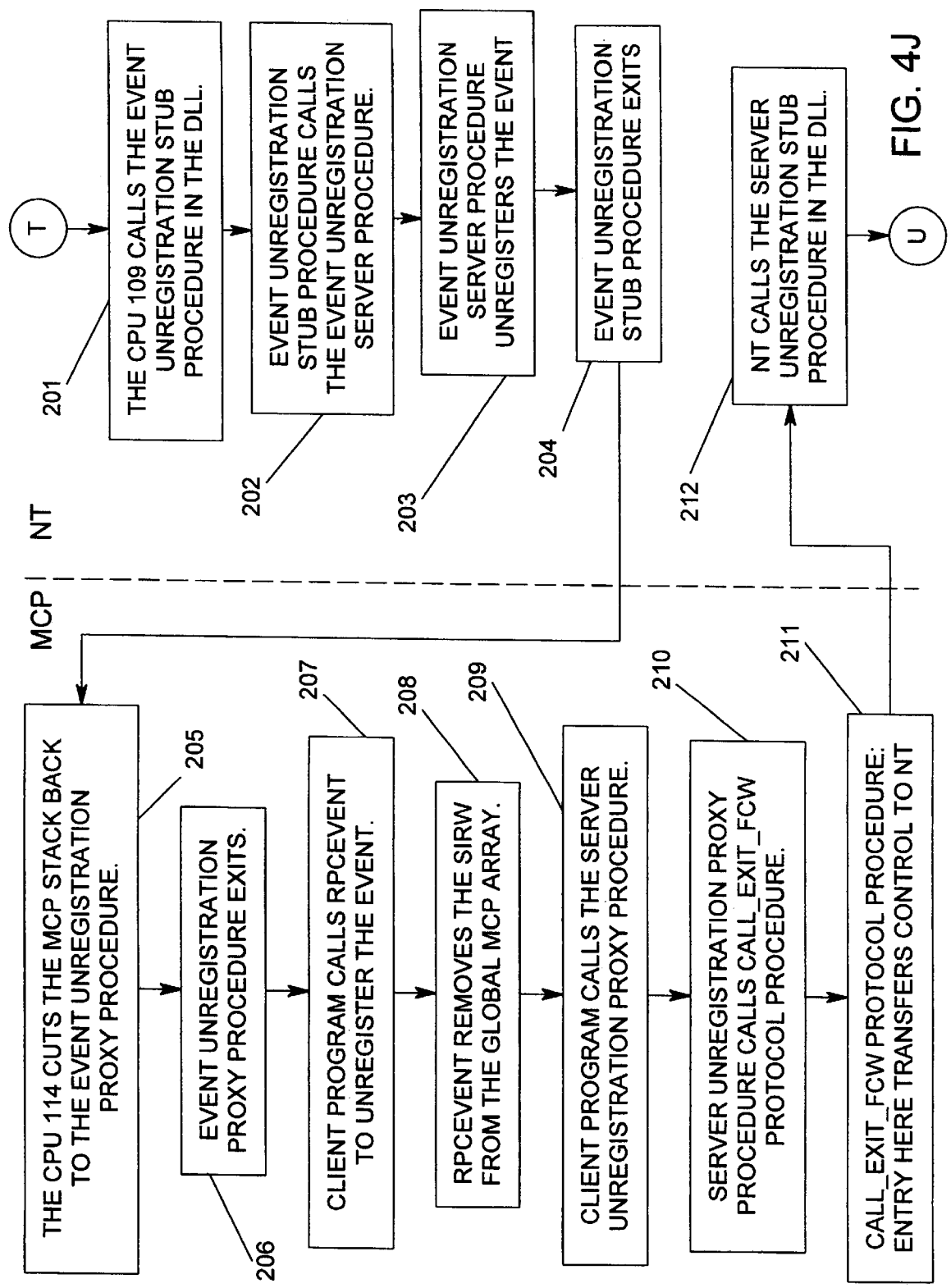

Copyright 1997 by Unisys Corporation

Copyright 1997 by Unisys Corporation

Copyright 1997 by Unisys Corporation

Copyright 1997 by Unisys Corporation

Copyright 1997 by Unisys Corporation

Copyright 1997 by Unisys Corporation

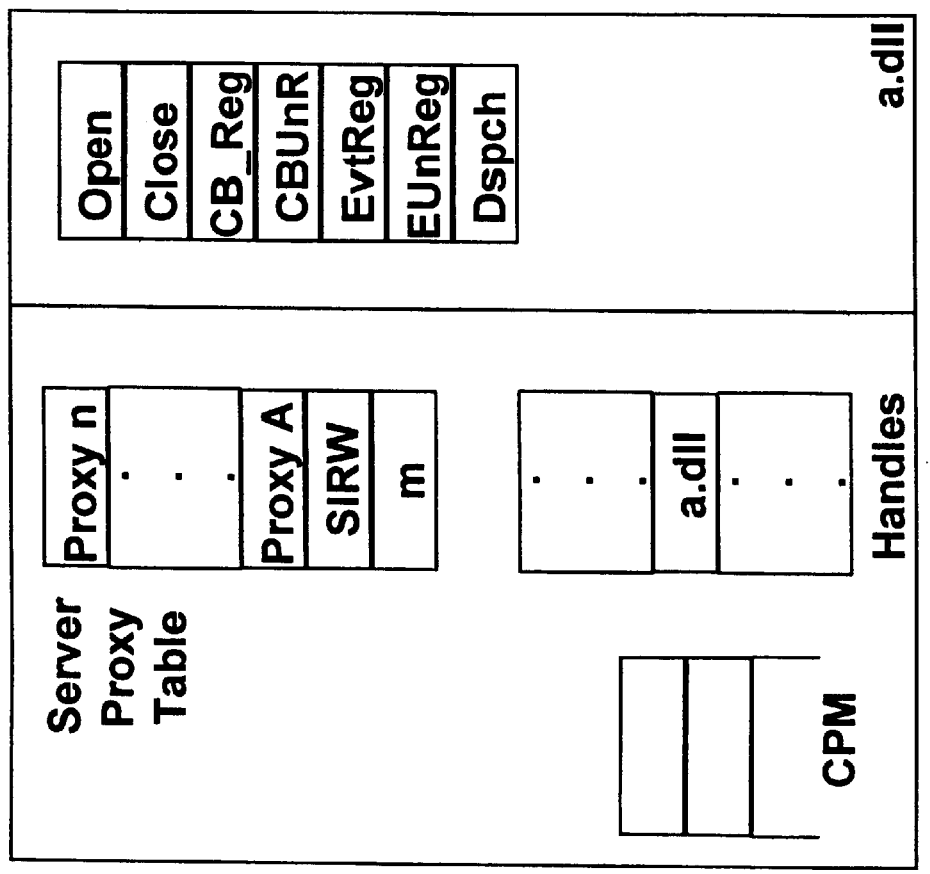
FIG. 5N
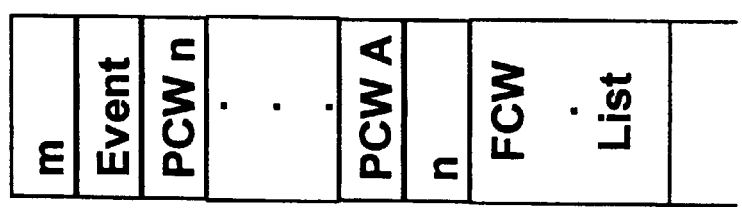

Copyright 1997 by Unisys Corporation

Copyright 1997 by Unisys Corporation

Copyright 1997 by Unisys Corporation

Copyright 1997 by Unisys Corporation

Copyright 1997 by Unisys Corporation

Copyright 1997 by Unisys Corporation

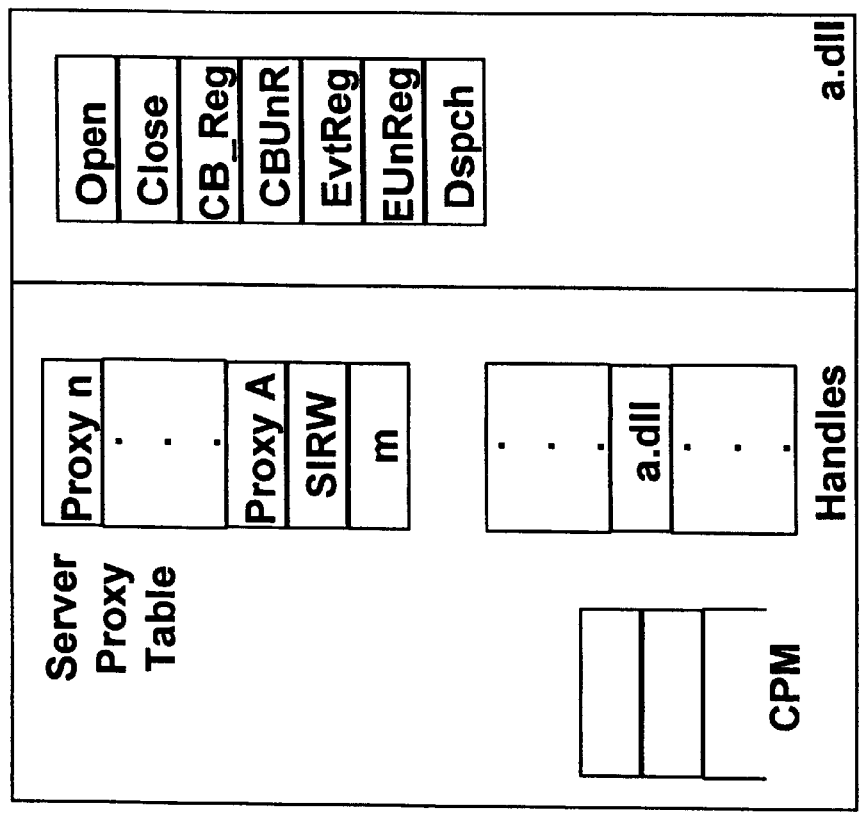
FIG. 5AG
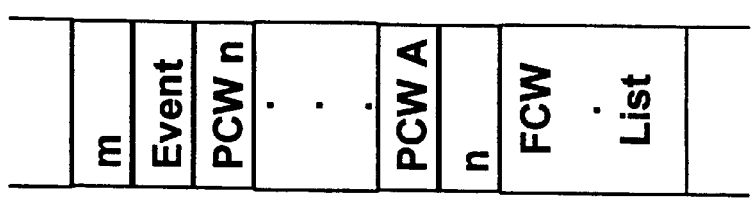

Copyright 1997 by Unisys Corporation

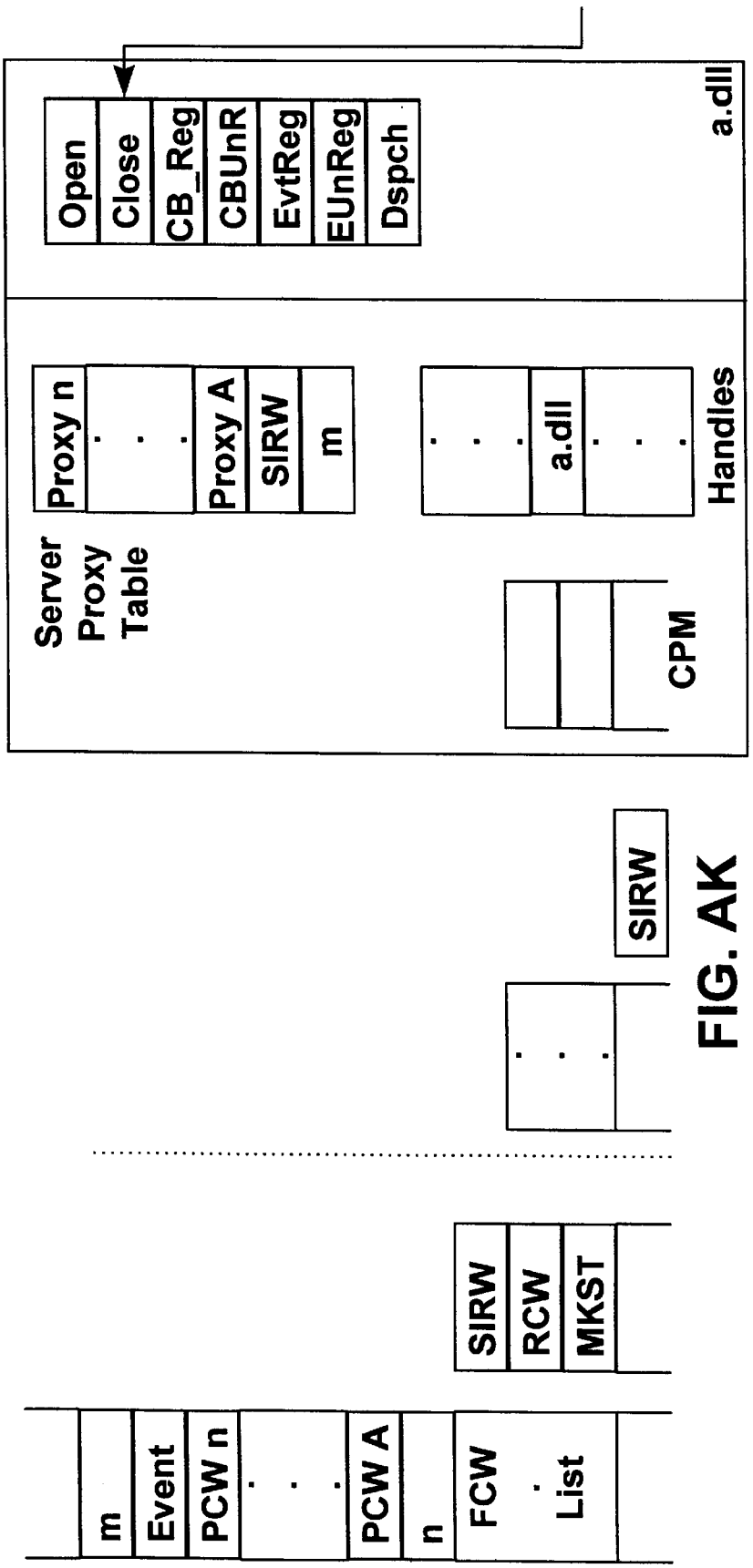
FIG. AK

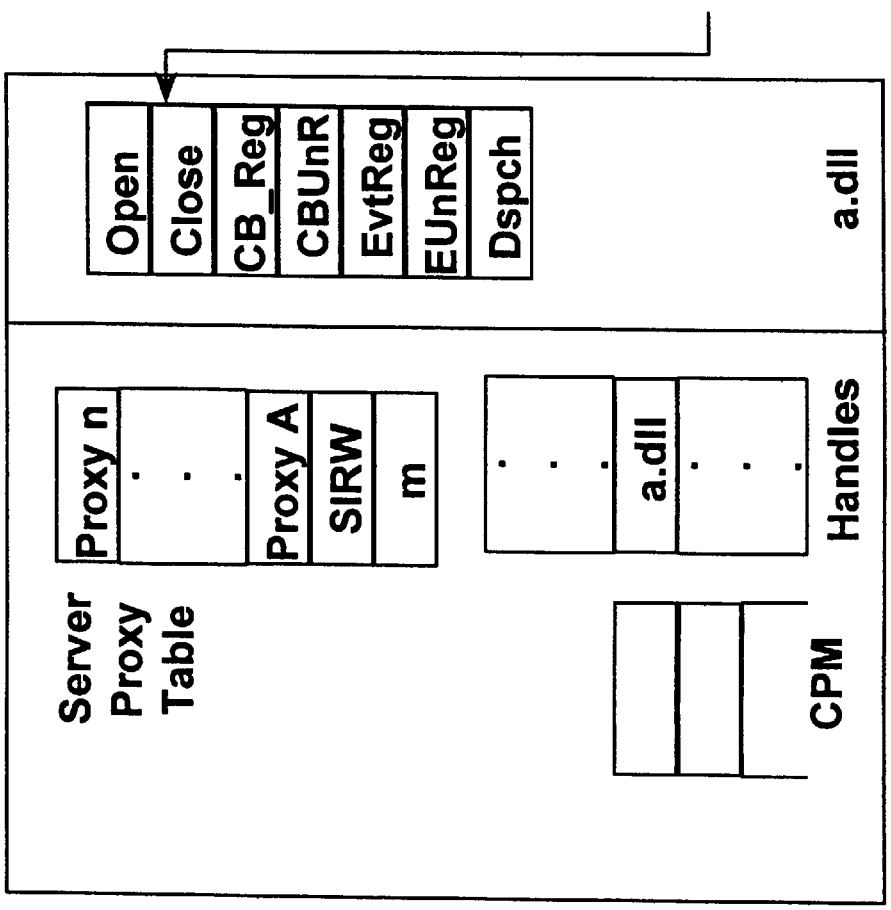
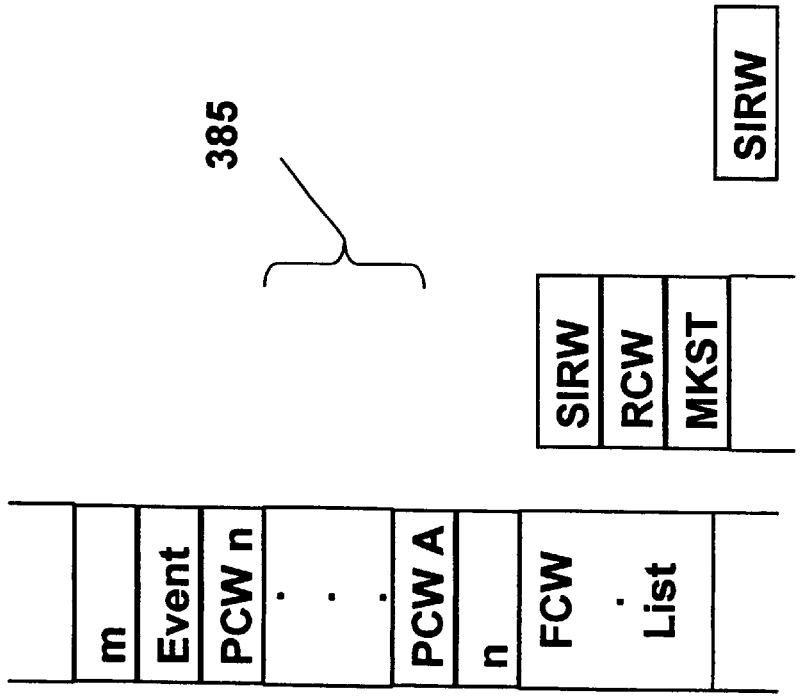
FIG. AL

Copyright 1997 by Unisys Corporation

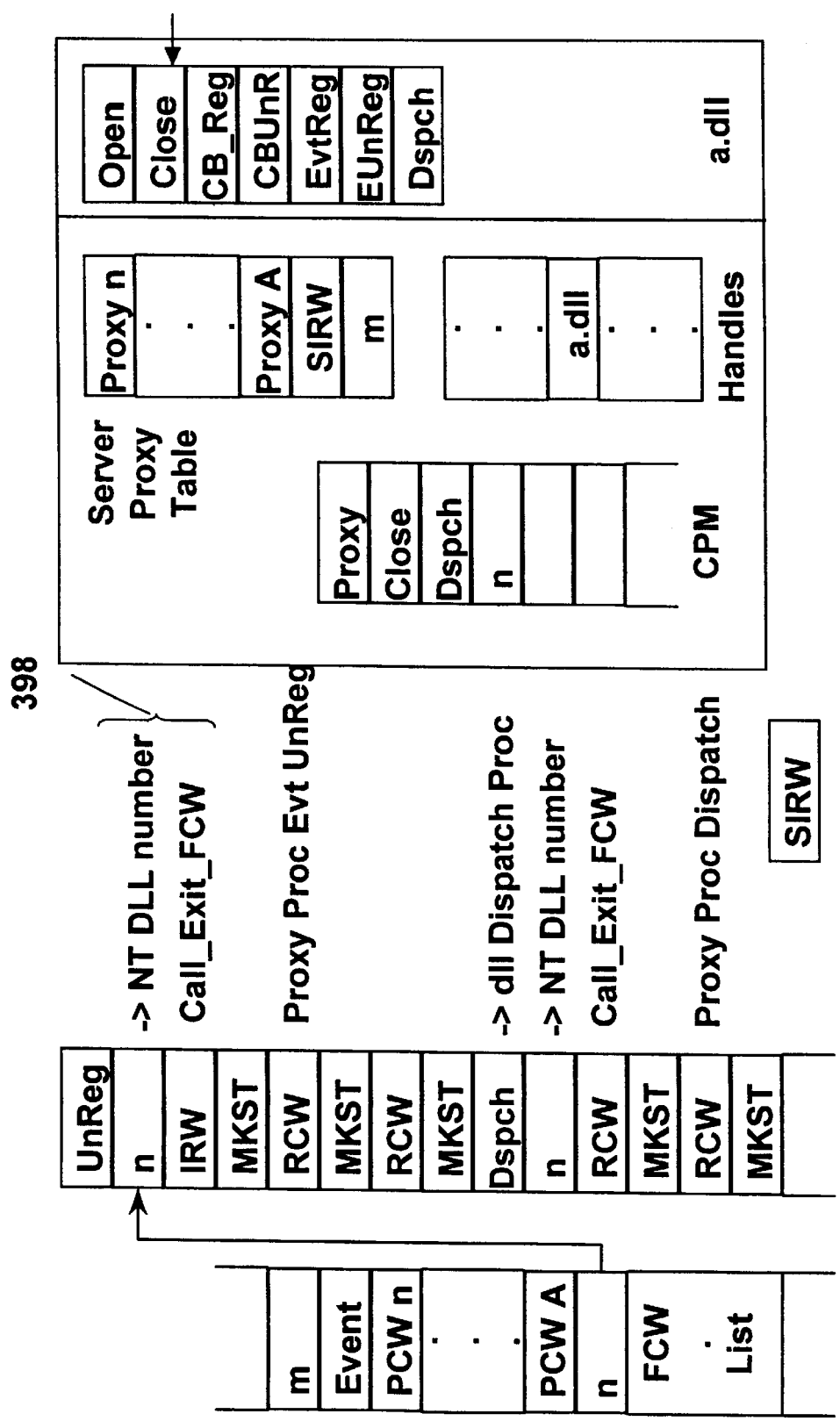
FIG. AV

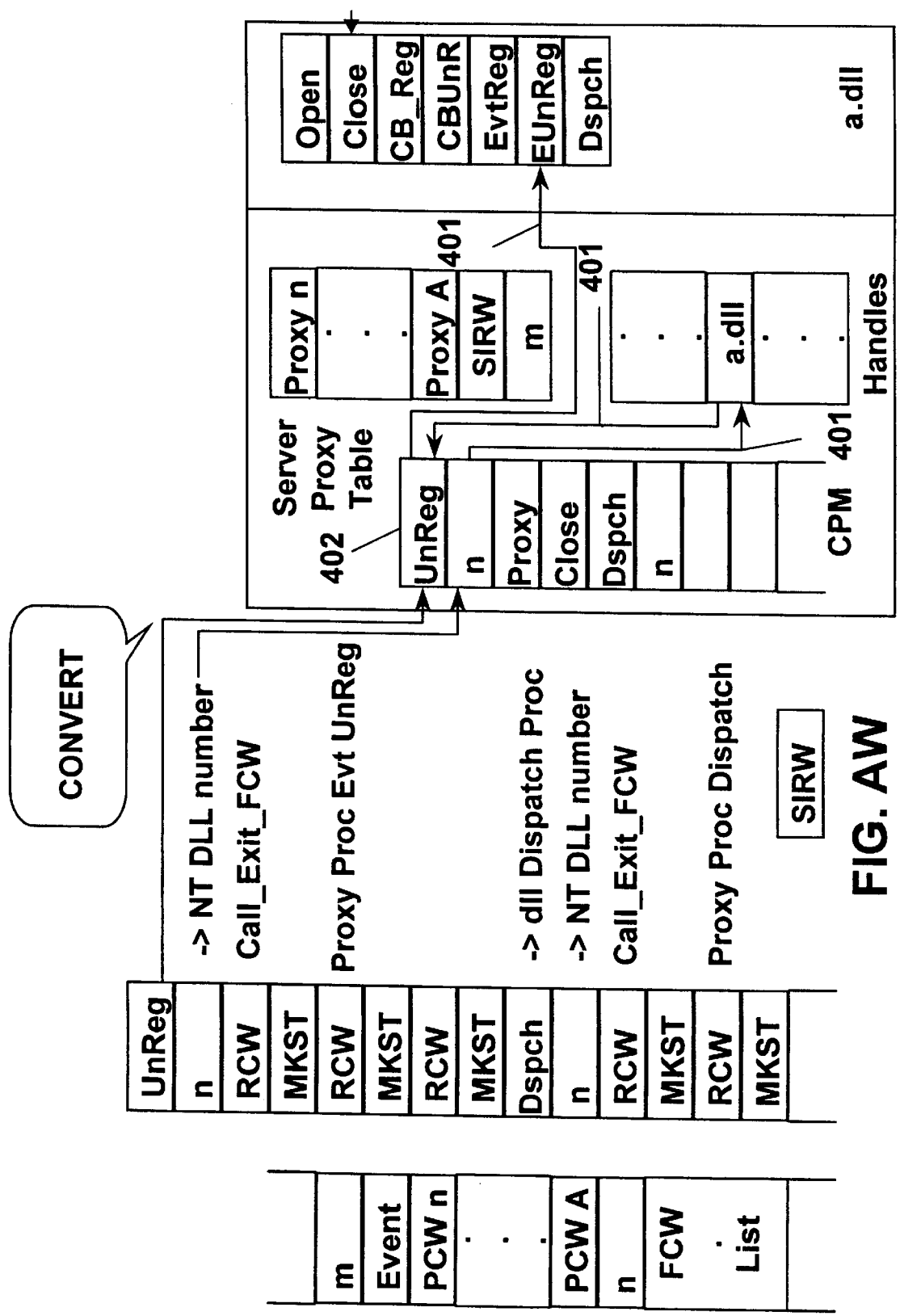
FIG. AW

Copyright 1997 by Unisys Corporation

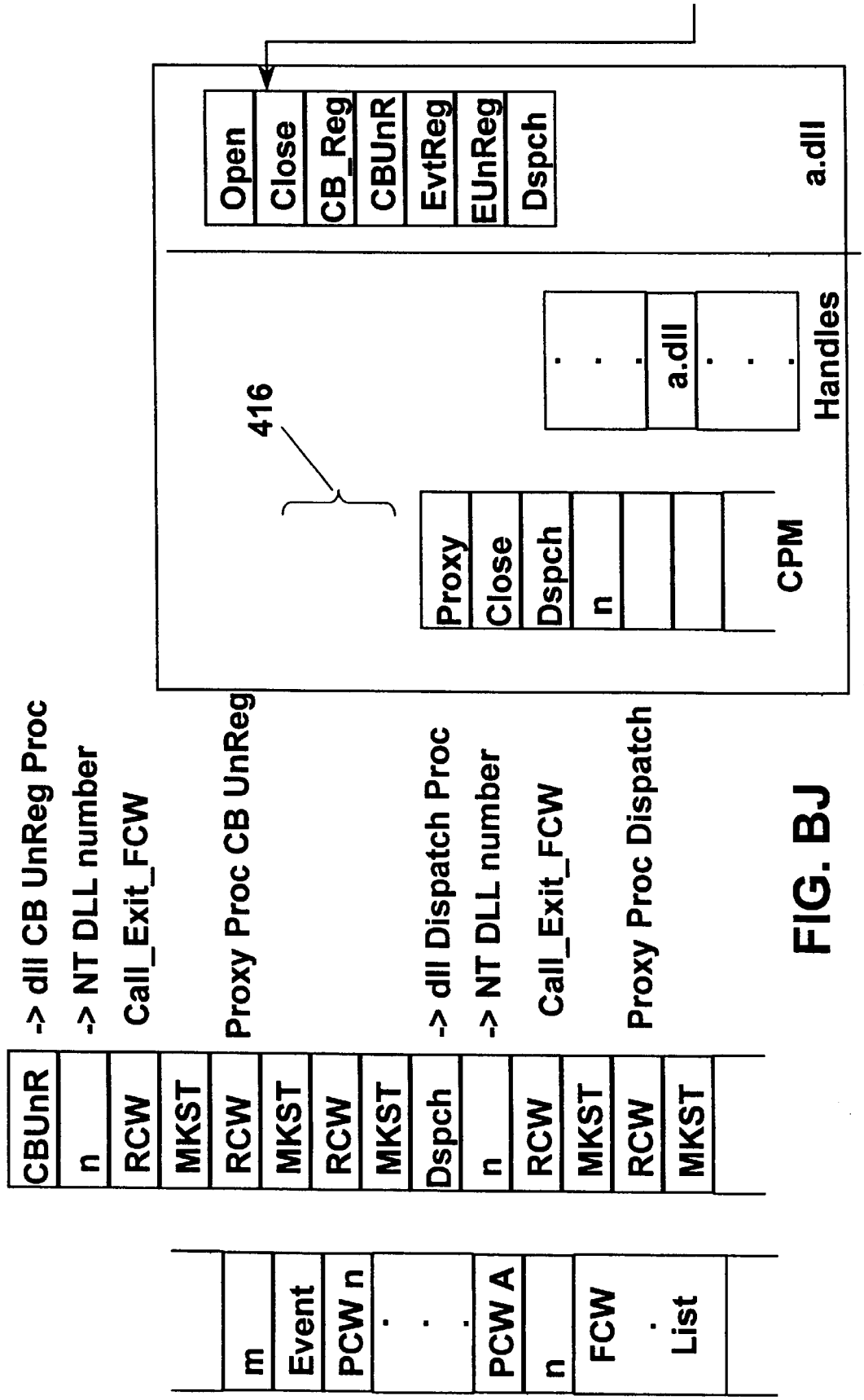
FIG. BJ

Copyright 1997 by Unisys Corporation

Copyright 1997 by Unisys Corporation

Copyright 1997 by Unisys Corporation

Copyright 1997 by Unisys Corporation

Copyright 1997 by Unisys Corporation

Copyright 1997 by Unisys Corporation

Copyright 1997 by Unisys Corporation

SYSTEM AND METHOD FOR PERFORMING EXTERNAL PROCEDURE CALLS FROM A SERVER PROGRAM TO A CLIENT PROGRAM WHILE BOTH ARE RUNNING IN A HETEROGENEOUS COMPUTER

CROSS REFERENCE TO RELATED APPLICATIONS

This application relates to the following co-pending applications, assigned to the same assignee hereof, which are incorporated herein by reference.

U.S. Ser. No. 08/882,639, entitled A NEW AND IMPROVED SYSTEM AND METHOD FOR PERFORMING EXTERNAL PROCEDURE CALLS IN HETEROGENEOUS COMPUTERS;

U.S. Ser. No. 08/882,641, entitled A SYSTEM AND METHOD FOR PERFORMING EXTERNAL PROCEDURE CALLS FROM A CLIENT PROGRAM TO A SERVER PROGRAM WHILE BOTH ARE RUNNING IN A HETEROGENEOUS COMPUTER;

U.S. Ser. No. 08/882,643, entitled A SYSTEM AND METHOD FOR PERFORMING EXTERNAL PROCEDURE CALLS FROM A CLIENT PROGRAM TO A SERVER PROGRAM AND BACK TO THE CLIENT PROGRAM WHILE BOTH ARE RUNNING IN A HETEROGENEOUS COMPUTER.

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention generally relates to external procedure calls in a computer system executing a program, and in particular to a method for performing external procedure calls from a server program to a client program, wherein the server program is executing a call from the client program and both are running in a heterogeneous computer system sharing a common memory. The term "External Procedure Calls" (or "EPC") is used herein to refer to the making of a function call from one operating environment to another of such a heterogeneous computer system. The term "heterogeneous multiprocessing system" refers to a single computer system having two or more Central Processing Units (CPUs) that operate with a shared memory and utilize two or more different operating systems.

BACKGROUND OF THE INVENTION

In general computer programs include a number of internal functions, plus computer codes which call these functions in a specific order. This approach works well when all of the necessary functions are available within a single program. However, there are times when a required function is located elsewhere. Such functions are normally referred to as remote, or external functions.

One way to make these remote or external functions available to a program is to incorporate them into the local program. When feasible, this is the most efficient approach. However, remote or external functions sometimes depend upon other things (e.g., data, operating systems, hardware, etc.), which may not be available to the local program. In such situations, importing the remote or external function to the local program is not possible. Hence, the only alternative is to invoke the desired function remotely. These are known as Remote Procedure Calls (RPC's), which are available for such use. RPC's operate much, much slower than internal functions, in fact they are four or more orders of magnitude slower.

Some systems provide a streamlined RPC mechanism for use in shared memory environments, which are referred to as Local Procedure Calls (LPC). This capability eliminates the overhead of moving a function call across a network and reduces the per call overhead to less than 1 microsecond with today's microprocessors. Local Procedure Calls, however, are only available when all of the functions are running under the control of one single operating system. In a heterogeneous multiprocessing (HMP) system, there is a desire to have two different operating systems closely cooperating to carry out certain tasks.

Technologies are available for carrying out this cooperation, which are variants of Remote Procedure Calls (RPCs). RPCs operate over a network transport of some sort, and serve to physically move a request from one environment to another. At best, they operate in the range of 100 microseconds overhead per call. While this overhead is acceptable for some long operations, it is excessive for short operations, making cooperation impractical. In addition, the 100 microsecond or greater overhead must be incurred by each function call, further reducing the desirability of RPCs. A function calling sequence with drastically reduced overhead is required.

In shared memory HMP environments, there is no need to physically move the function from the memory of one operating environment to the memory of the other. Both operating environments share a single memory. External Procedure Calls take advantage of the shared memory in an HMP system to expedite the calling sequence between operating environments, allowing overheads of less than 1 microsecond using today's Instruction Processors or as referred to herein Central Processing Units (CPU's). This overhead reduction allows EPCs to be used for cooperative processing where RPCs would be impractical. Examples of potential uses for EPCs include: direct use of DMSII verbs from NT applications and direct use of NT security and encryption algorithms from MCP environments.

SUMMARY OF THE INVENTION

In accordance with the above and other objects, features and advantages of the present invention, there is provided a method and system in a heterogeneous computer system including at least one Client CPU, at least one Server CPU and a common memory accessible by each of the CPU's and disposed for storing first and second operating systems that control operation of the Client and Server CPUs, respectively. Client and Server Programs are both stored in the same common memory. The method and system comprise a Client Program executed by the Client CPU and a Server Program executed by the Server CPU. The Server Program is adapted for making function calls to the Client Program and the Client Program is adapted for returning results of the called function to the Server Program.

The Server Program includes procedures for invoking a Client Program function, and for converting parameters and result data from a format compatible with the one operating system to the other.

An object of the present invention is to provide a direct calling sequence from one operating system environment to another. This includes the direct mapping of parameters and return values.

A feature of the present invention is that a function being called is written in standard MCP languages. The functions need not be aware that they are being called from a foreign environment.

An advantage of the present invention is that the called functions are packaged in the same way they would be for use in the native environment, and are fully usable in the native environment. For MCP, functions are packaged in a standard MCP library format, and are fully usable by both MCP based applications and (once set up) by Windows NT programs as well. In both cases, this dual usage can be concurrent. That is, both native and foreign programs can be calling the same routines concurrently. MCP is the name of the operating system for A Series and ClearPath/NX Computers available from Unisys Corporation of Blue Bell, PA, assignee of this patent application. Windows NT is an operating system available from Microsoft Corporation of Redmond, Washington. It is noted at this juncture of the description that the term NT or NT Operating System is used to mean the Windows NT Operating System.

Another advantage of the present invention is that the mechanism supports all parameter types that can be readily mapped from the initiating environment to the target environment. This is a subset of all possible parameter types. Simple on-stack parameter types are supported (word values, such as int, long, unsigned, float, INTEGER, REAL are all supported. Simple off-stack arrays are also supported (char*, int*, long*, INTEGER ARRAY, REAL ARRAY, EBCDIC ARRAY). Array contents can either be translated, or left in native format, at the option of the developer.

By use of the present invention, modern computers can execute in excess of 1,000,000 External Procedure Calls per second, using the ClearPath HMP systems available from Unisys Corporation, assignee of this patent application. These speeds are well within one order of magnitude of local function calls, and are a full three orders of magnitude faster than the prior art Remote Procedure Calls. This speed allows programmers to use remote or external functions for many more purposes than were possible using standard Remote Procedure Calls.

Still other objects, features and advantages of the present invention will become readily apparent to those skilled in the art from the following detailed description, wherein there is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

BRIEF DESCRIPTION OF THE DRAWINGS

FIGS. 4A through 4M (intentionally excluding the letter I so as to avoid confusion) combined form a flow chart illustrating the method of the present invention.

DETAILED DESCRIPTION

Figure 1:
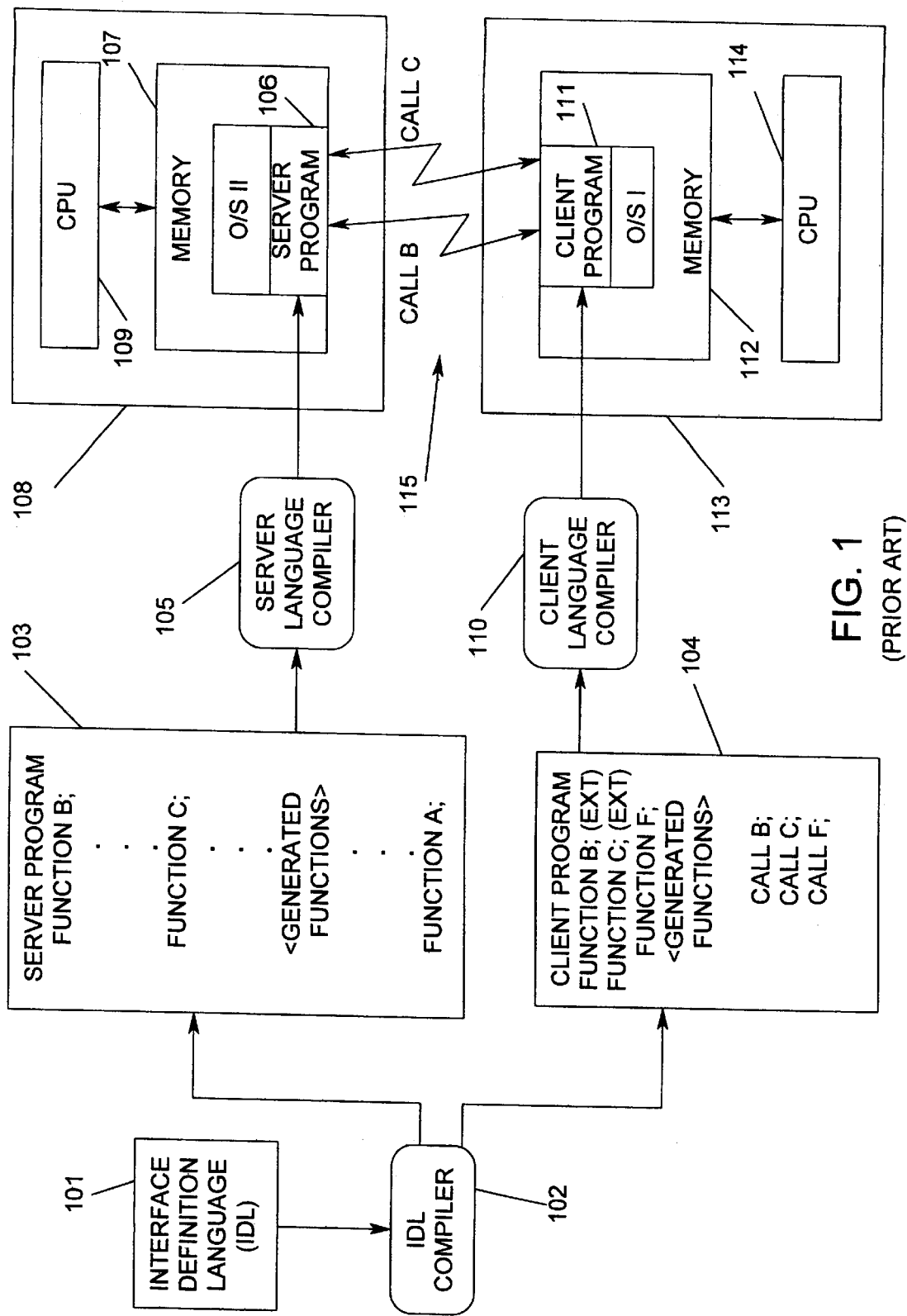
FIG. 1 is a block diagram of the software modules of the prior art remote procedure call schema.

Referring now to FIG. 1, a block diagram illustrates the computer system and software modules that form the prior art remote procedure call schema. Remote or external functions are first identified through an Interface Definition Language (IDL block 101). This input is processed by an IDL compiler 102 to produce two program skeletons for exemplary functions B and C: i.e., a Server Program skeleton 103 and a Client Program skeleton 104. The Server Program skeleton 103 contains declarations for the remote or external functions (Functions B and C in this example), plus some Generated Functions to allow the remote or external functions to be accessed remotely. A computer programmer adds computer codes to the Server Program to provide the actual workings of each remote or external function (e.g., Functions B and C). The computer programmer may also add additional functions which are not remotely or externally callable (e.g., Function A). The resulting program is then compiled with a server language compiler 105 to produce an executable Server Program 106 stored in a memory 107 of a computer 108 having a CPU 109 coupled thereto. An operating system O/S II for the CPU 109 is also stored in the memory 107 and controls operation of the CPU 109, the memory 107 and the Server Program 106.

The Client Program skeleton 104 contains declarations for the remote or external functions as well, with indications that they are remote or external (again, Functions B and C). The Client Program skeleton 104 also contains Generated Functions to allow the remote or external functions to be accessed remotely. A computer programmer adds codes to the Client Program skeleton 104 to provide the actual workings of the program itself, including calls to the remote or external functions (for example, statements CALL B and CALL C). The computer programmer may also add additional functions that are accessed locally (e.g., Function F). The resulting program is then compiled with a client language compiler 110 to produce an executable Client Program 111 stored in a memory 112 of a computer 113 having a CPU 114 coupled thereto. An operating system O/S I for the CPU 114 is also stored in the memory 112 and controls operation of the CPU 114, the memory 112 and the Client Program 111.

At this stage, the programs are ready for execution. The Client Program 111 is started on the computer 113 under the control of O/S I. The Server Program 106 is started on the computer 108 under the control of the operating system O/S II. The mechanisms for starting each program are specific to the computers on which they run; and, since such mechanisms are well known in the art, will not be further described herein. It is pointed out that each computer could be using entirely different operating systems, comprising entirely different hardware, utilizing entirely different CPUs and instruction sets, and having access to entirely different hardware and software resources.

When the Server Program 106 calls one of the remote or external functions (e.g., CALL B), the Generated Functions intercept the CALLS and transport them to the computer 113, via a network 115, where the Client Program 111 is running. Then, using the Generated Functions of the Client Program 111, the remote or external function is invoked in the Client Program. When the invoked function is finished, any results are returned to the Server Program 106 in a like manner. The Generated Functions are obliged to communicate over the network 115 between the two computers; and, are obliged to perform any data translations and network protocols necessary to transport call requests, parameters and responses from one computer to the other.

There is a problem with the previously described solution. When a function is called locally within a program, the overhead necessary to make the function call is several CPU instructions in length. Today's CPUs can execute tens of millions of function calls per second. When a function is remote or external, the Generated Functions have much work to do. This work becomes an integral part of the function invocation. Such an overhead takes thousands of CPU instructions, plus transmission delays. The result is that today's computers can execute on the order of 50 to 1,000 remote or external function calls per second. Thus, remote or external function calls operate around 4 orders of magnitude slower than local function calls. This makes remote or external function calls impractical for many applications.

Figure 2:
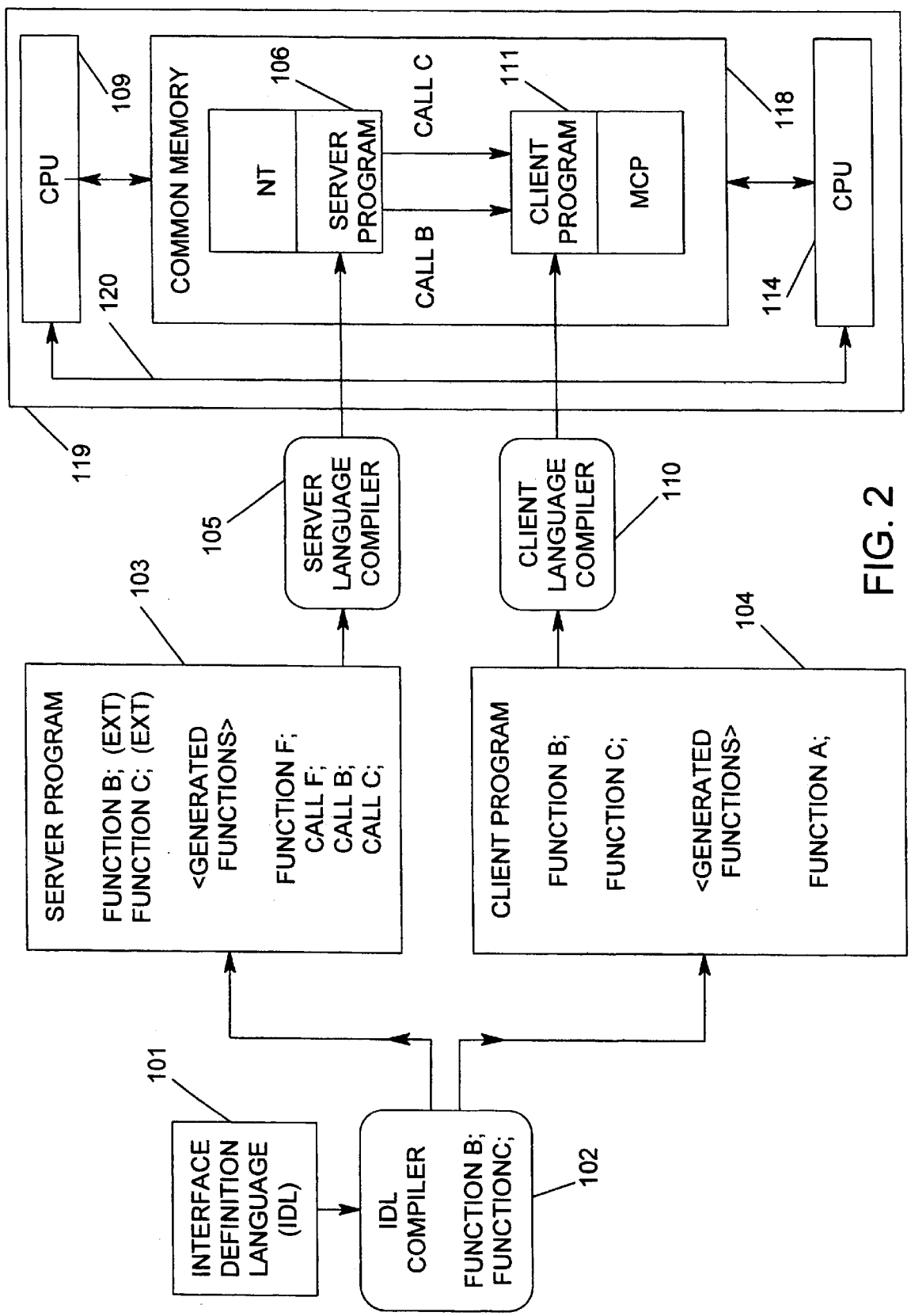
FIG. 2 is a block diagram that illustrates software modules depicting the sequence of steps necessary to develop programs that could make use of the method of the present invention.

Referring now to FIG. 2, a block diagram illustrates software modules depicting the sequence of steps necessary to develop programs that could make use of the method of the present invention. External Procedure Calls begin with the same basic approach as Remote Procedure Calls. The same Interface Definition Language 101 is used, and the same IDL compiler 102 generates a Server Program 103, and a Client Program 104. There are differences however in the generated functions, and in the location of the defined functions, but these differences are transparent to the computer programmer. The computer programmer performs the identical steps of completing each program, and compiling it using the same appropriate language compiler 105 or 110. Note, however, that the program must put the actual codes for the defined functions (Function B and Function C) in the Client Program, and that calls to these functions (CALL B and CALL C) are programmed as part of the Server Program. The resulting programs 106 and 111, respectively, are then run on a special computer system 119 having two operating system environments (MCP and NT) controlling the two CPU's (CPU 114 and CPU 109, respectively) connected in a very closely coupled way by means of a bus 120. A suitable example of such a system is the ClearPath HMP systems delivered by Unisys Corporation, assignee of this patent application. The only special requirements for such a computer system are that it must incorporate a shared memory 118 between the two Operating Systems, and there must be a high-speed CPU-to-CPU signaling bus available, such as the bus 120.

When the Server Program 106 calls a remote or external function using External Procedure Calls, the generated functions operate to invoke the appropriate Client function at very nearly the same speed as if the function was a local one. This is accomplished while still allowing the Operating Systems involved to be different, allowing entirely different hardware, utilizing entirely different CPUs and instruction sets, and having access to entirely different hardware and software resources. Only the two special requirements of a common memory and the high-speed CPU-to-CPU bus 120 need be satisfied.

In one embodiment of the present invention, the Server Program 106 running in the Windows NT environment makes a call on the Client Program 111 running in the MCP environment. The External Procedure Call implementation will make use of the Microsoft Interface Definition Language, with extensions, to define the protocol between the Client and Server Programs. This IDL will be compiled by an EIDL (E-Mode Interface Definition Language) compiler, which parses the IDL input file and generates the following:

Proxy Procedures: Specific examples of the Generated Functions referenced in both the Server and Client Program skeletons 103 and 104, respectively. These are Server Program procedures that the Server program calls when it wishes to invoke a Client Program function. They have the same parameters and procedure types as the procedures defined in the IDL specification. The Proxy Procedure is responsible for notifying the MCP Operating System that a function in the Client Program is to be called.

Stub Procedures: Specific examples of the Generated Functions referenced in both the Server and Client Program skeletons 103 and 104, respectively; and, are Server and Client Program procedures that convert the parameter and result data between the MCP and NT formats and call the appropriate Client and Server Program Procedures.

Server Skeletons: These are depicted as Server Programs in FIGS. 1 and 2 and contain the calls to the MCP Client Procedures.

Client Skeletons: These are depicted as Client Programs in FIGS. 1 and 2 and contain the MCP Client Procedure headings and empty bodies.

MCP Client Procedure headings and empty bodies are shown in FIGS. 1 and 2 as FUNCTION B and FUNCTION C, respectively, inside the Client Program skeleton 104. The application programmer is responsible for providing the logic within the procedure bodies, which is then referred to as a Client Procedure.

In one embodiment of the present invention, an additional type of procedure is provided in the Generated Functions for use by Proxy and Stub Procedures referred to herein as an FCW Protocol Procedure. The MCP Client program is responsible for initiating the connection between the MCP Operating System and the Windows NT programs, which connection is established by calling the Open_FCW Protocol Procedure.

Figure 3:
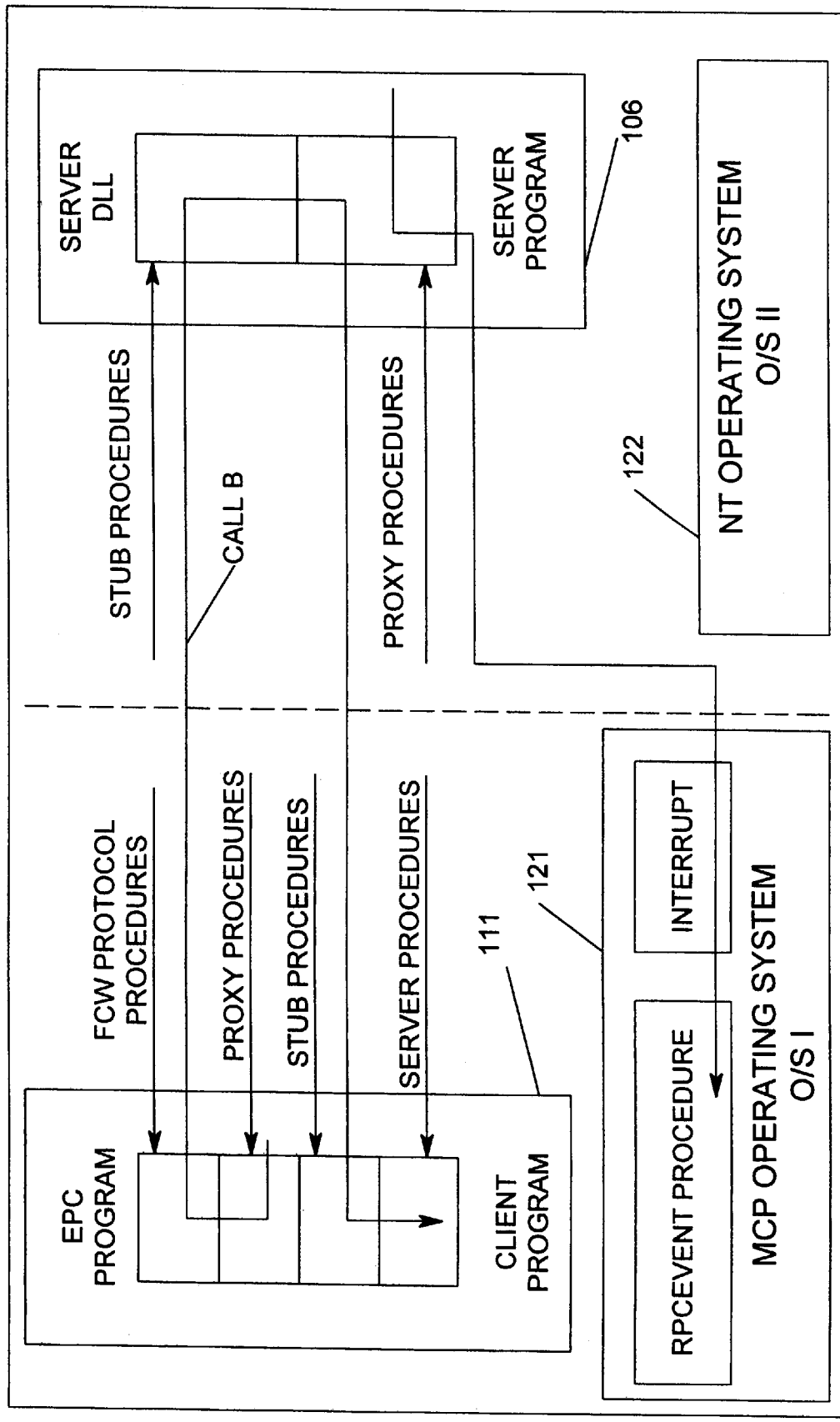
FIG. 3 is a detailed block diagram of the Client Program and the Server Program during run time.

Referring now to FIG. 3, there is illustrated a block diagram of the software modules of the schema of the present invention stored in the common memory 118. This diagram represents a run-time composition of the Server Program 106 and the Client Program 111 for External Procedure Calls, as well as the sequence of operations for procedure calls from the Server Program to the Client Program. For purposes of illustration only of a specific embodiment of the method of the present invention, the Client Program 111 comprises an EPC program (i.e., External Procedure Call) executable by an MCP Operating System running on a Unisys ClearPath/NX HMP computer. An exemplary Server Program 106 is shown as a DLL (i.e., Dynamic Link Library) executable by the Windows NT Operating System 122.

In operation, when a Windows NT calling program wishes to call a Client Program 111 function (for example, CALL B), the calling program instead calls the corresponding Server Program Proxy Procedure for Function B (CALL B). This Server Program Proxy Procedure first notifies the MCP Operating System that a Client Program 111 function is about to be called, via an Interrupt. The MCP then causes an event associated with the EPC Client Program. The EPC Client Program then resumes execution in a Client Program Proxy Procedure. This Client Program Proxy Procedure then calls a Server Program Stub Procedure (using a mechanism disclosed in detail in the above-cited co-pending patent application entitled A METHOD FOR PERFORMING EXTERNAL PROCEDURE CALLS FROM A CLIENT PROGRAM TO A SERVER PROGRAM WHILE BOTH ARE RUNNING IN A HETEROGENEOUS COMPUTER).

The called Server Program function calls the Server Program Proxy Procedure previously referenced. This Server Program Proxy Procedure then performs any parameter translation necessary, and again notifies the MCP Operating System that a Client Program 111 function is about to be called. The MCP invokes the corresponding Stub Procedure in the Client Program 111. The Stub Procedure then calls the actual function B. When the Client Program Server Function B finishes, the Stub Procedure informs the Windows NT Operating System to return control to the Server Program 106. The Client Program then waits until control is returned from the Server Program. The MCP notifies the Windows NT Operating System to resume operation of the Server Program 106. The Server Program 106 Proxy Procedure then resumes execution, performs any parameter and return value translation necessary, and returns to the Server Program 111 Stub Procedure.

The Server Program Stub Procedure then exits returning any results to the NT calling program (in the manner described in the above-cited co-pending patent application). This returns control to the MCP Client Program Proxy Procedure, as well as returning control to the Windows NT calling program. The Windows NT calling program then continues processing, making use of the parameters and result values from the Client Program 106 Function B. In the meantime, the MCP Client Program Proxy Procedure waits for the MCP event to again be caused. The details of this process are amplified in the description to follow and with reference to the flow chart illustrated in FIGS. 4A through 4M, and with reference to the illustrations in FIGS. 5A through 5BY.

Figure 4A:
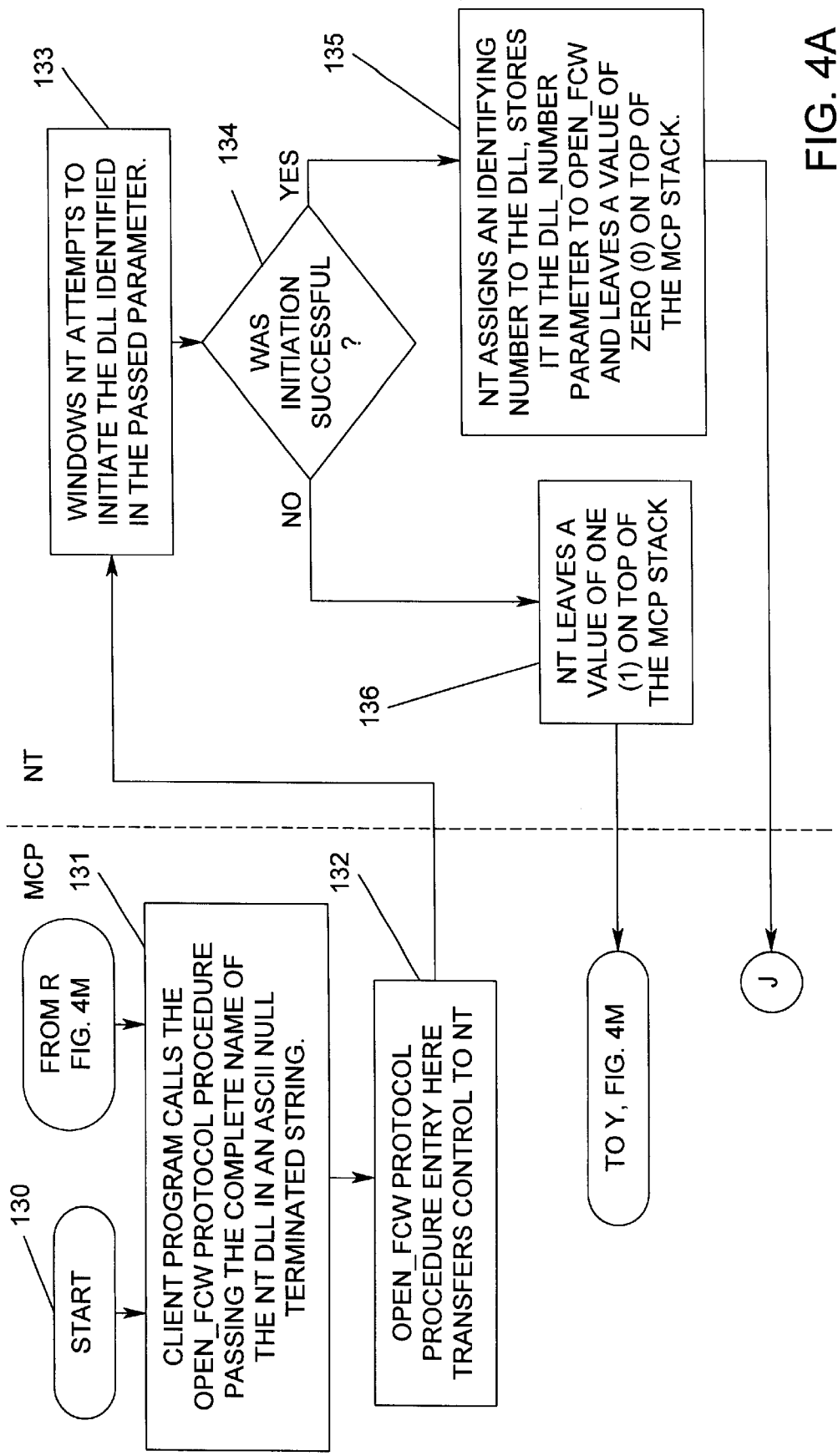

Referring now to FIG. 4A, the first of a ten-part diagram illustrating the steps of the method of the present invention is shown. A convention used in organizing these figures is to illustrate the steps performed by the MCP Operating System 121 on the left side of each sheet and the steps performed by the Windows NT Operating System 122 on the right hand side of the sheet (unless otherwise noted). Likewise referring now to FIG. 5A, the first of a 71-part diagram illustrating the steps of the method of the present invention is shown. A convention used in organizing FIGS. 5A through 5BY is to illustrate the steps performed by the first operating system ("MCP") on the left-hand side of each sheet of the drawing (the part of the illustration without a border) and the steps performed by the second operating system ("NT") on the right-hand side of each sheet (the part of the illustration contained within a border), unless otherwise noted. The steps shown in FIGS. 4A through 4M and FIGS. 5A through 5BY are two ways to look at the same steps, and the description which follows applies to both illustrations. The method or process begins in the MCP Operating System 121 with a start bubble 130 followed by a step performed by the Client Program 106 of calling the Open_FCW Protocol Procedure (block 131/331 FIG. 5A). The complete name of the NT Server DLL is passed in an ASCII null-terminated string. Entry into the Open_FCW Protocol Procedure transfers control to the CPU 109 (block 132). The Windows NT Operating System attempts to initiate the DLL identified in the passed parameter (block 133). Next, an inquiry is made as to whether or not the initiation by the NT Operating System was successful (diamond 134). If the answer to this inquiry is yes, then the Windows NT Operating System assigns an identifying number to the DLL, stores it in the DLL_Number parameter to the Open_FCW Protocol Procedure and leaves a value of zero (0) on top of the MCP Client Program stack (block 135/335 FIG. 5B). On the other hand, if the initiation by the Windows NT Operating System was not successful, it leaves a value of one (1) on the top of the MCP Client Program stack (block 136).

The zero (0) or one (1) will be used as a result by the Client Program to indicate success or failure of the attempt to initiate the NT Server DLL. In the case of failure, further EPC execution is not possible (although the Client Program can continue performing other functions). The Client Program 111 can take any appropriate action, such as correcting the name of the NT Server DLL or perhaps terminating operation. Following the step depicted by the block 136, the Client Program may not make calls to the Server Program (block 137). Hence, the Client Program continues with other processing, possibly making subsequent calls to the initialization function (block 138). At this point a branch is taken to the end of the process, which will be described hereinafter, at a connector Y in FIG. 4M.

Figure 4B:
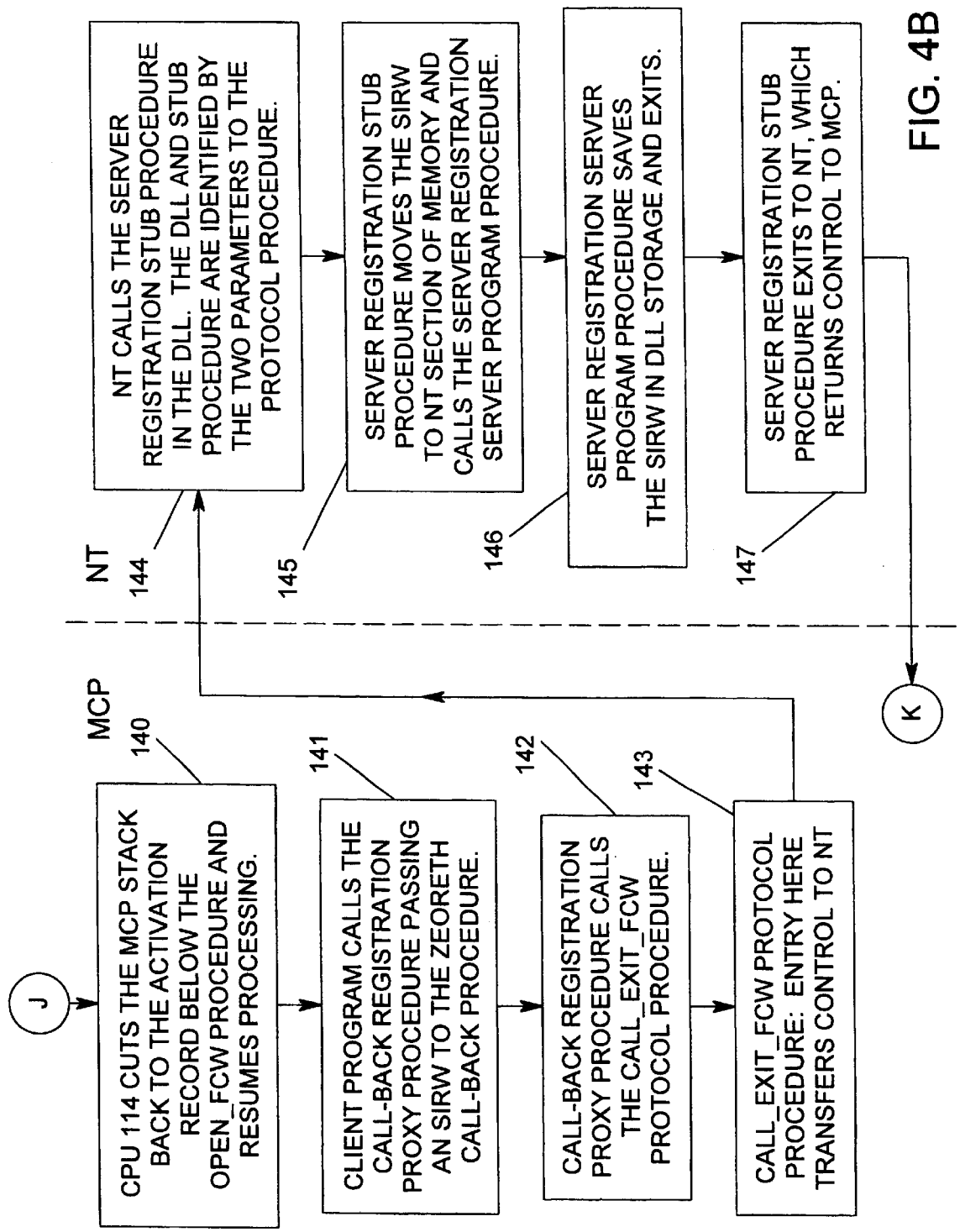

Following the step depicted by the block 135, the process illustration continues in FIG. 4B at a connector J wherein the CPU 114 under control of the MCP cuts the Client Program stack back to the activation record below the Open_FCW Protocol Procedure (block 140, FIG. 4B via connector J), and the Client Program resumes processing. The Client Program next calls the Call-back Registration Proxy Procedure for passing an SIRW (Stuffed Indirect Reference Word) to the zeroeth Server Procedure (block 141). An SIRW is an MCP-specific hardware construct used as an indirection to reference another location. The purpose for doing this is to provide the Proxy Procedures in the NT Server Program with a way to reference functions in the MCP Client Program. The SIRW can be thought of as a jump table. Indexing the jump table allows reference to a specific MCP Server function. The Windows NT Proxy Procedures know the appropriate index for each function, which is part of the Generated Functions that were supplied when the Windows NT Proxy Procedures were generated.

The Server Registration Proxy Procedure next calls the Call_Exit_FCW Protocol Procedure (block 142). Entry into the Call_Exit_FCW Protocol Procedure transfers control to the Windows NT Operating System (block 143). Running on CPU 109, the Windows NT Operating System calls the Server Registration Procedure in the Server Program DLL. The Server Program DLL and the Stub Procedure are identified by the two parameters to the Protocol Procedure (block 144). Next, the Server Registration Stub Procedure moves the SIRW to the NT section of the common memory 118 and calls the Server Registration Server Procedure (block 145). Following this, the Registration Server Procedure saves the SIRW in the DLL memory (block 146/346, FIG. 5C). The process illustration continues in FIG. 4C as depicted by a connector K, where. the Windows NT Operating System then returns control to the MCP Operating System.

Figure 4C:
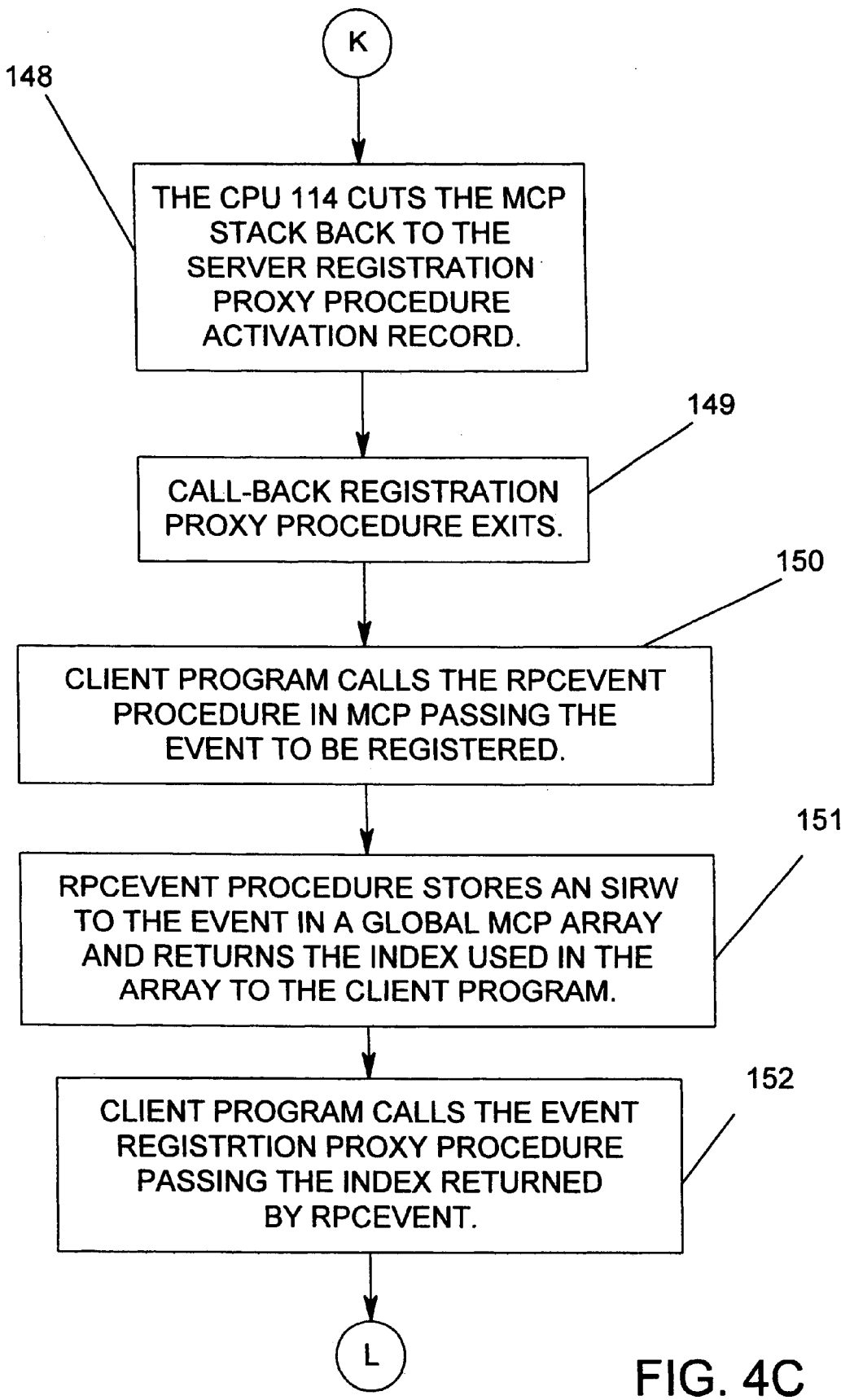

Referring now to FIG. 4C at the connector K and under control of the MCP, the CPU 114 cuts the MCP Client Program stack back to the Server Registration Proxy Procedure activation record (block 148). The Call-Back Registration Stub Procedure exits to NT, which returns control to the MCP operating system (block 148). The Call-Back registration Proxy Procedure then exits (block 149).

Figure 5A:
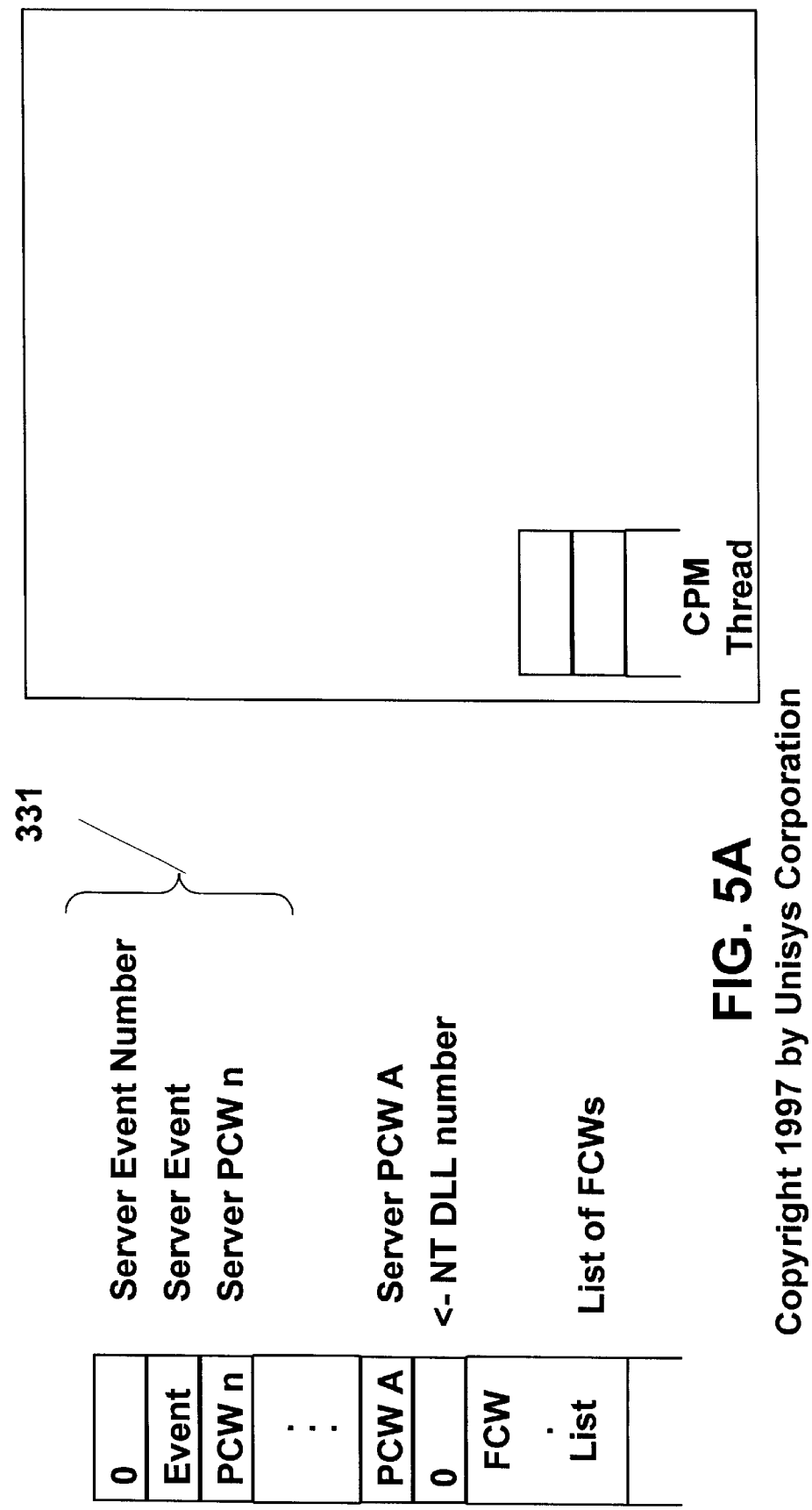
FIGS. 5A through 5BY (intentionally excluding the letters I and O to avoid confusion) combined are a detailed diagram of the steps of the method of the present invention.
Figure 5B:
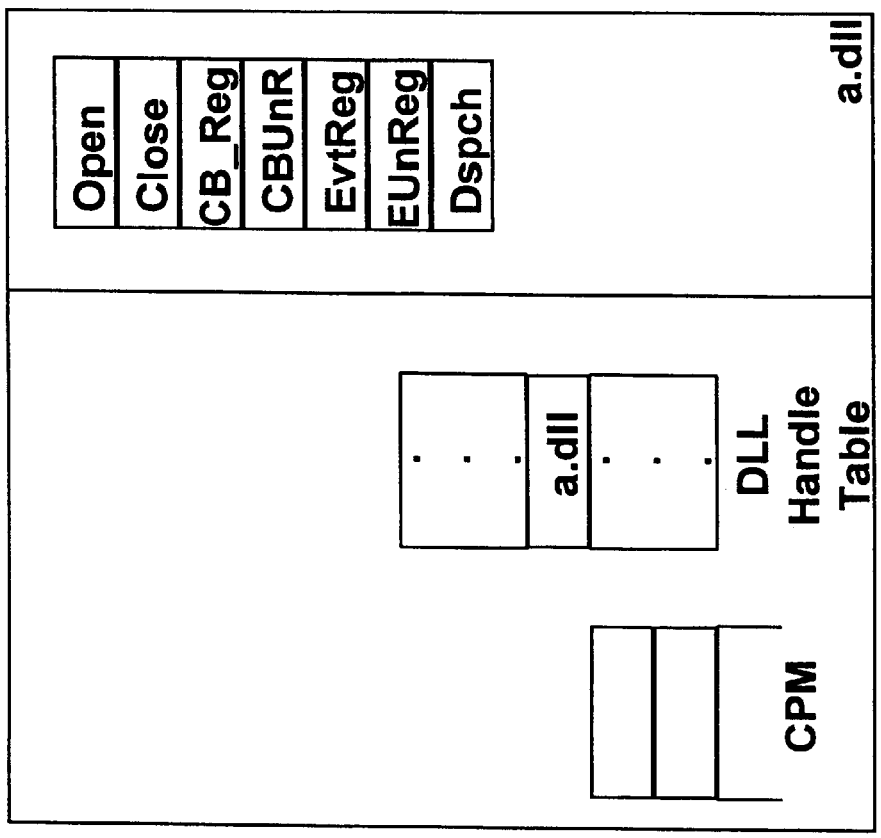
Figure 5B:
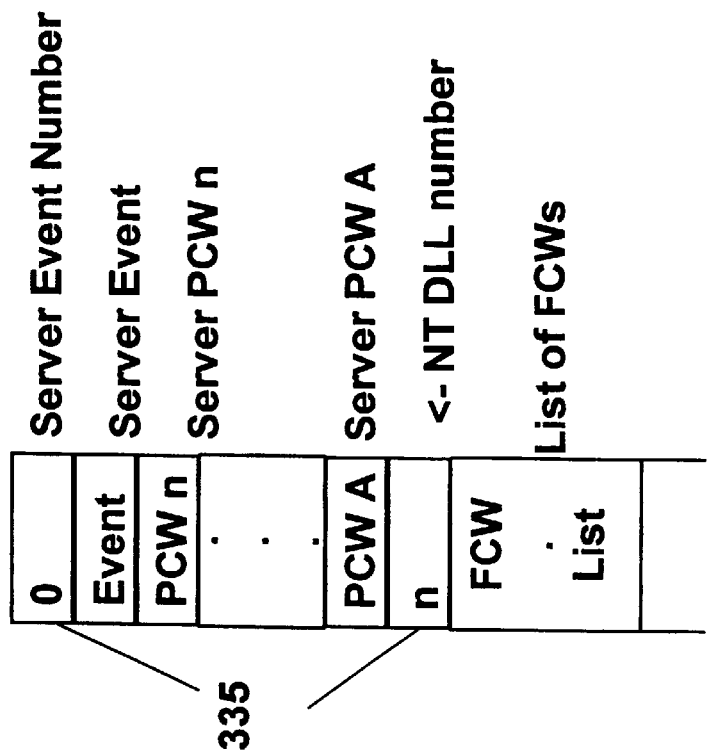
Figure 5C:
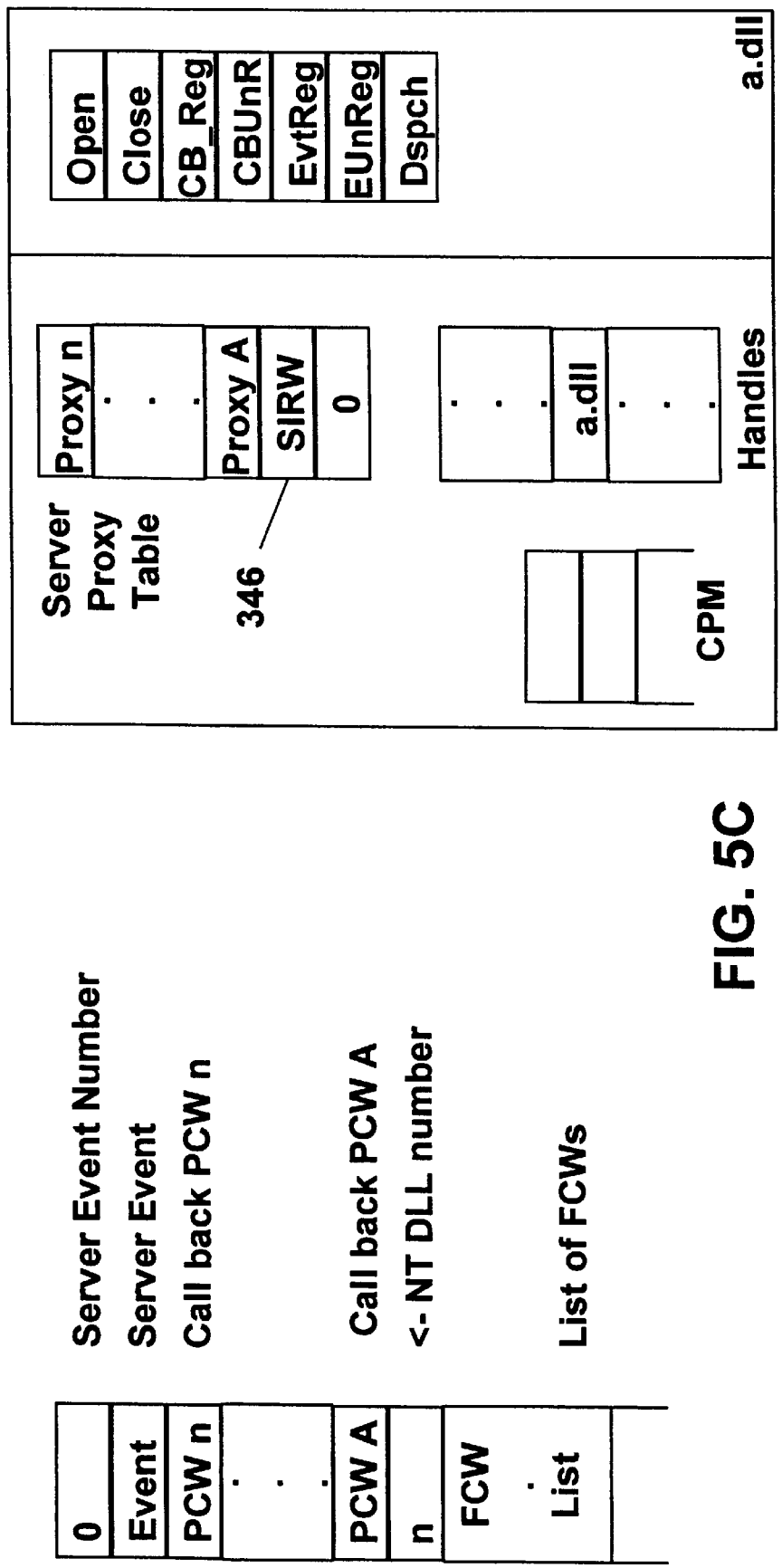
Figure 5D:
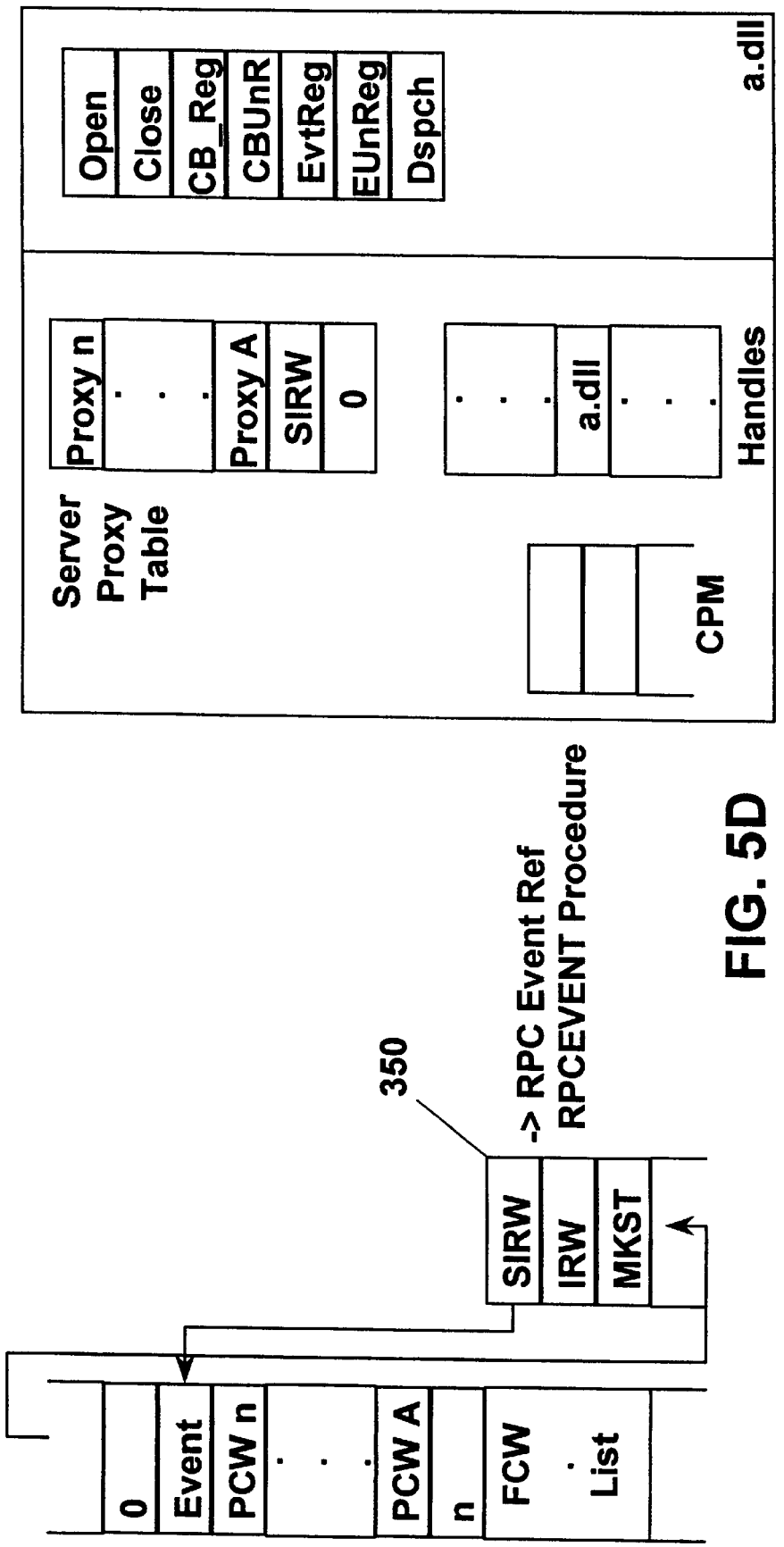
Figure 5E:
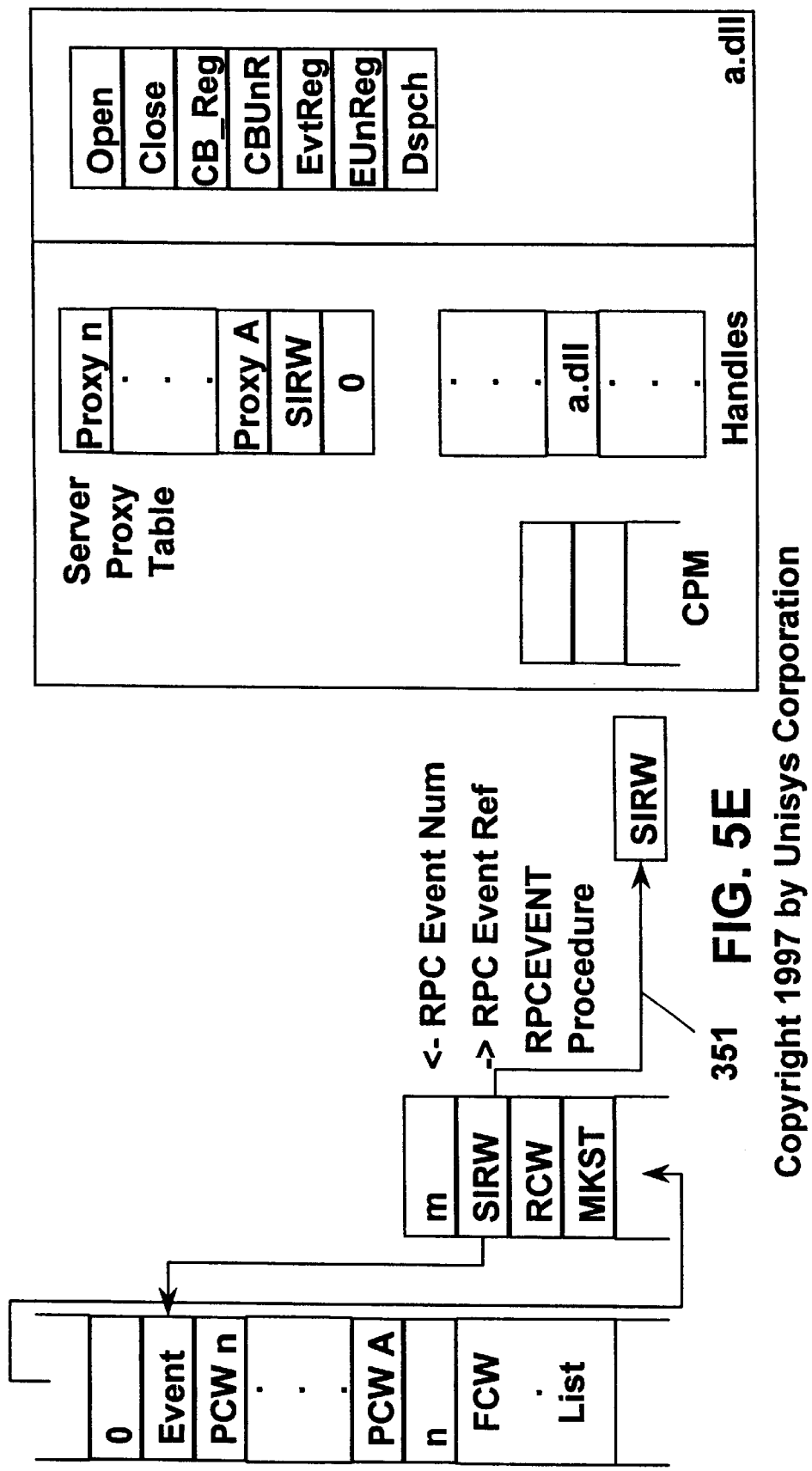
Figure 5F:
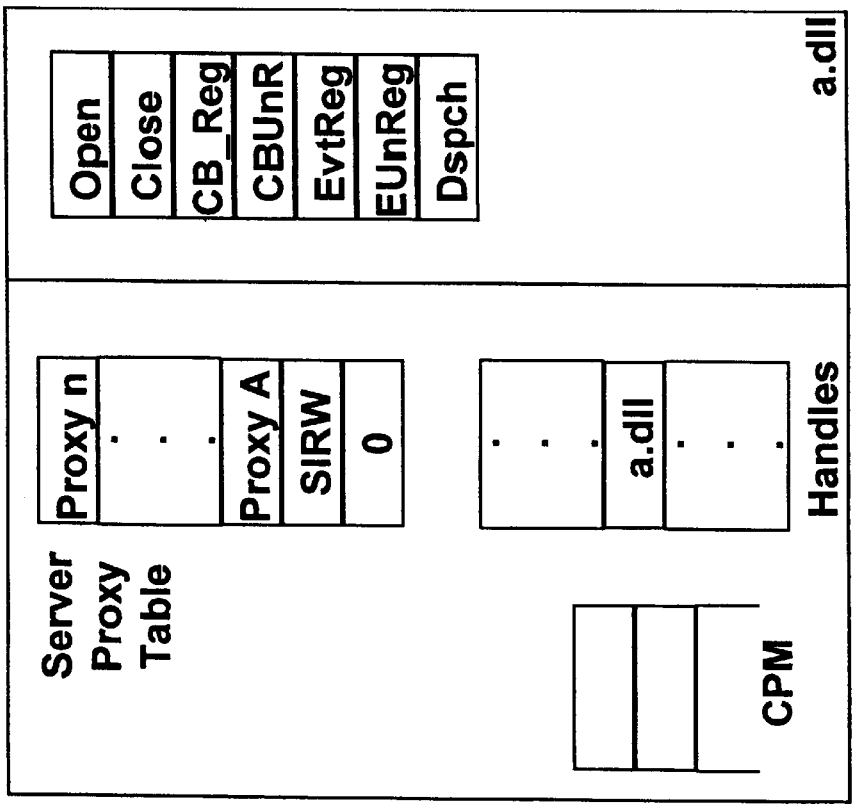
Figure 5F:
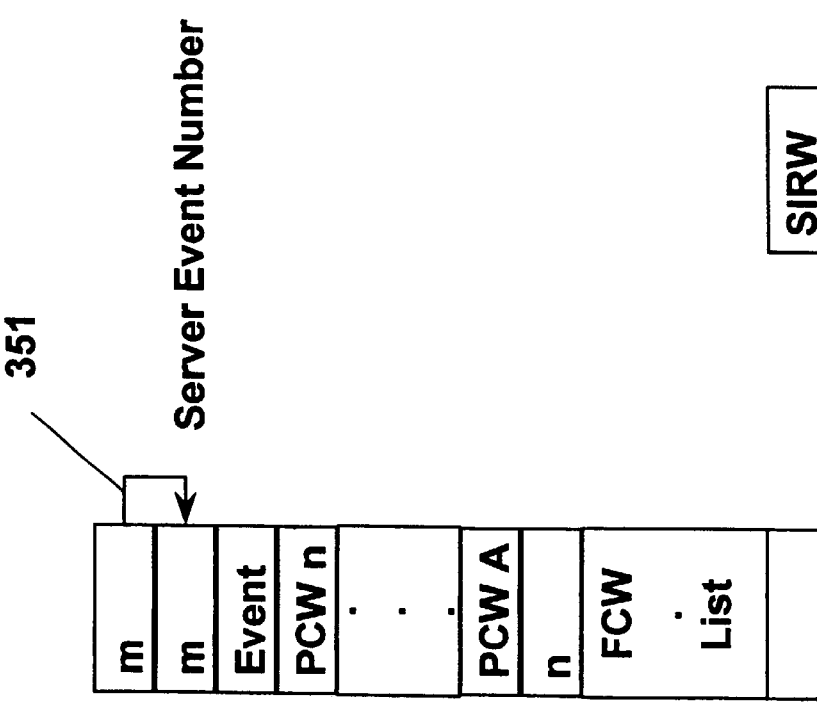
Figure 5G:
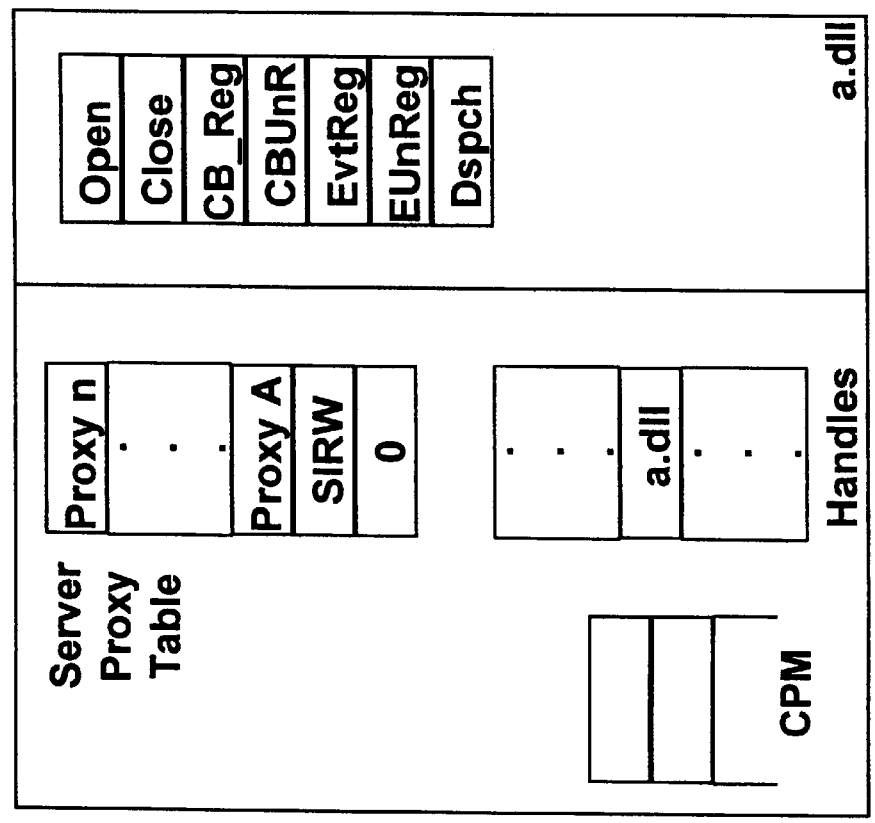
Figure 5G:
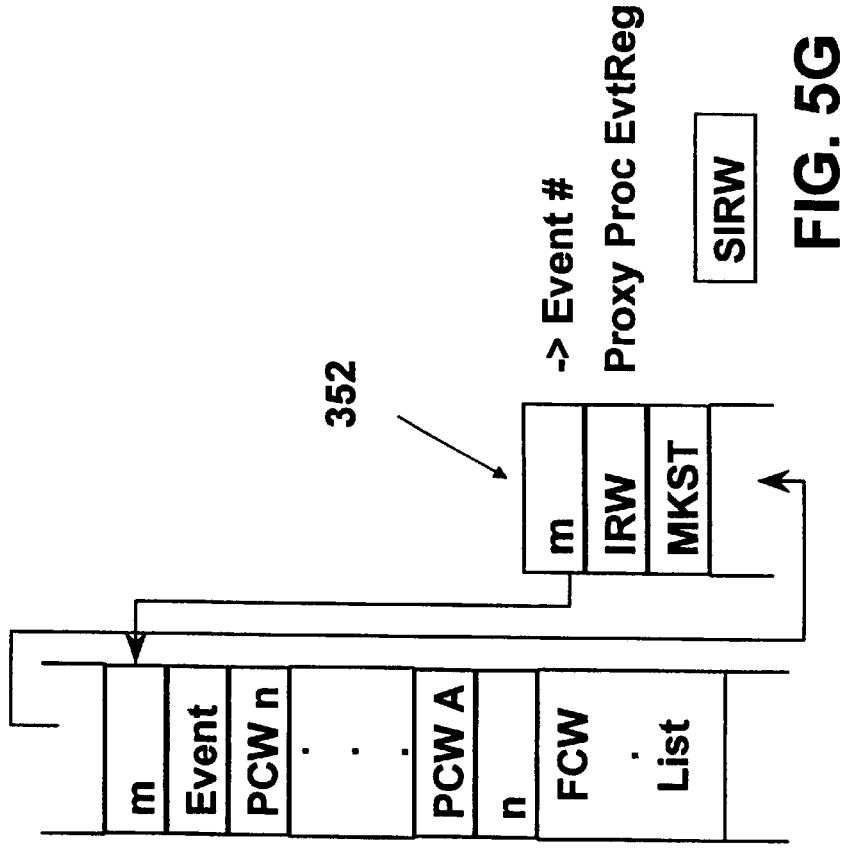

Next, the Client Program calls the RPCEvent Procedure for passing thereto an event to be registered (block 150/350, FIG. 5D). Following this the RPCEvent Procedure stores an SIRW to the event in a global MCP Operating System array and returns the index used in the array to the Client Program (block 151/351, FIGS. 5E and 5F). The reason for this will become apparent hereinbelow when the Windows NT Server Program actually makes a call to an MCP Server function in the MCP Client Program. In brief, a way is needed for the NT Server Program Proxy Procedure to notify the MCP Client Program that a call is about to take place. This is necessary in order to cause a context switch to get the CPU 114 to begin running the Client Program. The Client Program then calls the Event Registration Proxy Procedure for passing the index returned by the RPCEvent to the Windows NT Server Program Proxy Procedures (block 152/352, FIG. 5G). The process illustration continues in FIG. 4D as denoted by a connector L.

Figure 5H:
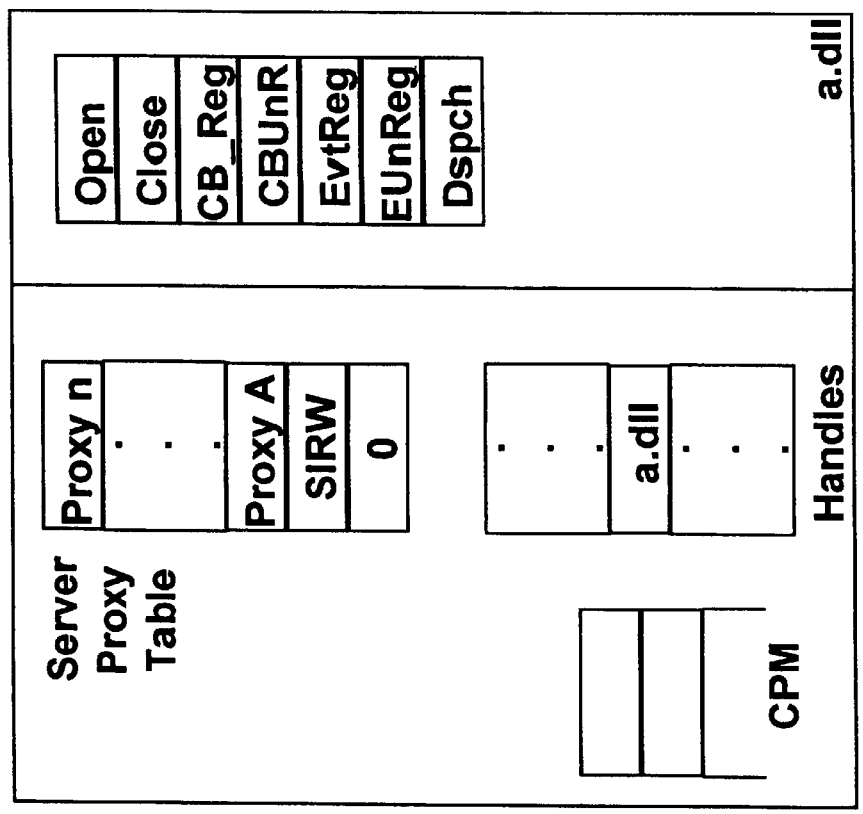
Figure 5H:
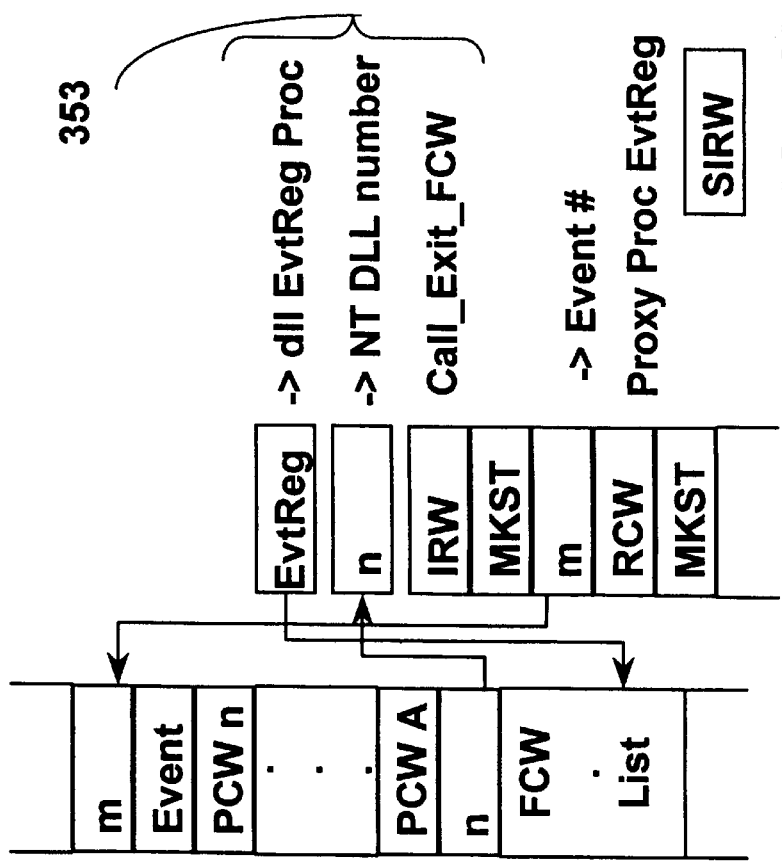
Figure 5J:
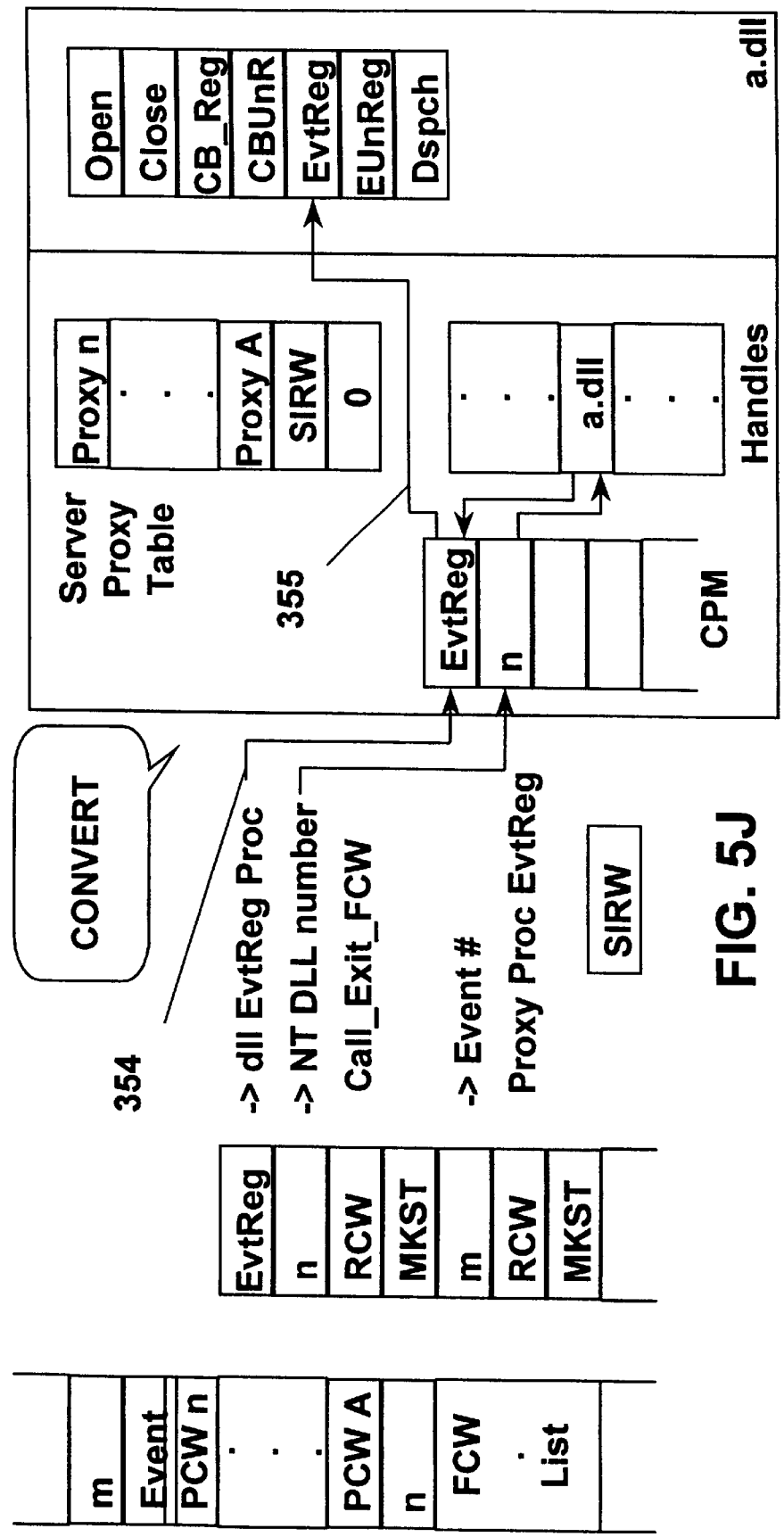

Referring now to FIG. 4D at the connector L, the Event Registration Proxy Procedure calls the Call_Exit_FCW Protocol Procedure (block 153/353, FIG. 5H). Then, entry into the Call_Exit_FCW Protocol Procedure transfers control to the Windows NT Operating System (block 154/354, FIG. 5J).

Figure 5K:
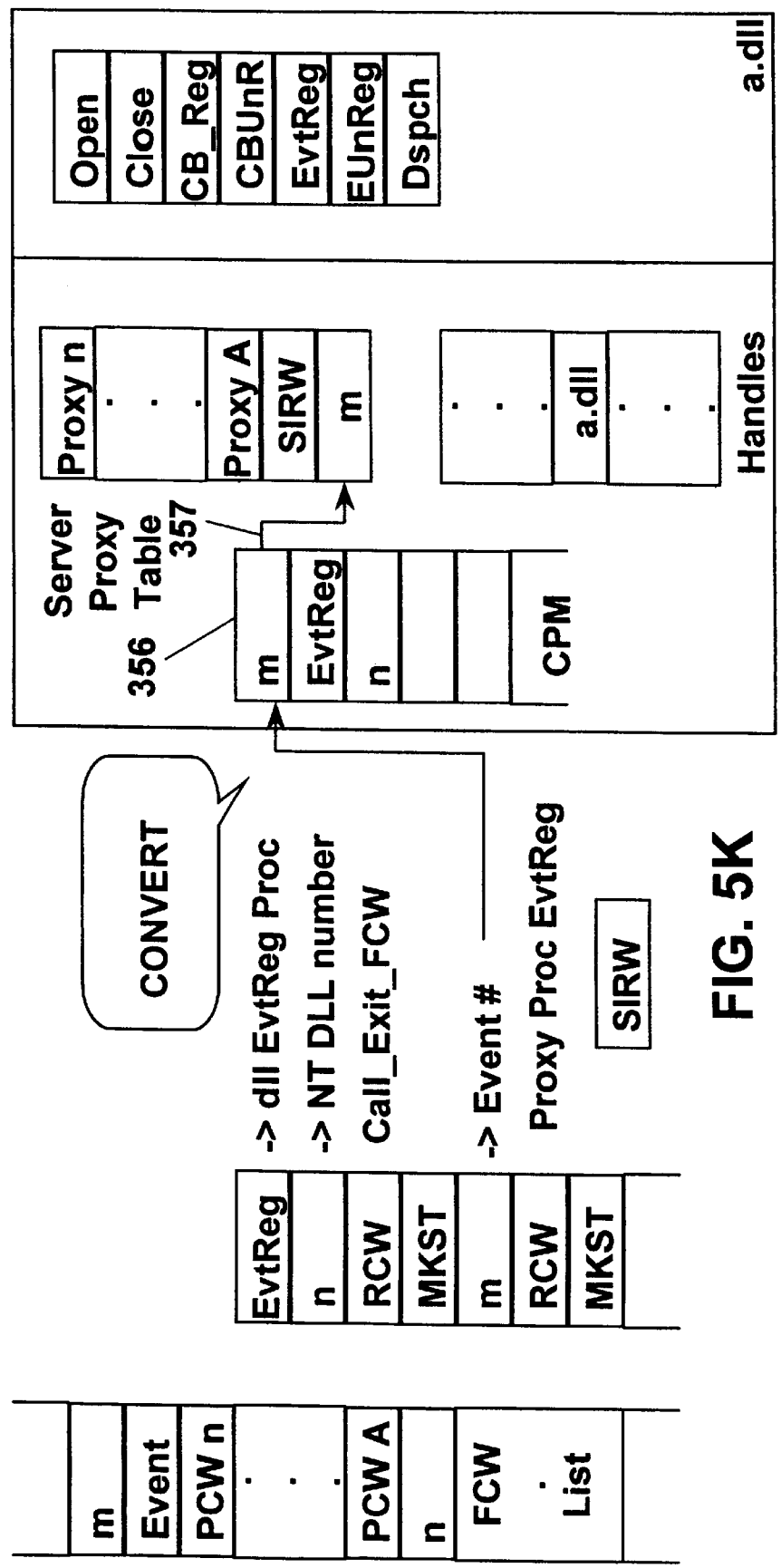
Figure 5L:
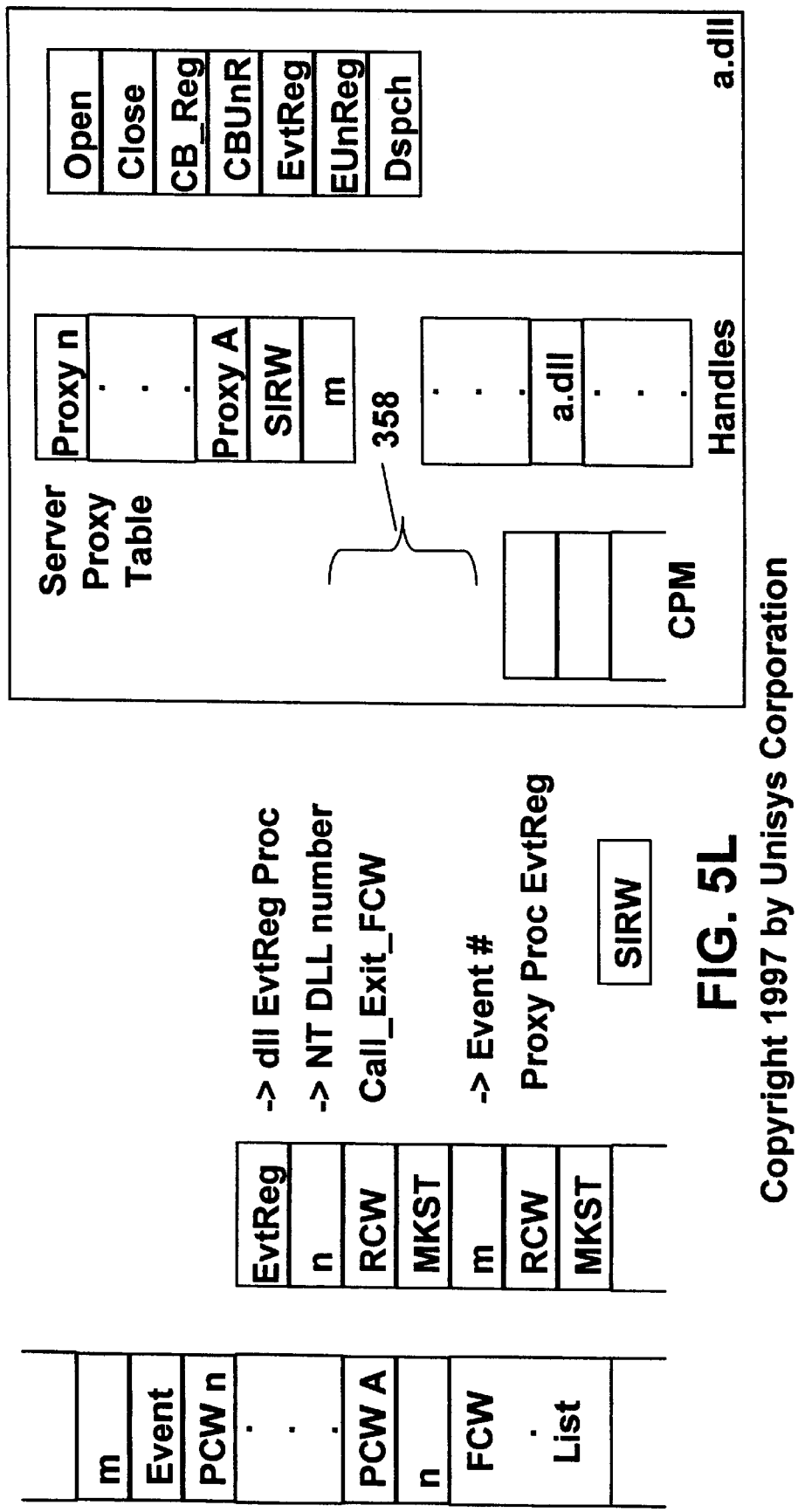
Figure 5M:
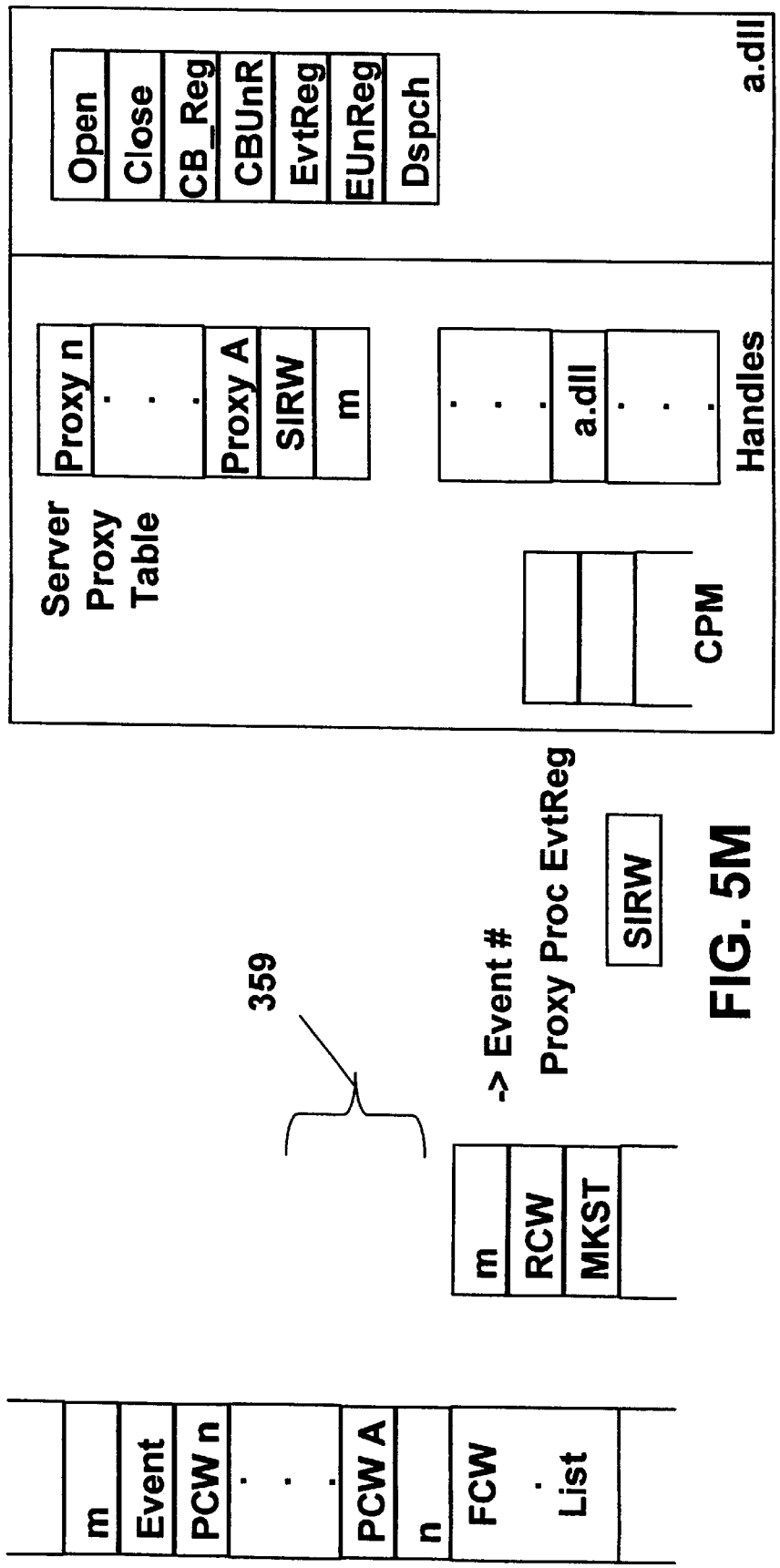

Within the Windows NT operating system running on the CPU 109, NT calls the Event Registration Stub Procedure in the Server Program DLL. The Server Program DLL and the Stub Procedure are identified by the two parameters to the Protocol Procedure (block 155/355, FIG. 5J). Next, the Event Registration Stub Procedure converts the event number to NT format and calls the Event Registration Server Procedure (block 156/356, FIG. 5K). The Event Registration Server Procedure then saves the event number in the DLL section of the memory (block 157/357, FIG. 5K). The Event Registration Stub Procedure exits and waits for calling program calls (block 158/358, FIG. 5L). At this point, External Procedure Calls are initialized, and Windows NT programs can begin calling MCP Client Program Server Functions. Following this and under control of MCP, the CPU 114 cuts the MCP Client Program stack back to the Event Registration Proxy Procedure activation record (block 159/359, FIG. 5M). The process illustration continues in FIG. 4E as denoted by a connector M.

Figure 5P:
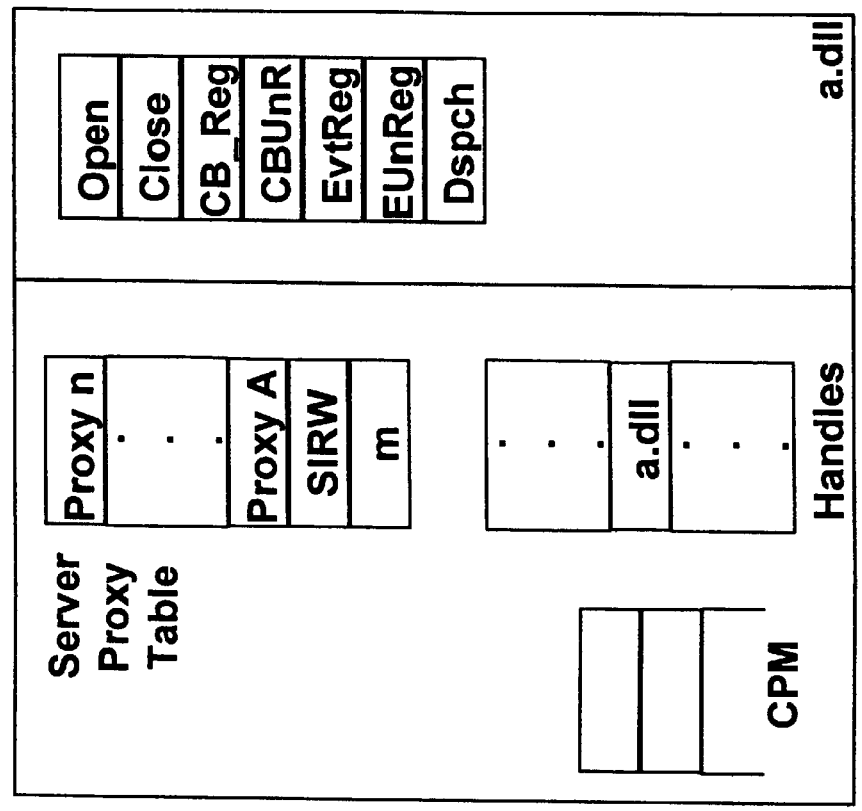
Figure 5P:
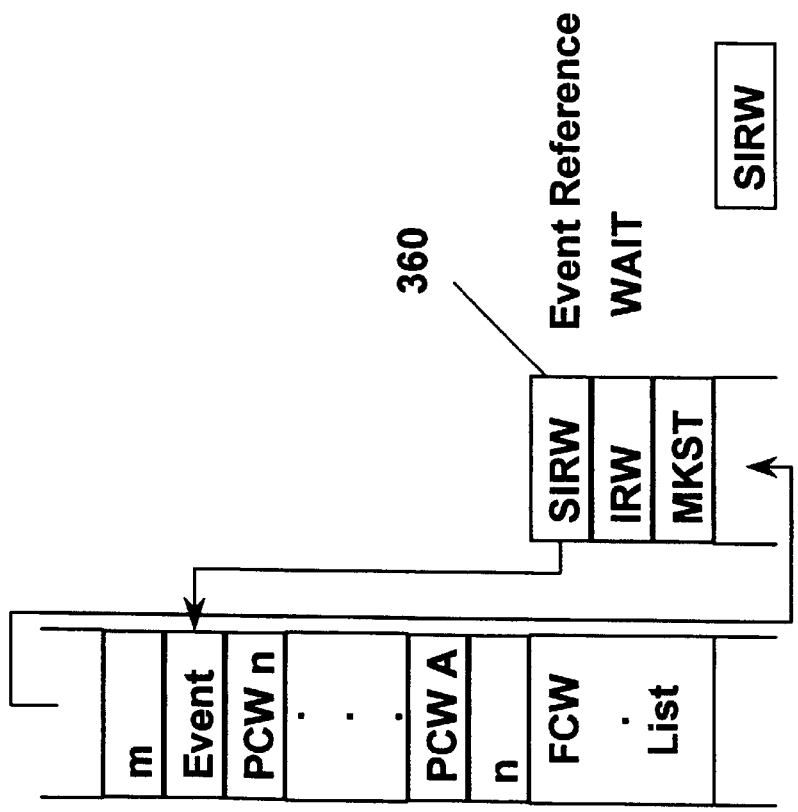

Referring now to FIG. 4E at the connector M and under control of the MCP operating system, the Event Registration Proxy Procedure exits (block 259/459, FIG. 5N). Next, the Client Program waits on the event (block 160/360, FIG. 5P). At this point, the External Procedure Call mechanism is initialized and Windows NT programs can begin to actually call the MCP Client Program Server Functions. However, the MCP Client Program is an active program, and needs to do something when it isn't being called. It is thus necessary to wait for the event. The event will be caused when the Windows NT Server Program actually makes a function call.

Figure 5Q:
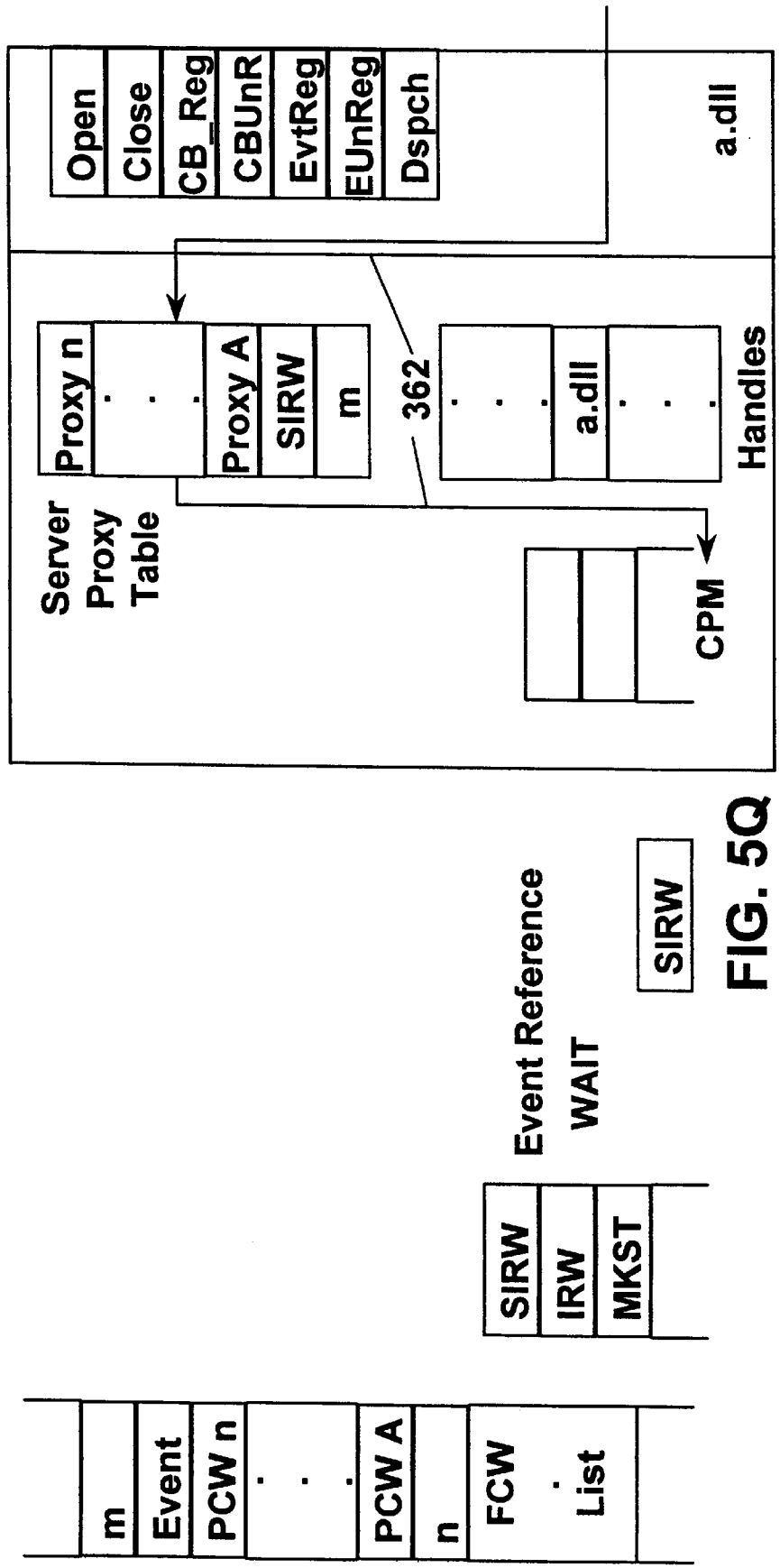
Figure 5R:
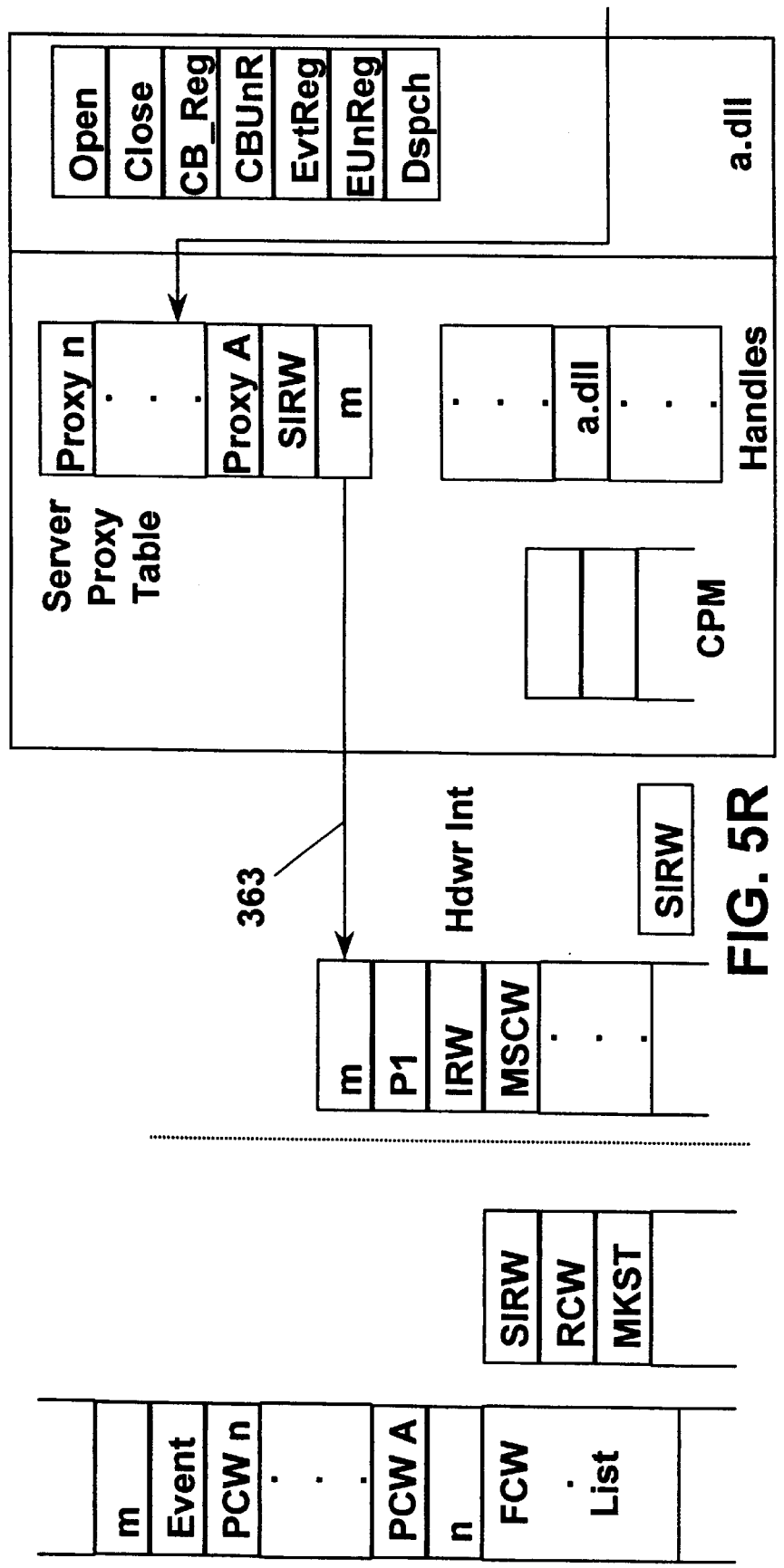
Figure 5S:
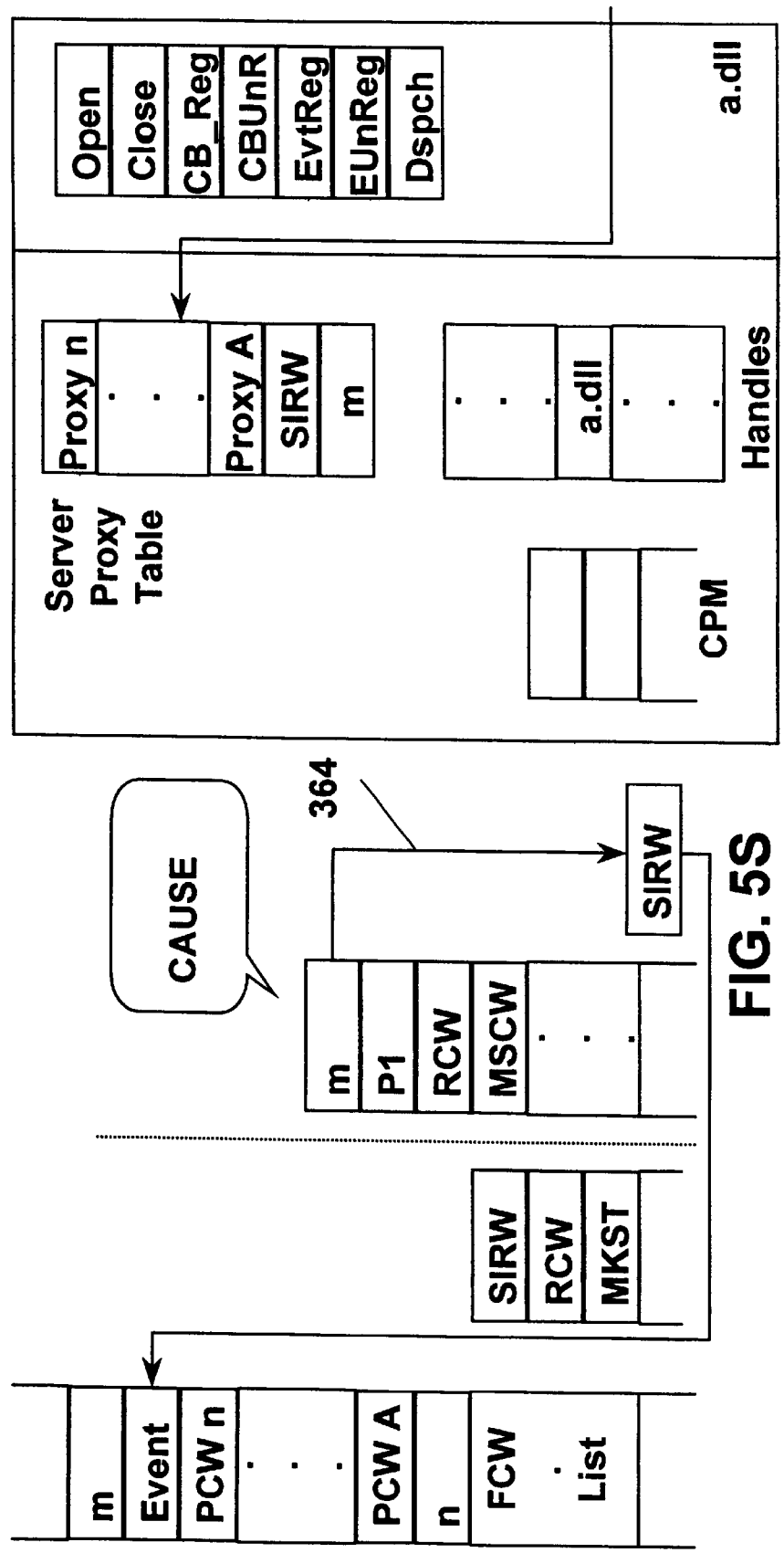
Figure 5T:
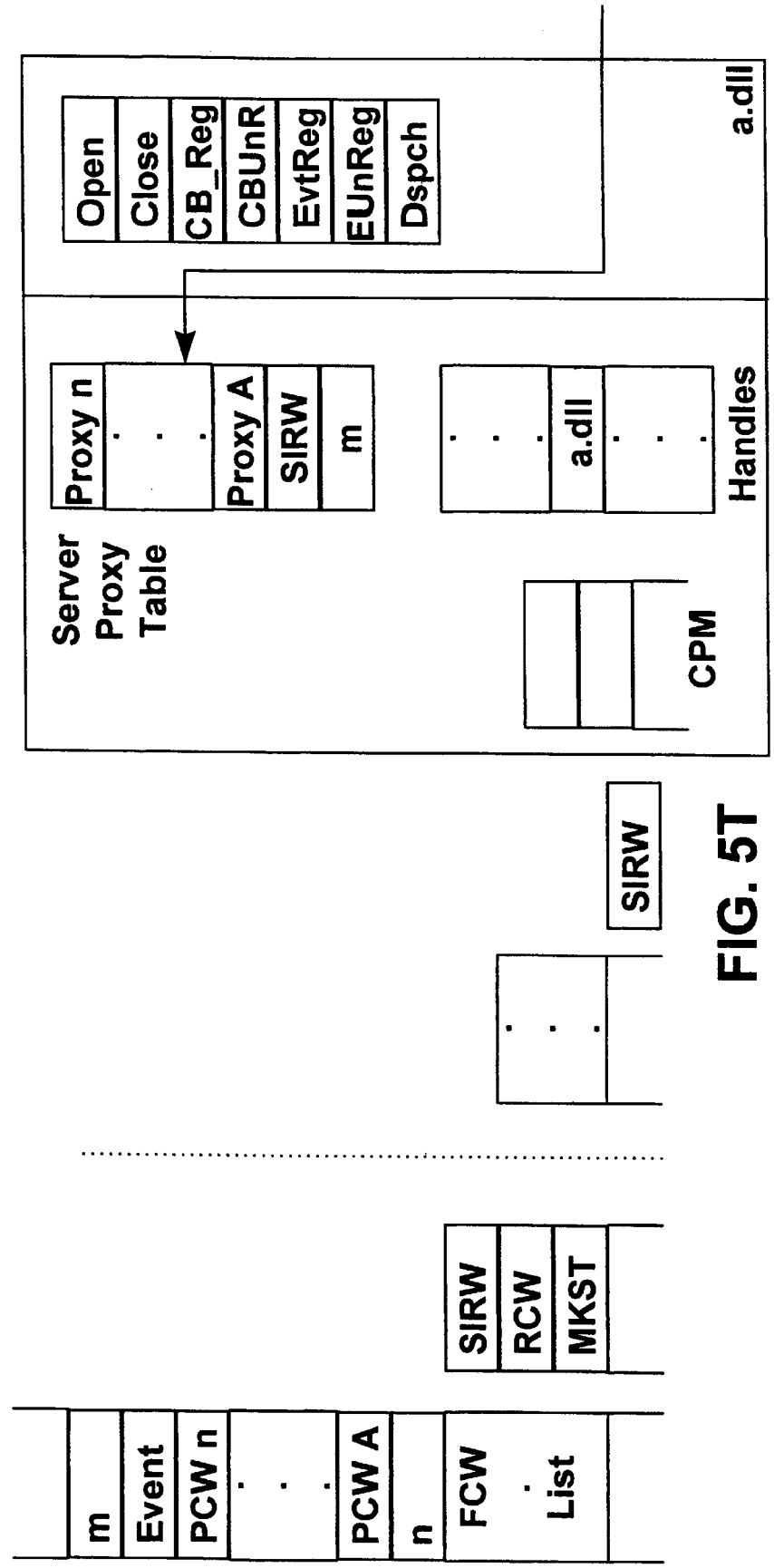

At some time later, under control of the Windows NT Operating System, a Windows NT program ha a need to invoke an MCP Client Program Server Function. When this happens, the Windows NT program invokes the appropriate Server Proxy Procedure in the Windows NT Server Program DLL. The Proxy Procedure notifies the CPU 114 that a call is needed to an MCP Client Program Server Function. An example of this is a return from an inquiry made later as to whether or not there are more Server function calls to be made (bubble 161). Next, the calling program calls the Server Program Proxy Procedure (block 162/362, FIG. 5Q). Following this, the CPU 114 causes an MCP asynchronous interrupt passing in the event number as the P2 parameter (block 163/363, FIG. 5R). The hardware interrupt handler in the MCP Operating System causes the event identified by the P2 parameter (block 164/364, FIG. 5S).

Figure 5U:
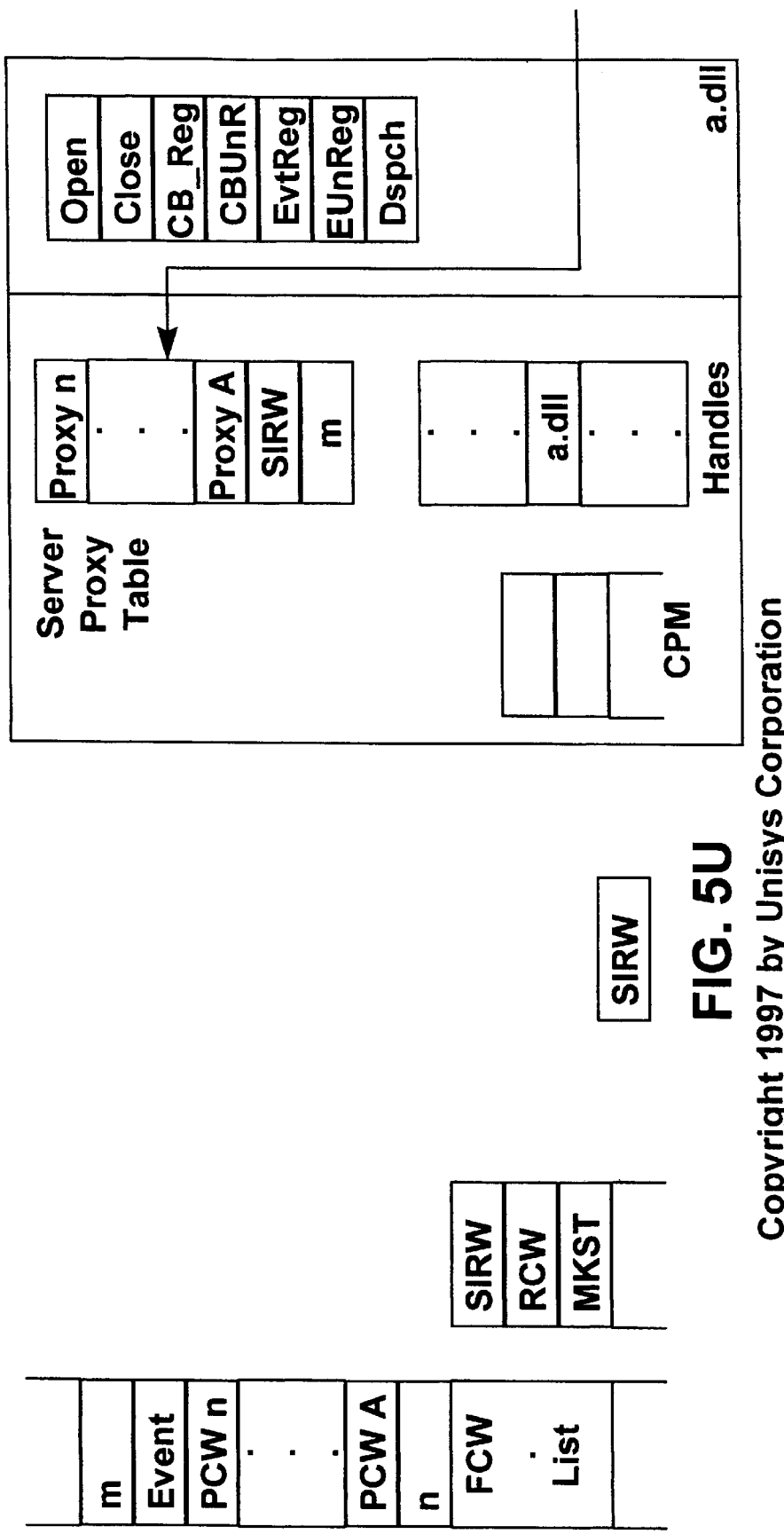
Figure 5A:
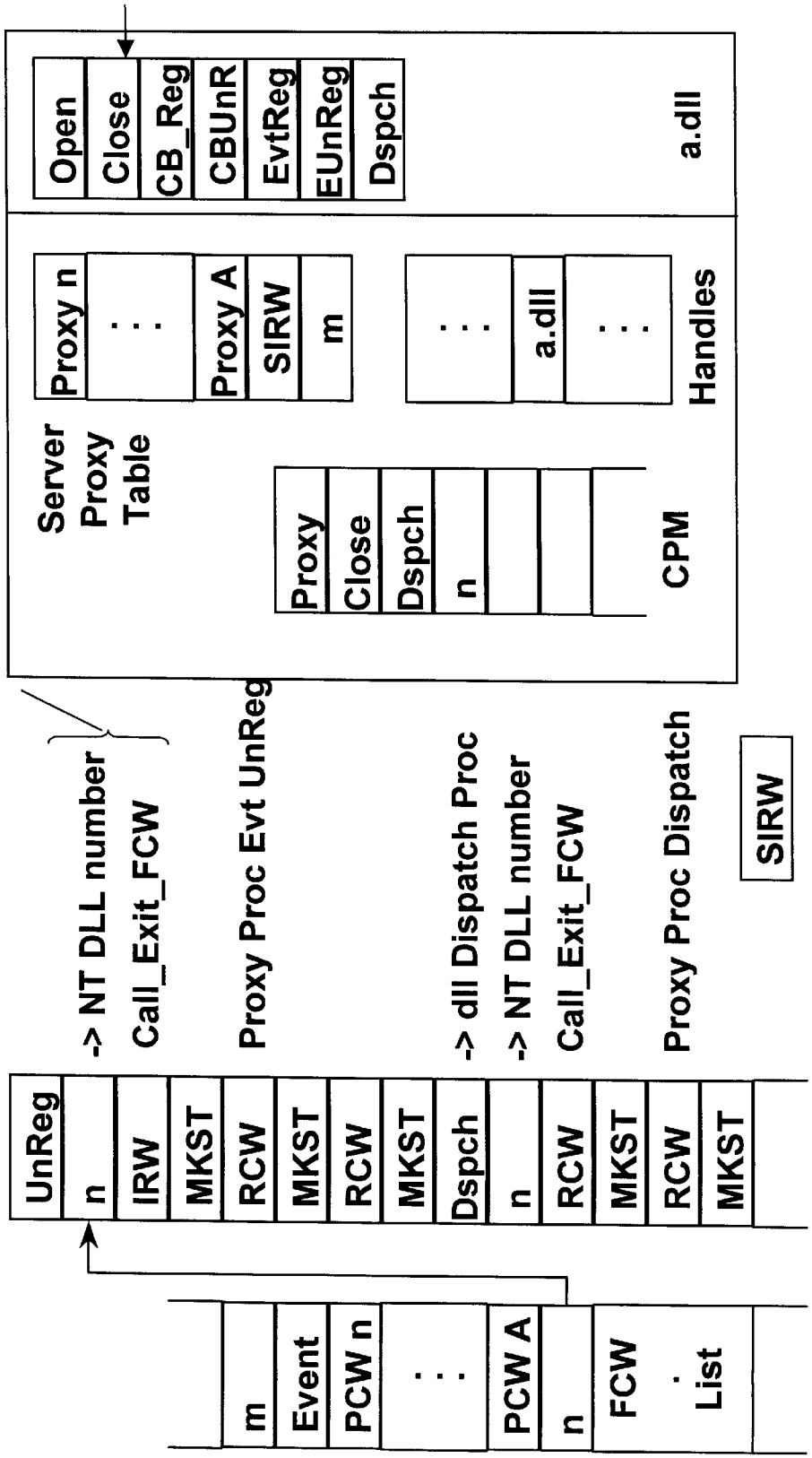
Figure 5A:
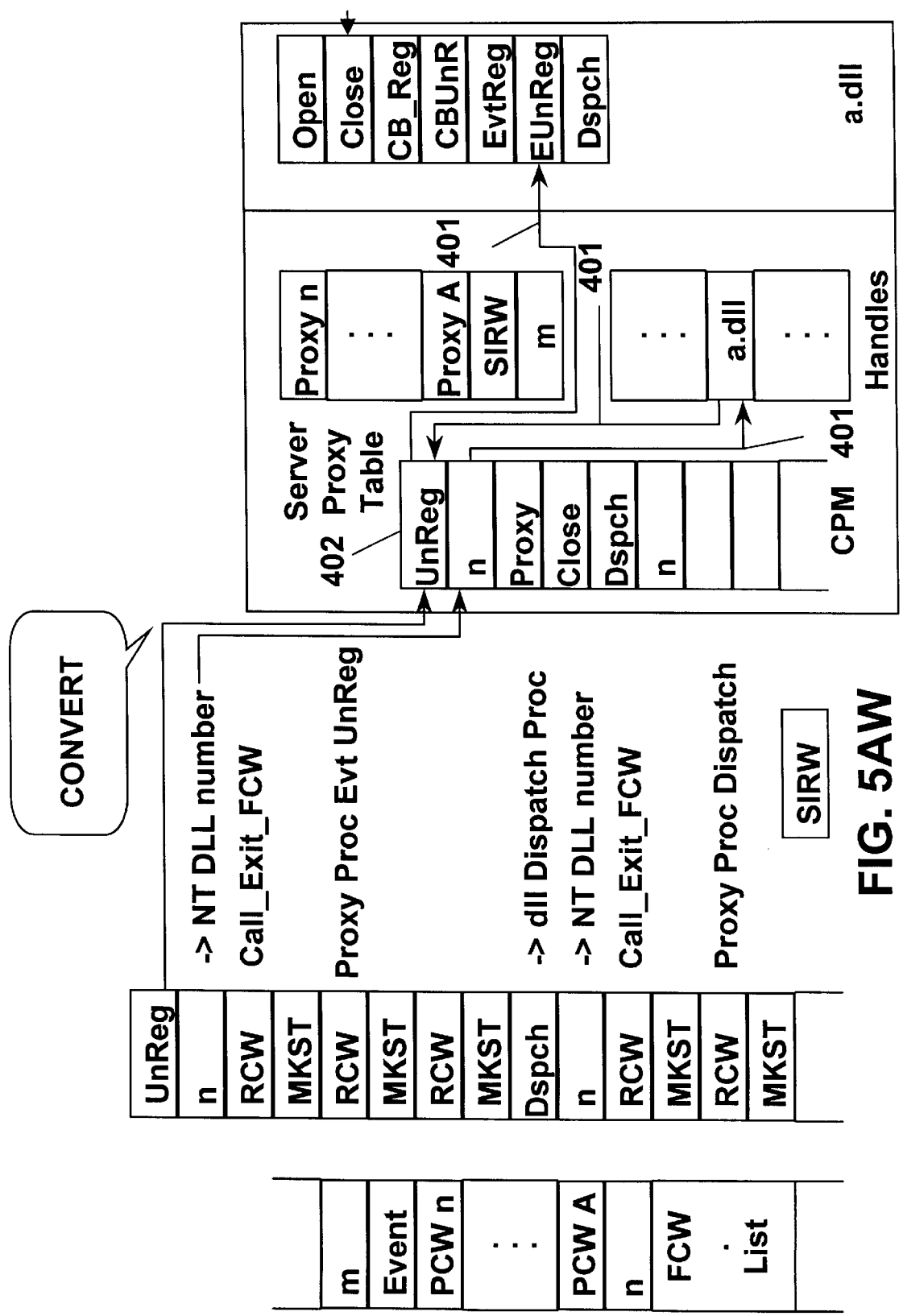
Figure 5X:
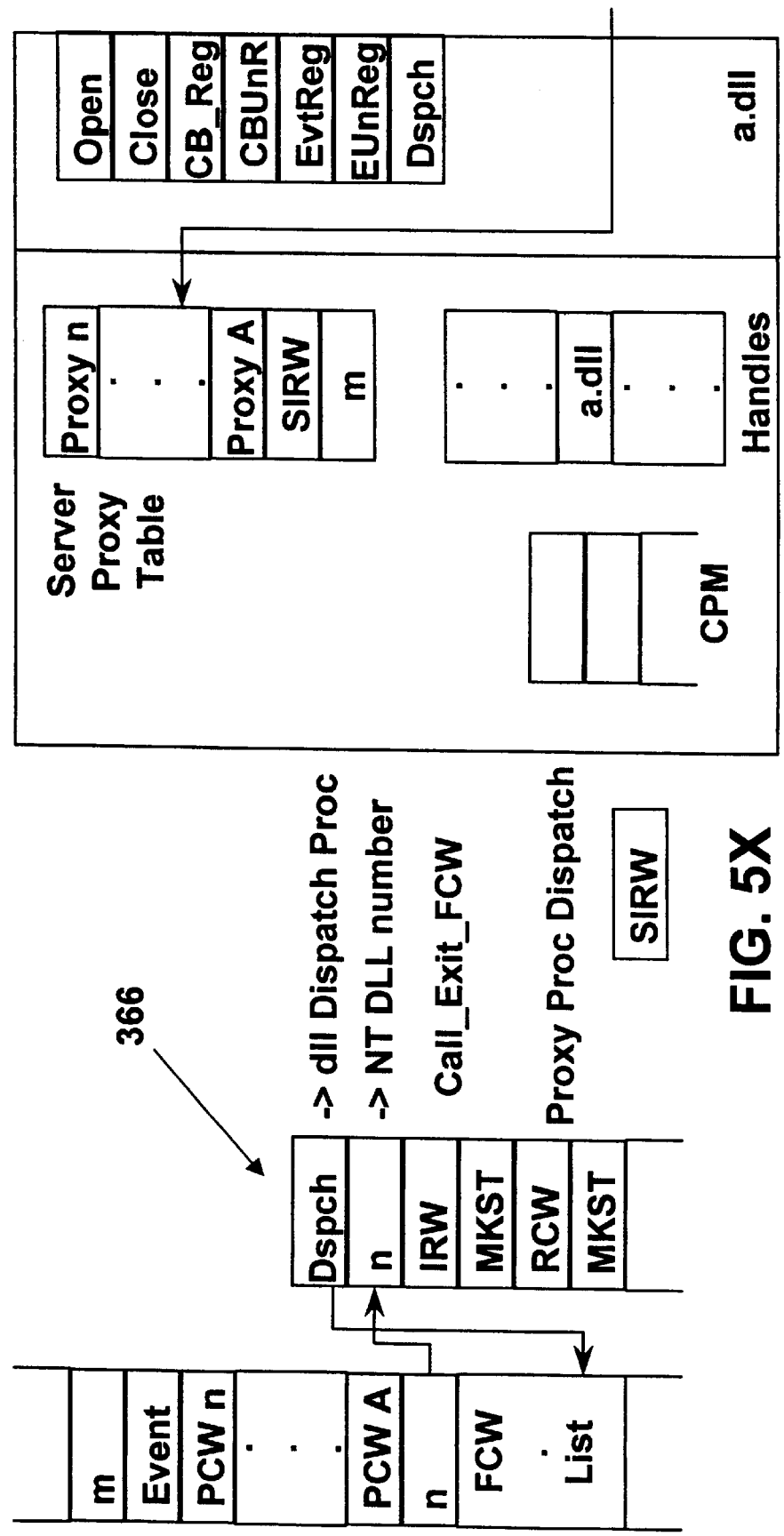
Figure 5Y:
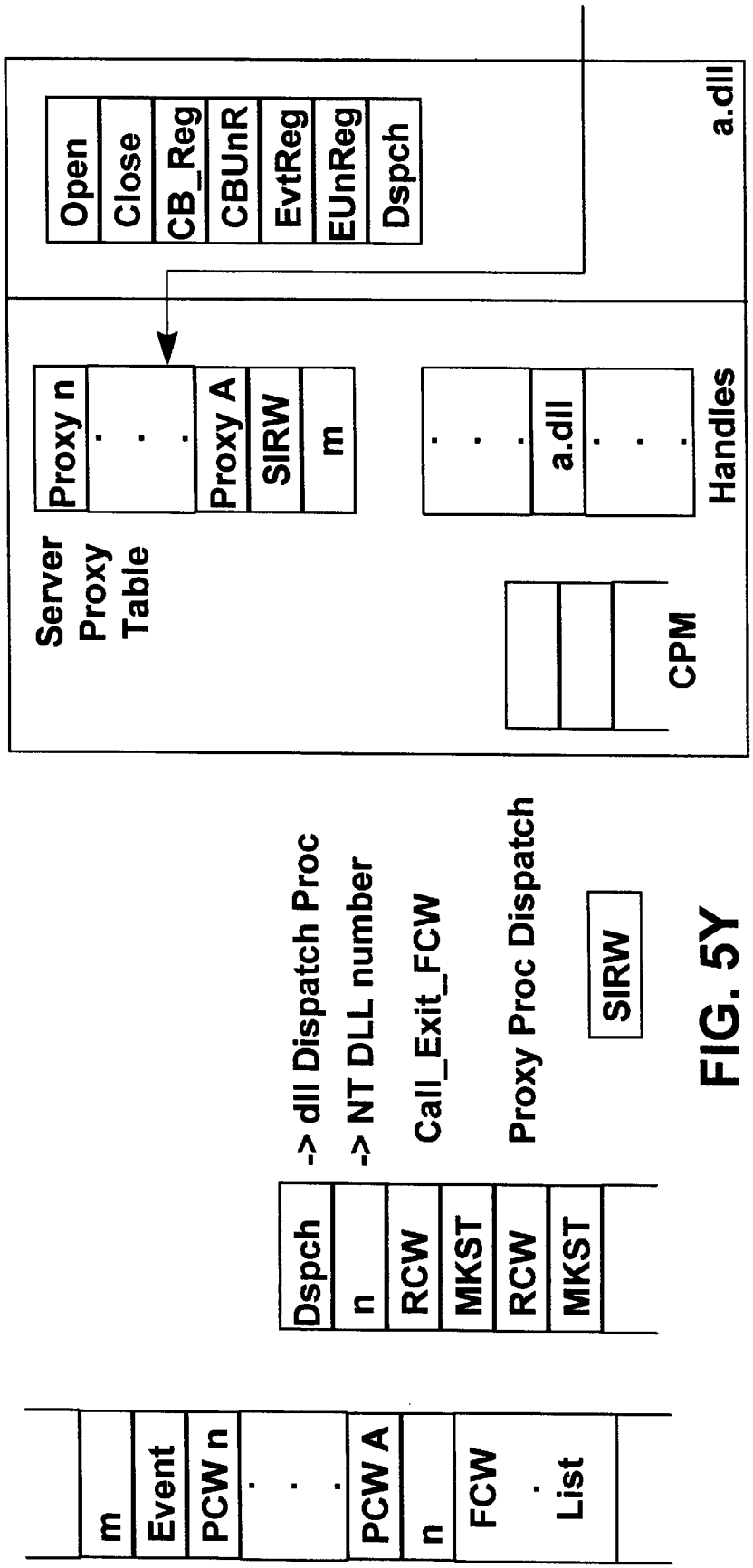
Figure 5Z:
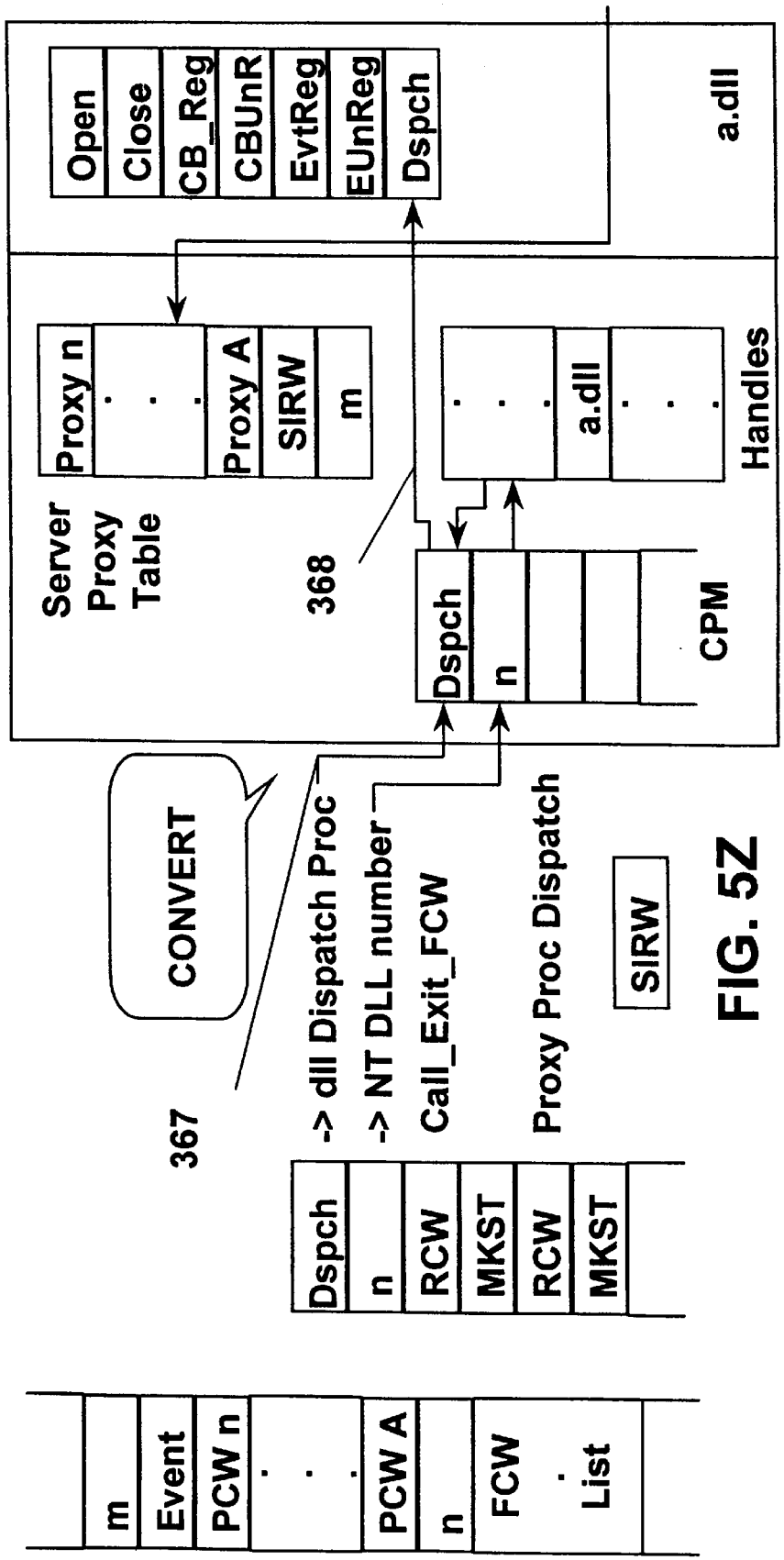
Figure 5A:
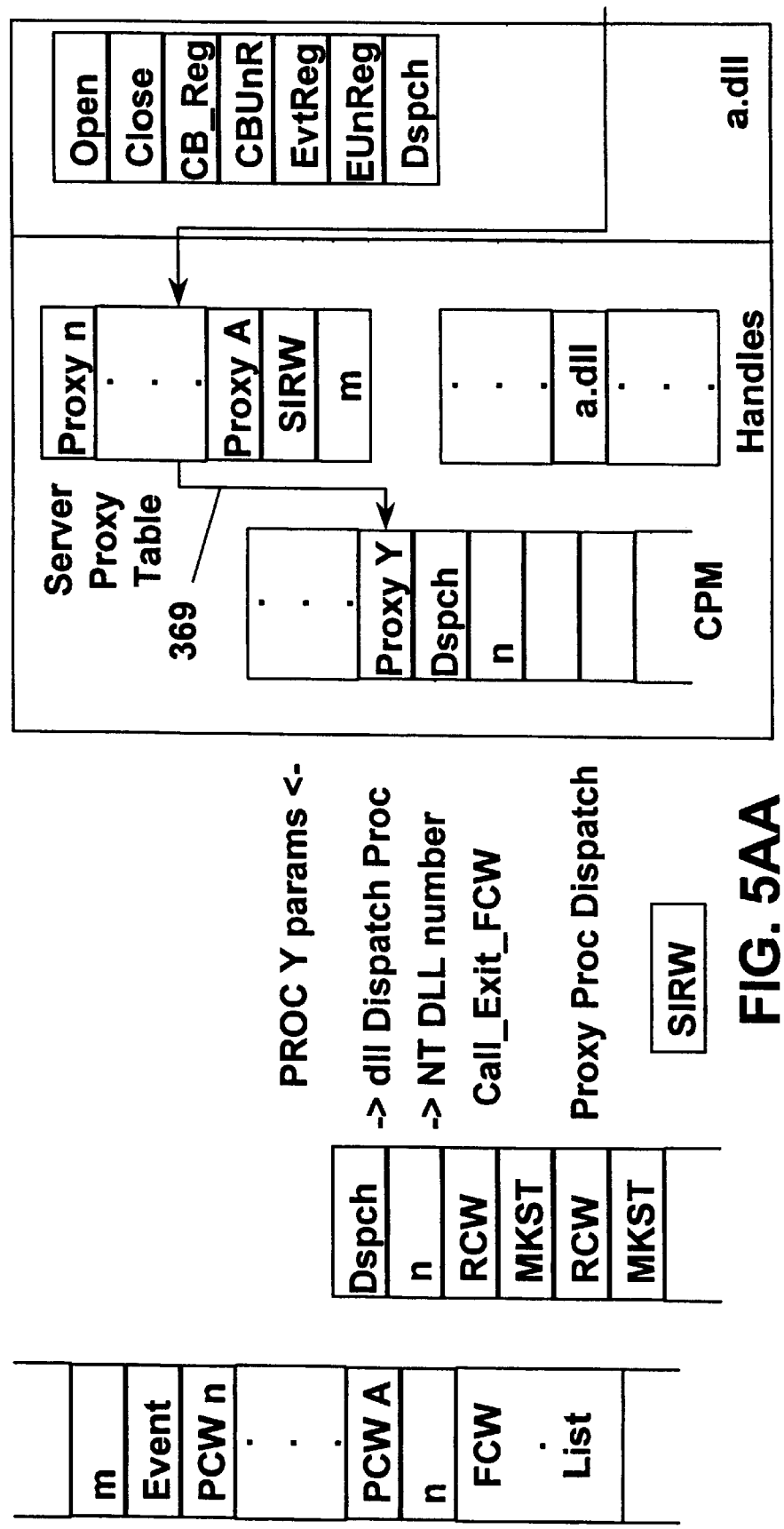
Figure 5A:
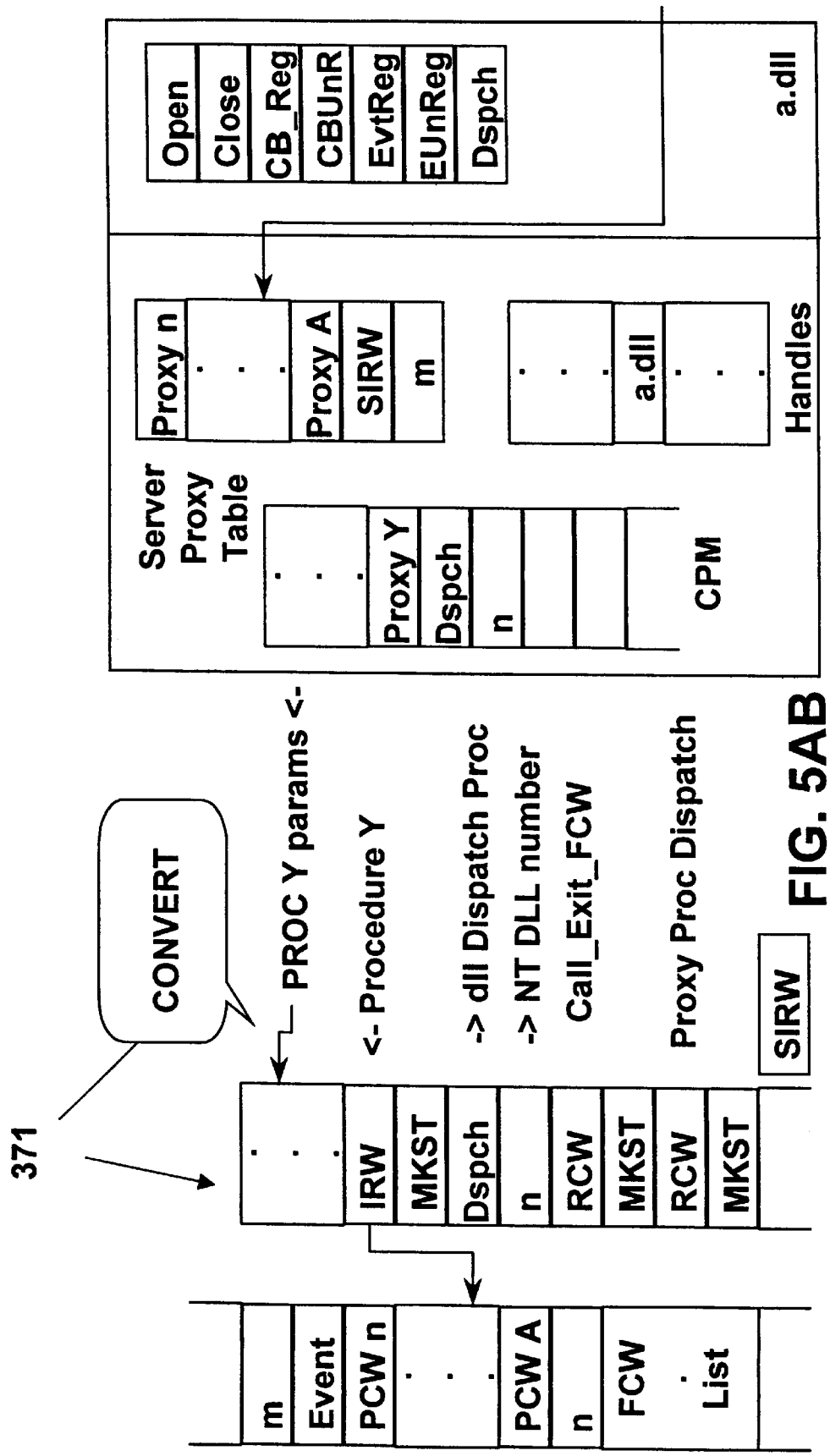
Figure 5A:
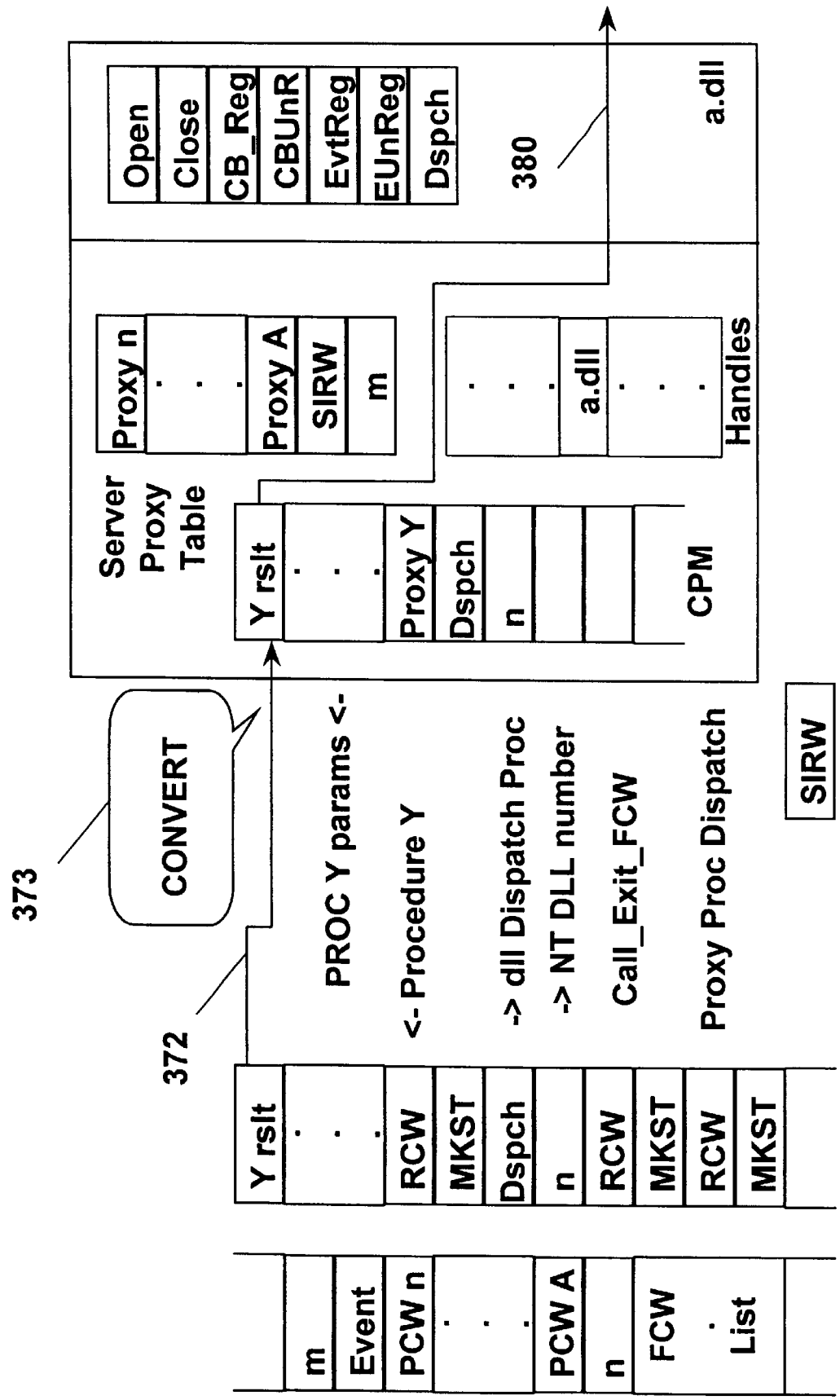
Figure 5A:
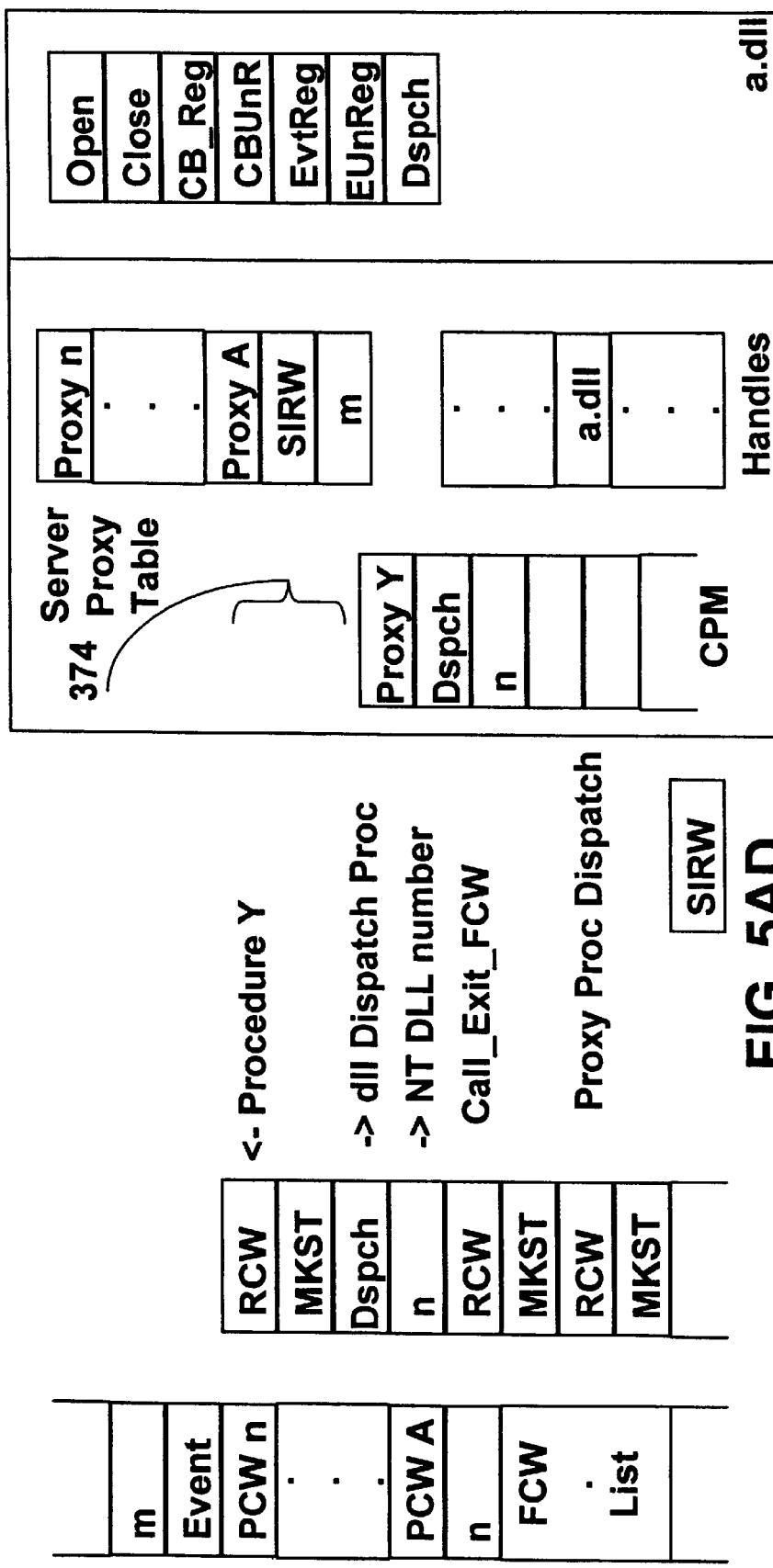
Figure 5A:
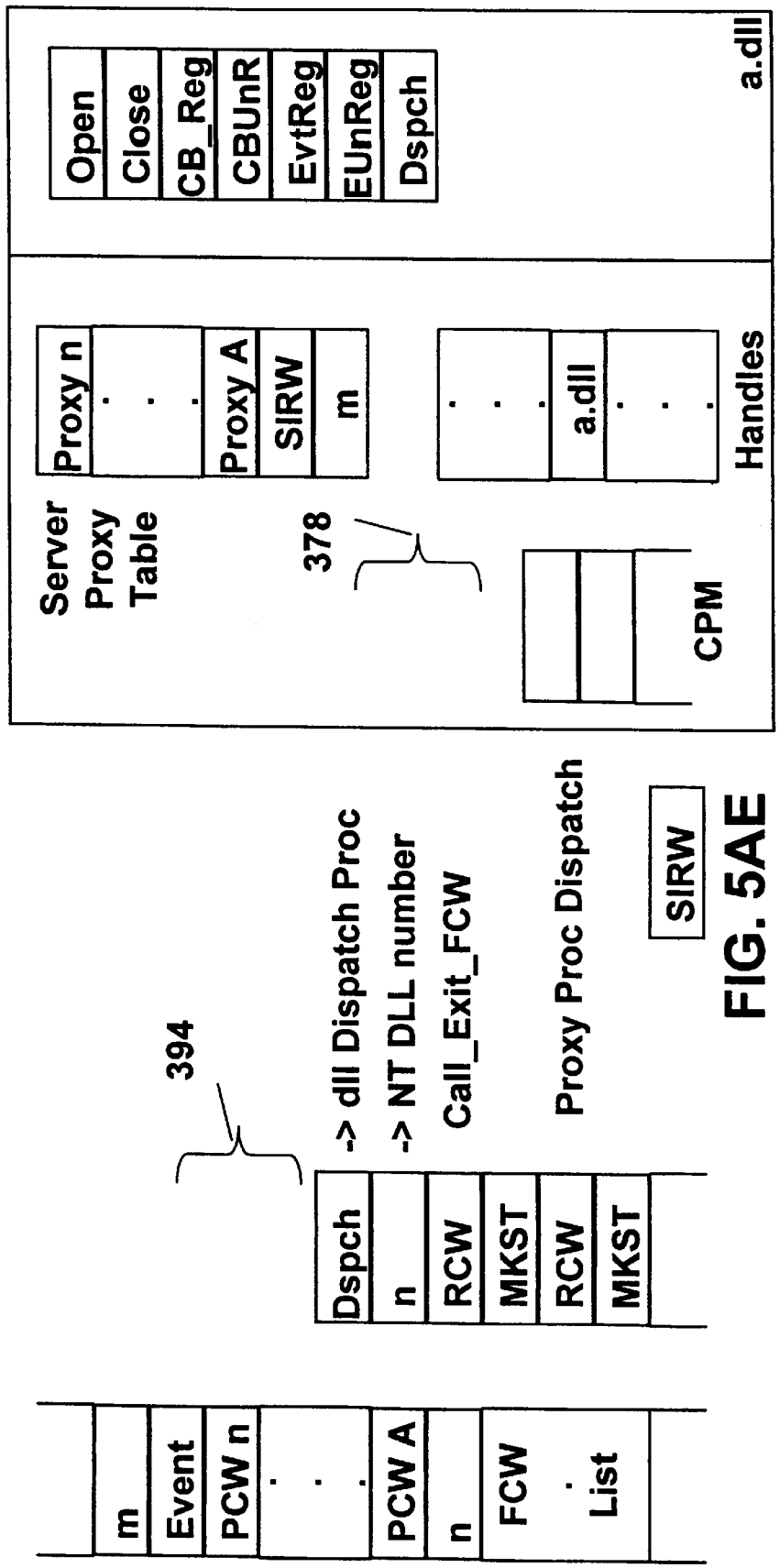
Figure 5A:
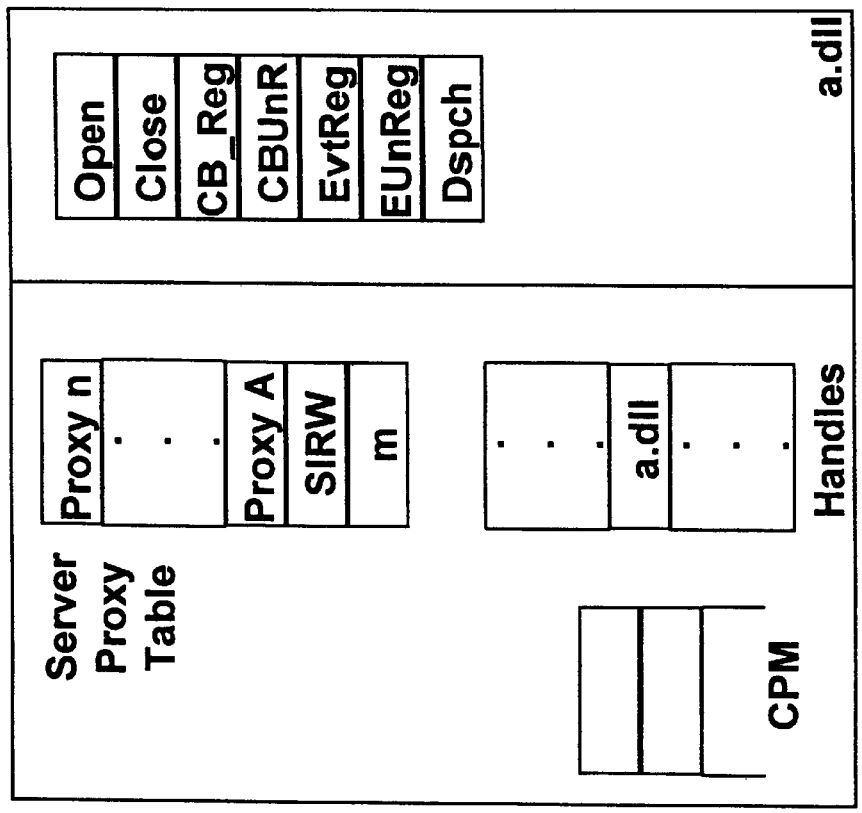
Figure 5A:
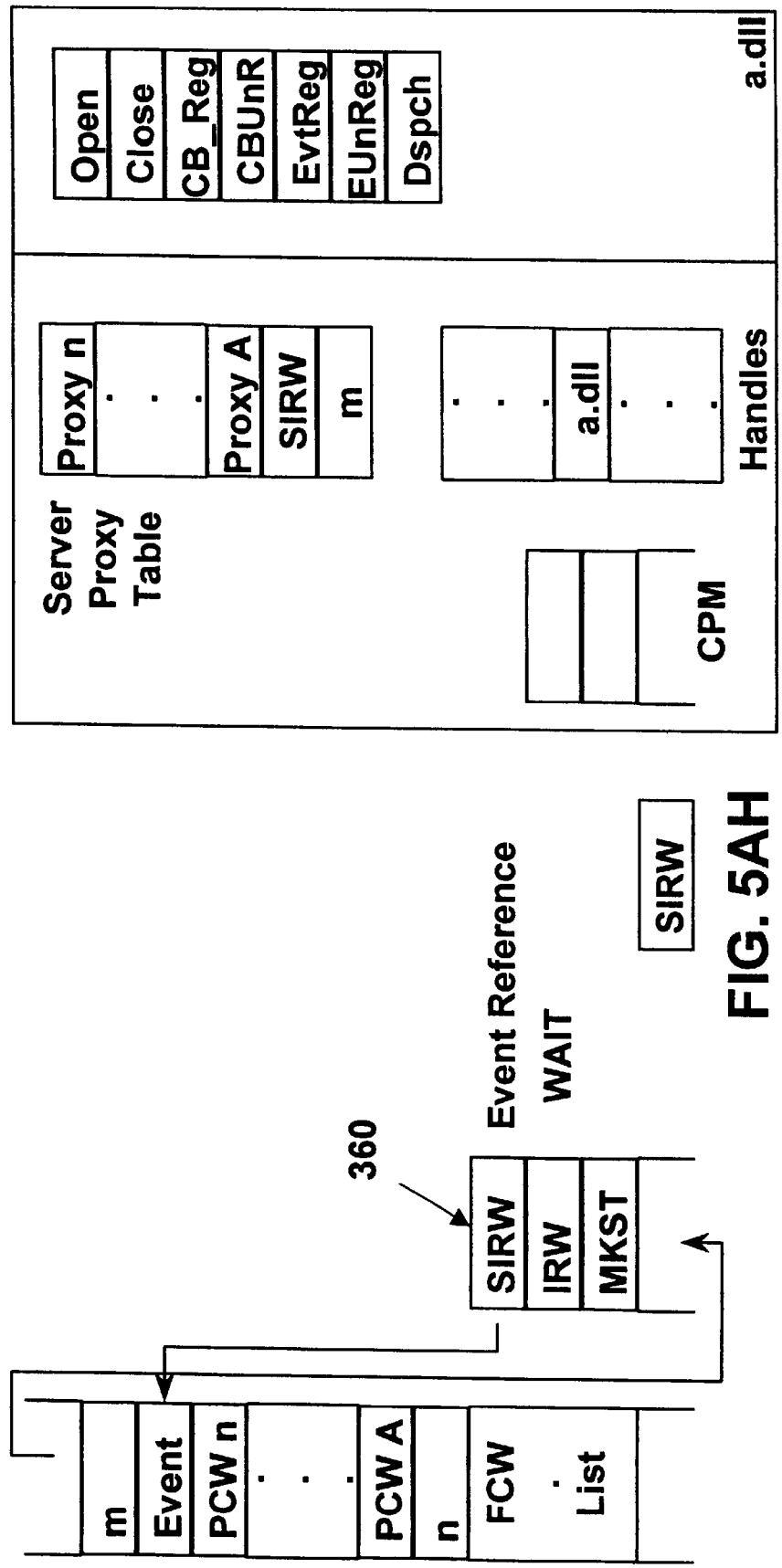
Figure 5A:
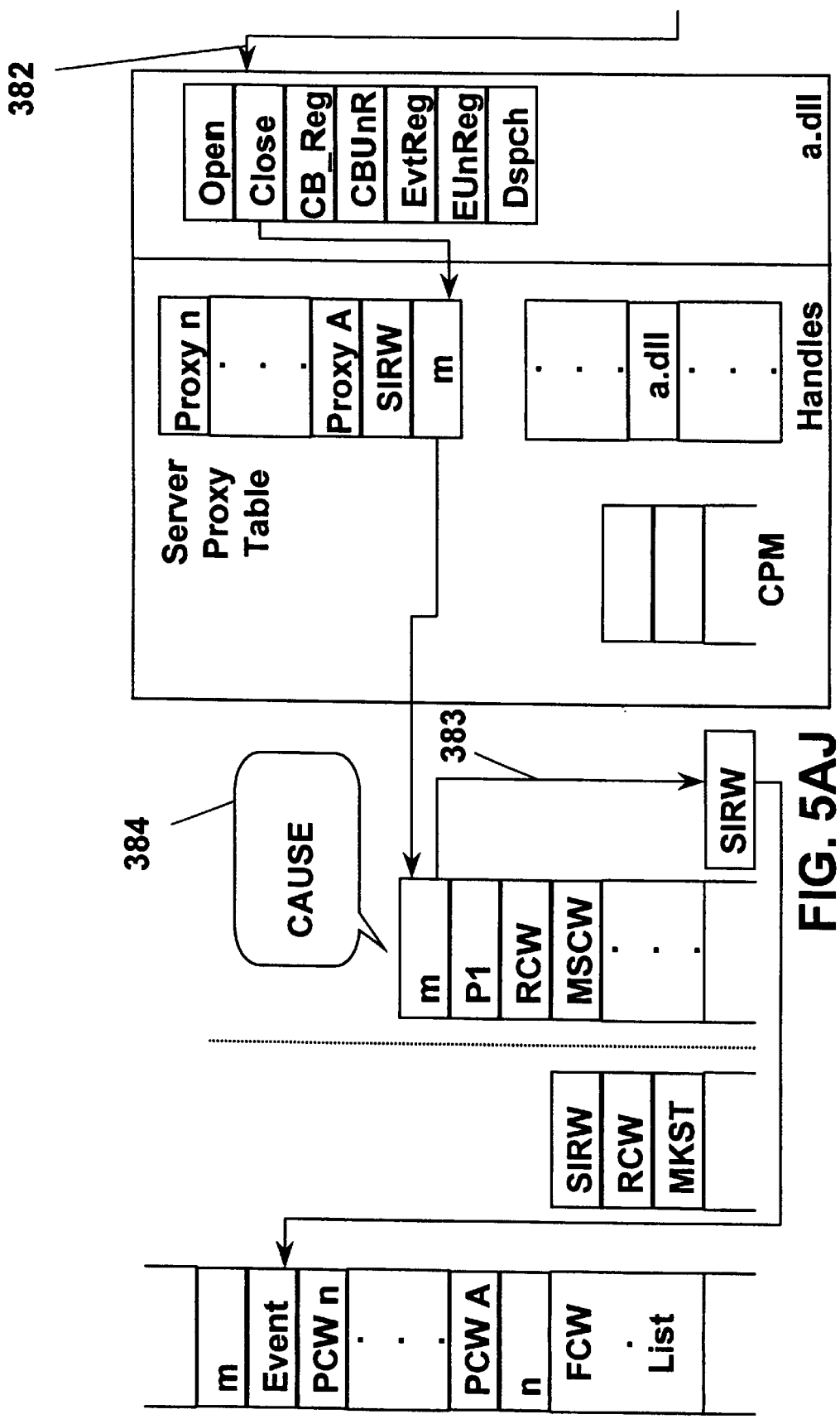
Figure 5A:
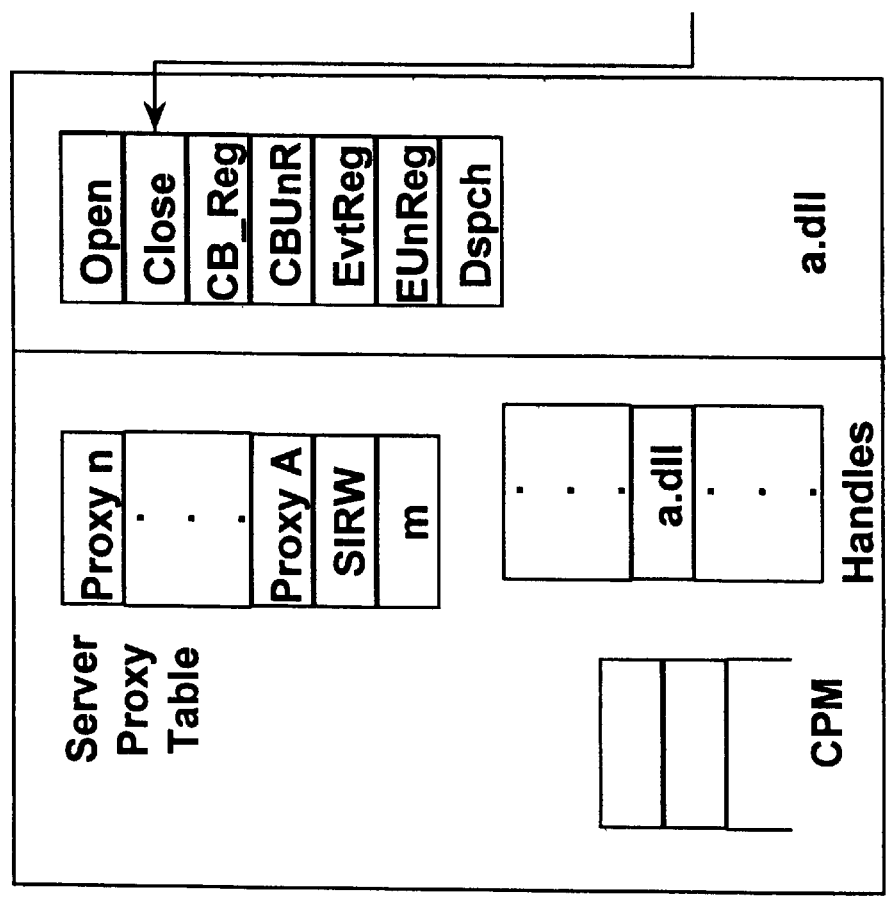
Figure 5A:
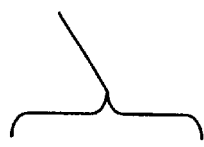
Figure 5A:
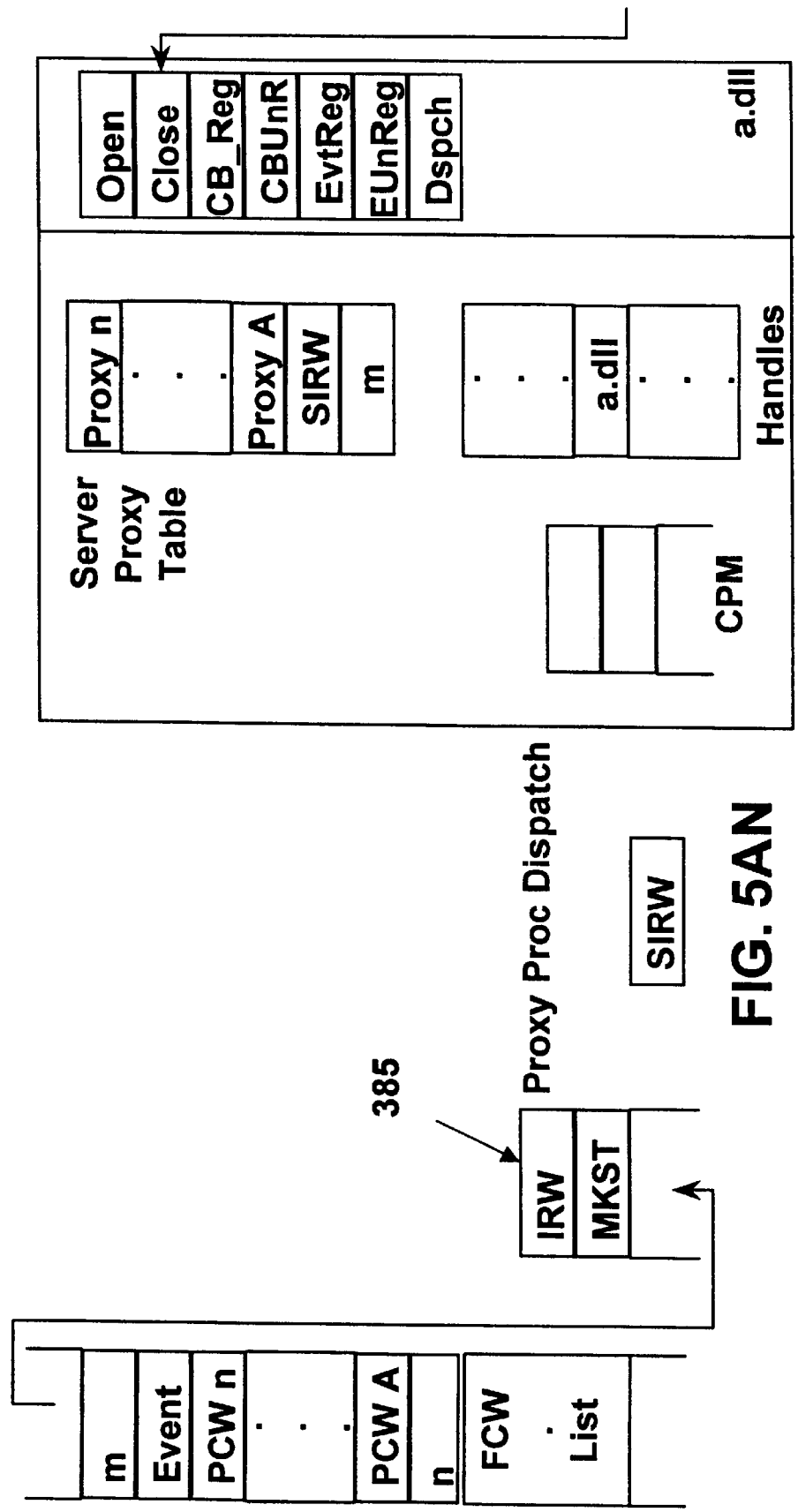
Figure 5A:
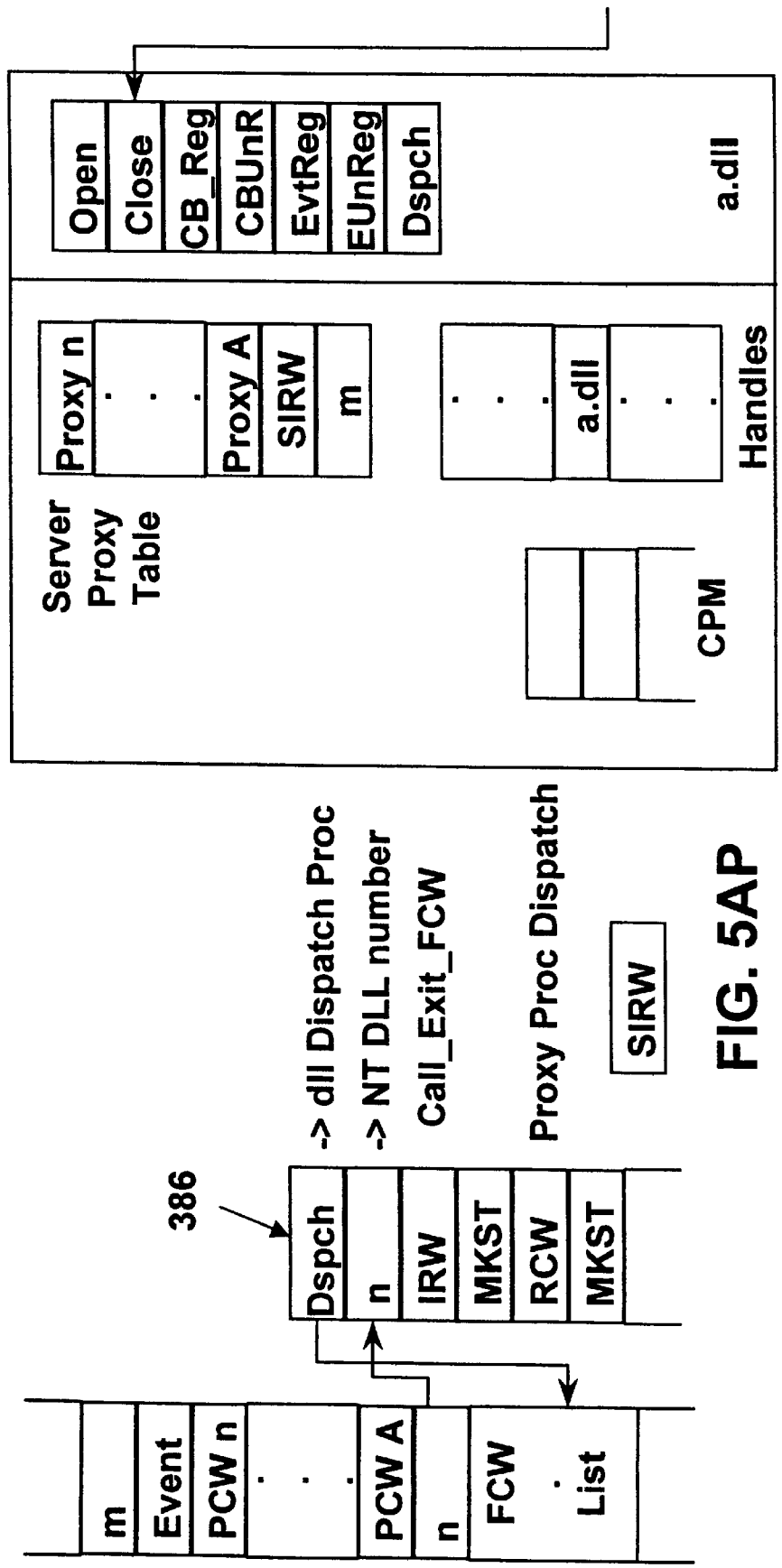
Figure 5A:
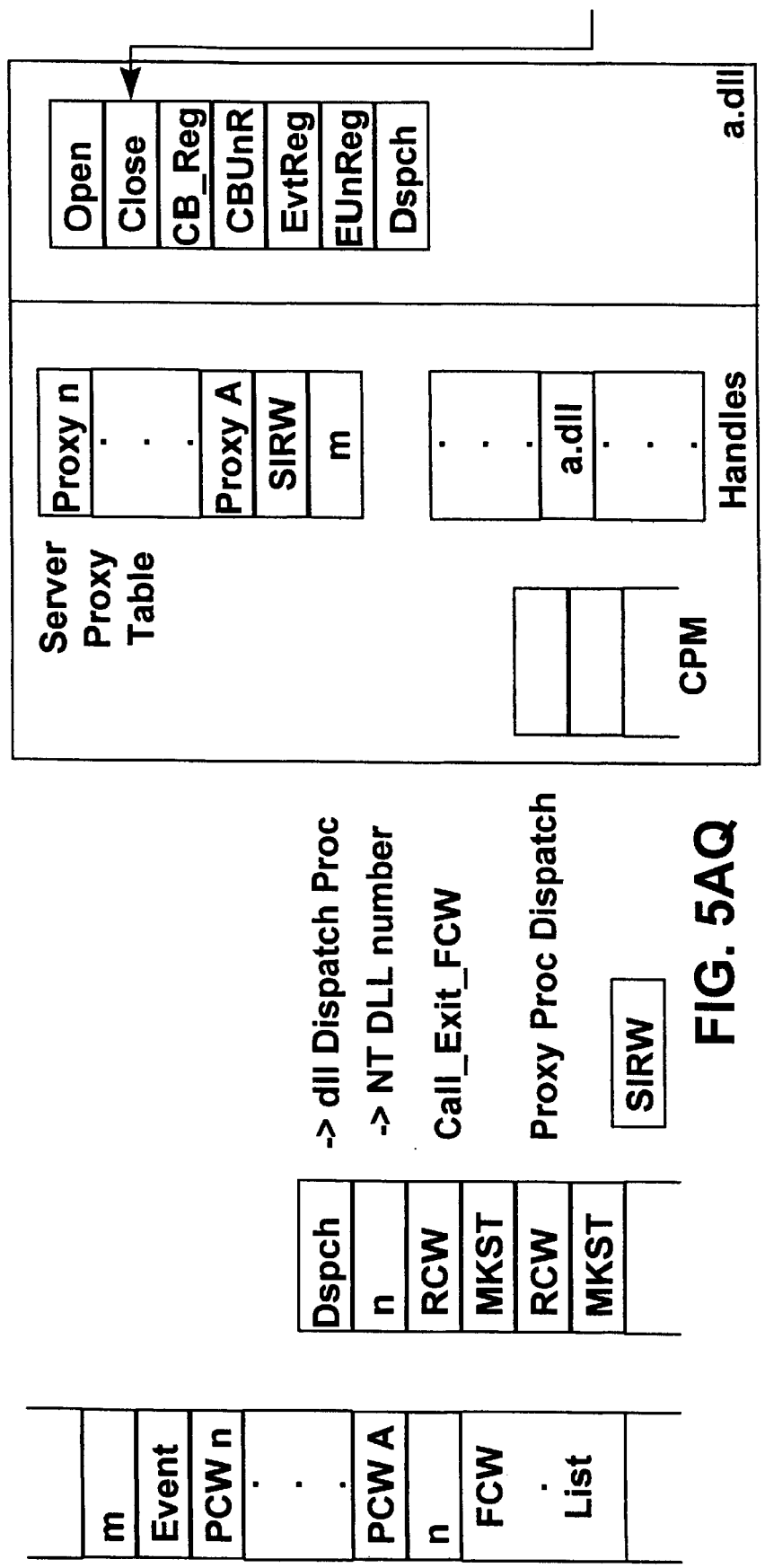
Figure 5A:
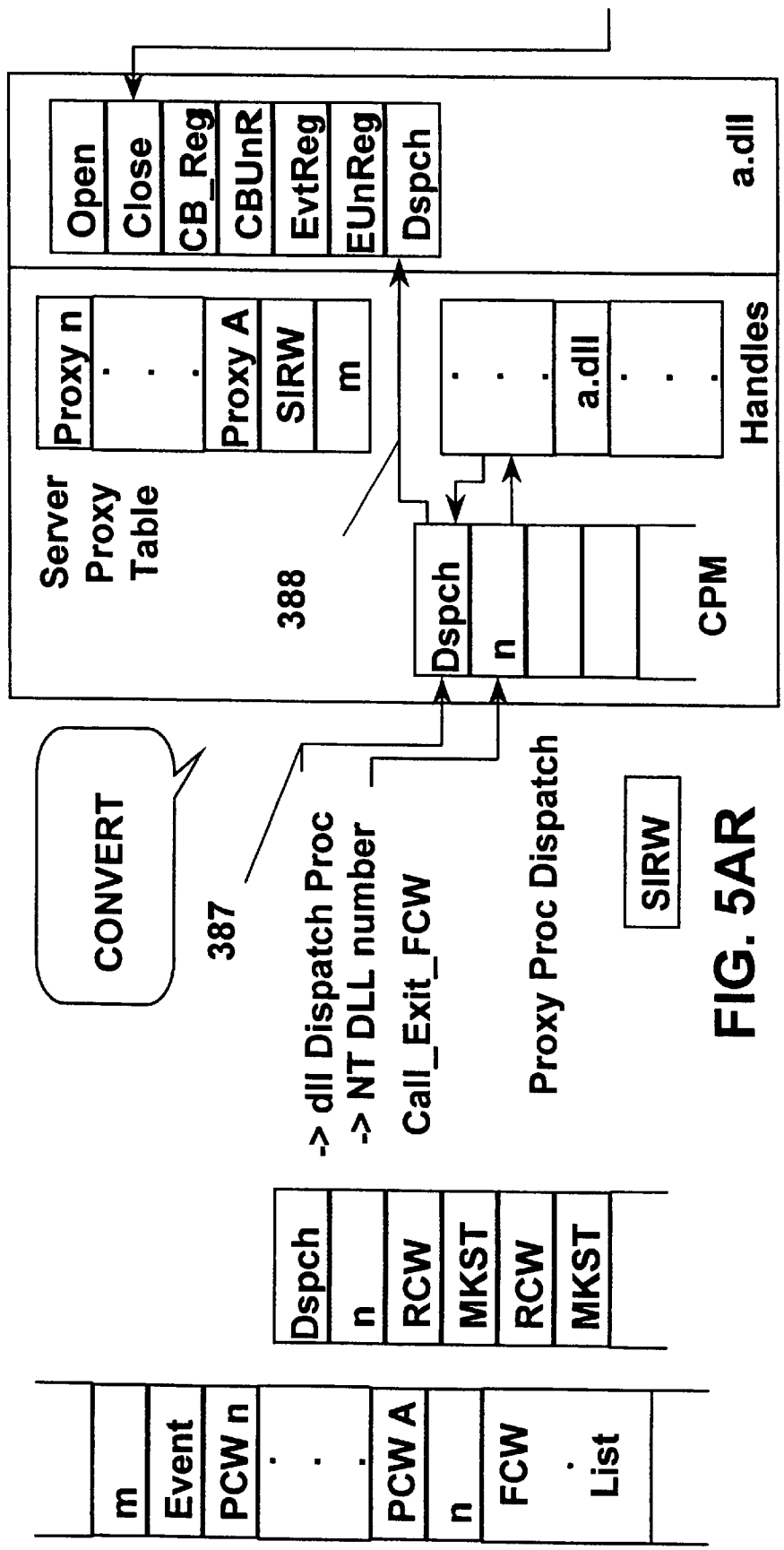
Figure 5A:
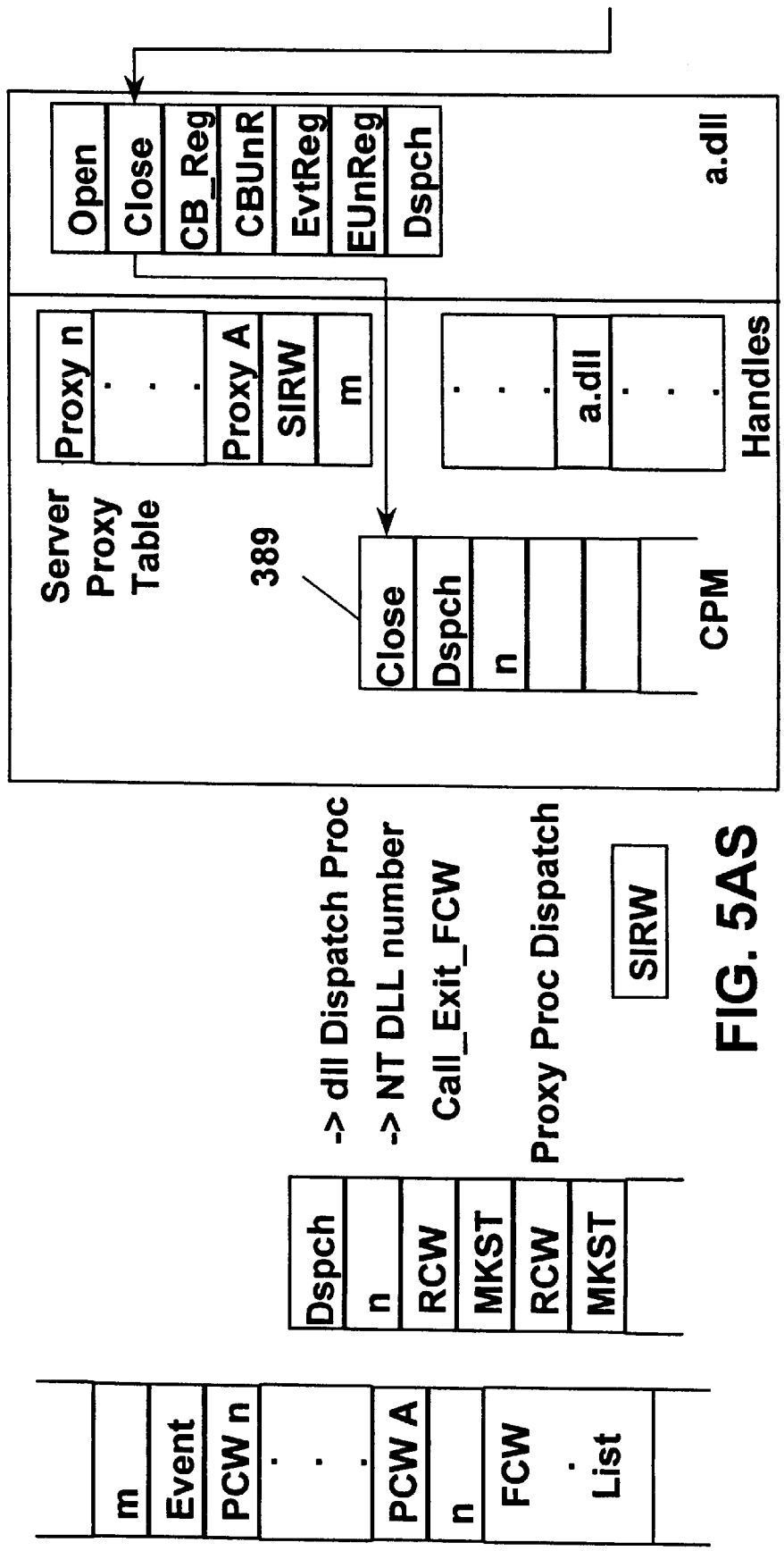
Figure 5A:
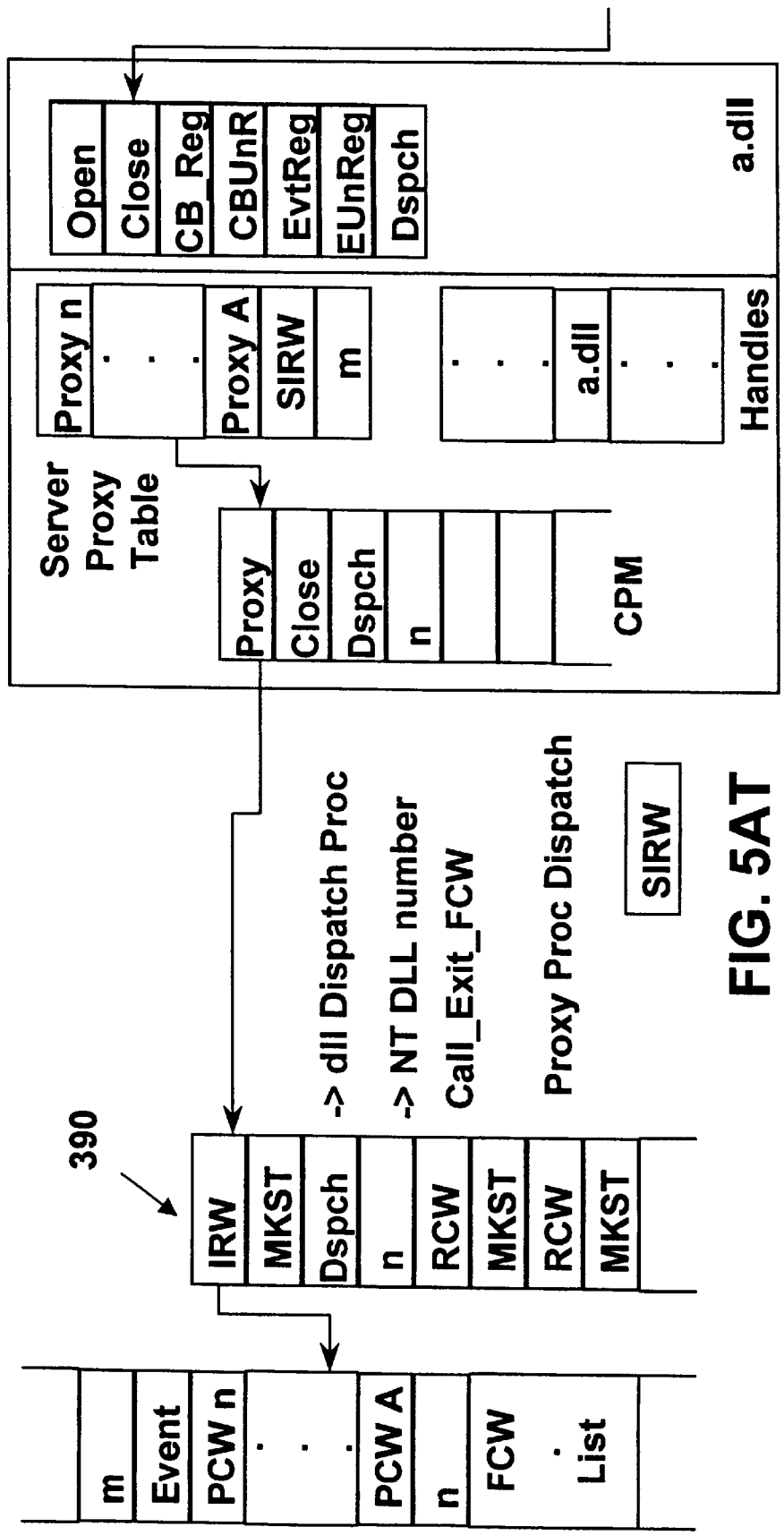
Figure 5A:
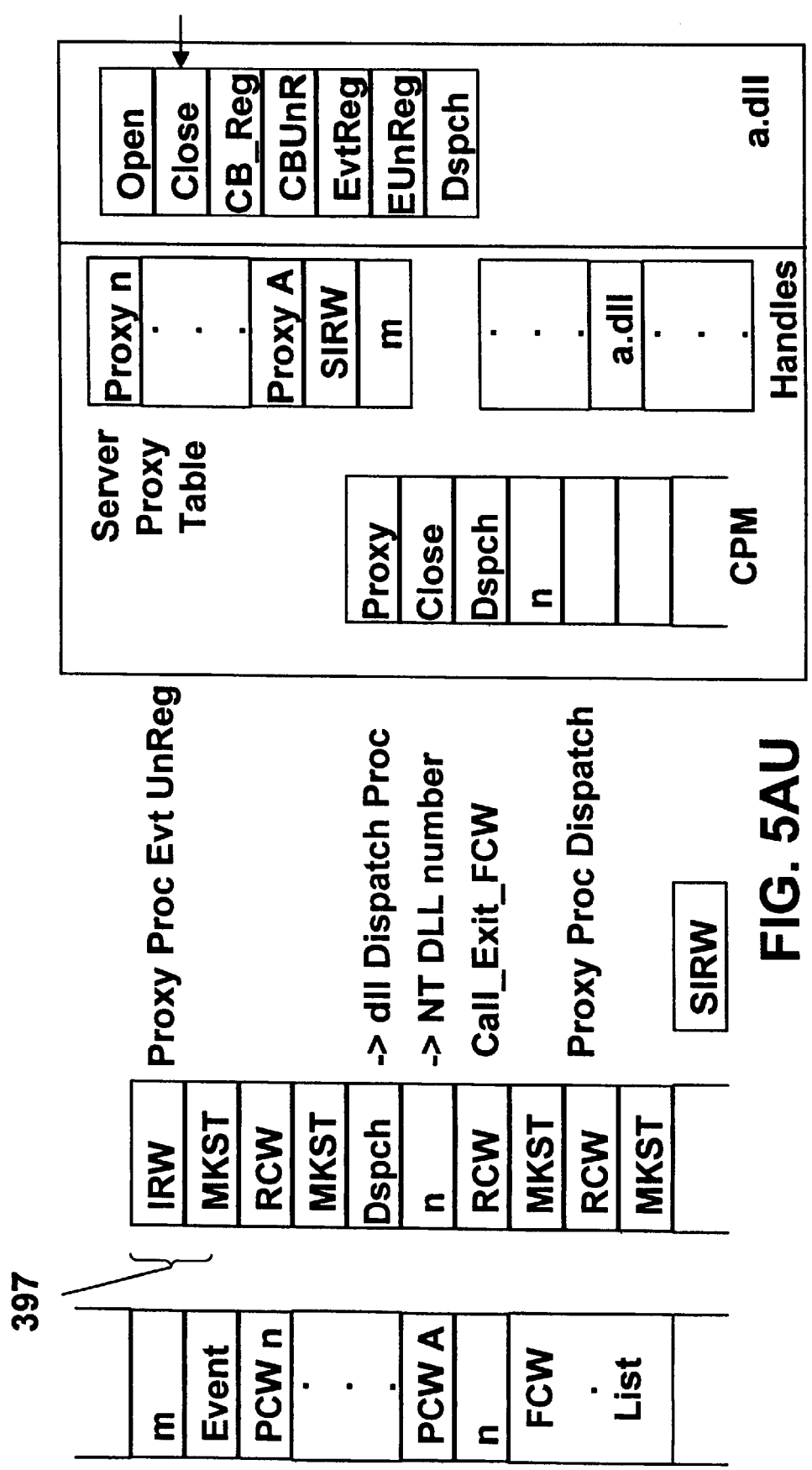
Figure 5A:
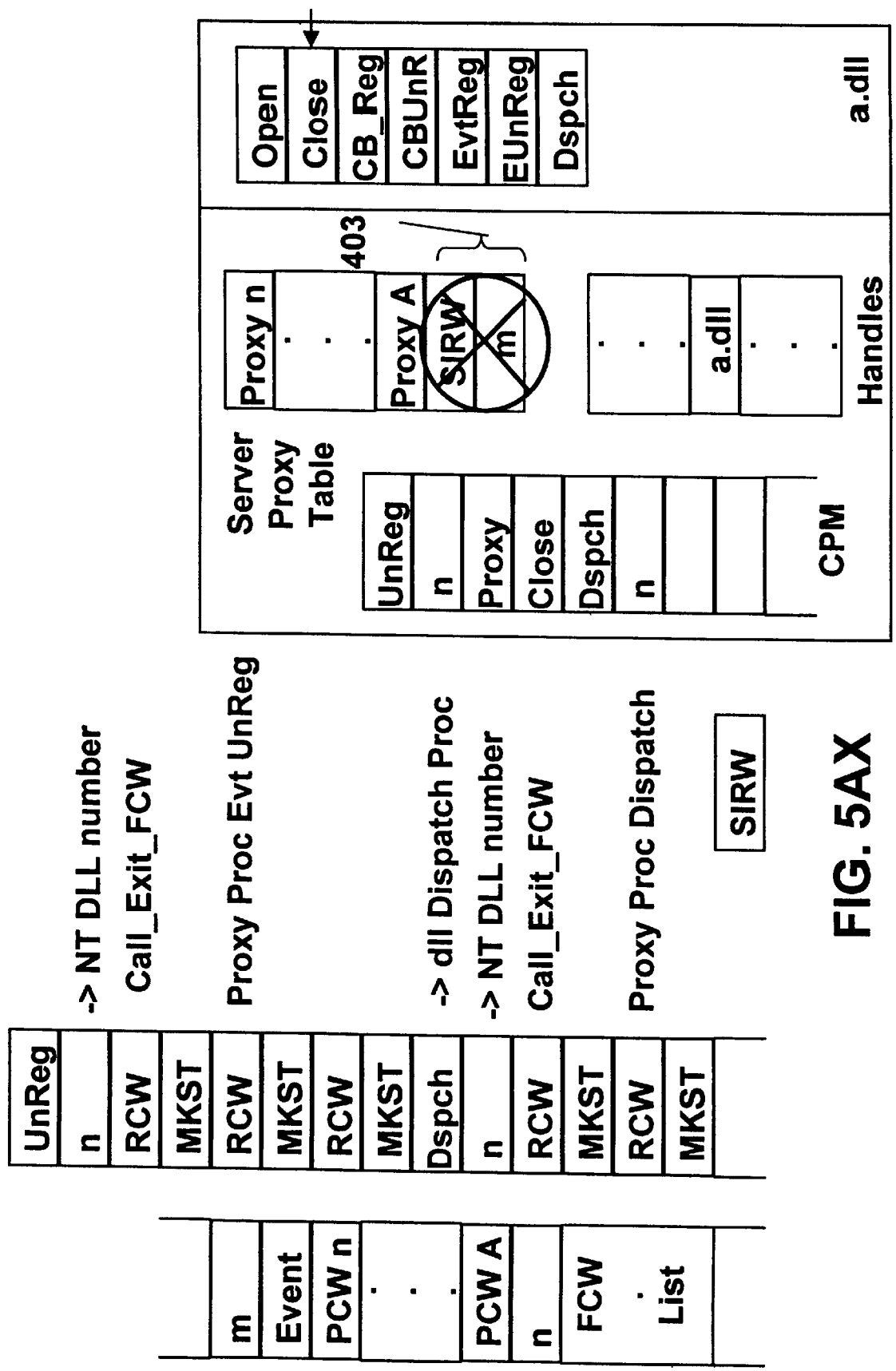
Figure 5A:
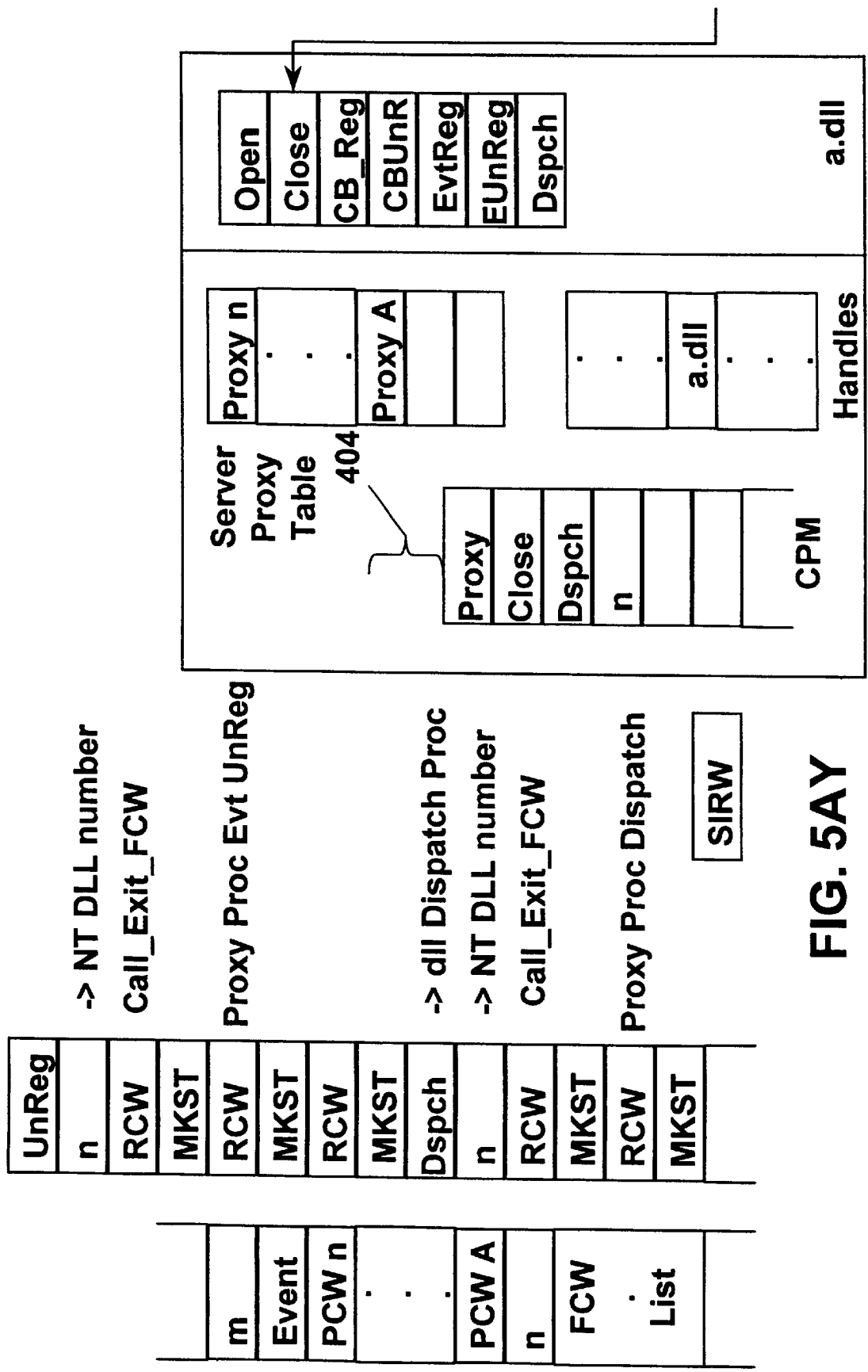
Figure 5A:
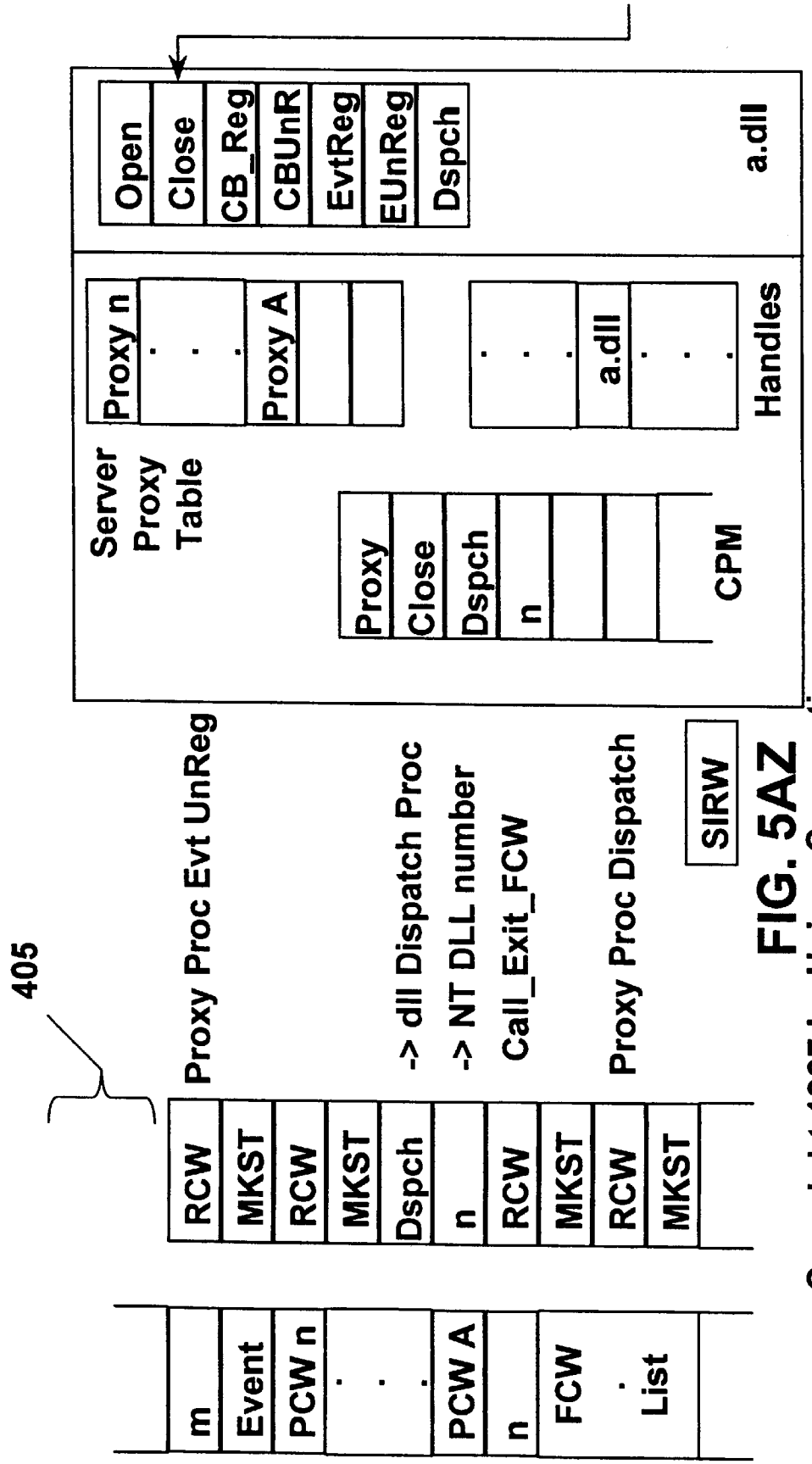
Figure 5B:
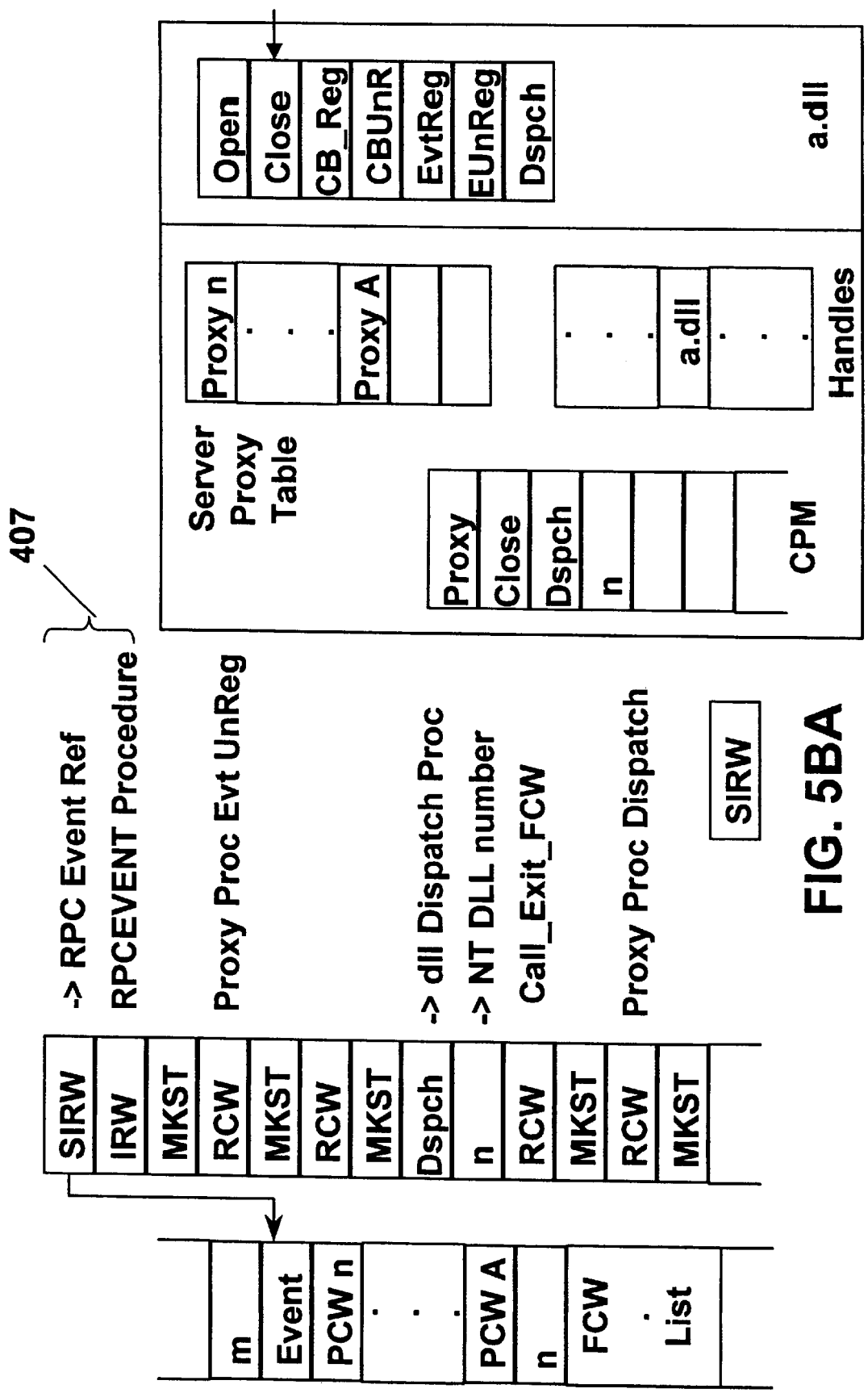
Figure 5B:
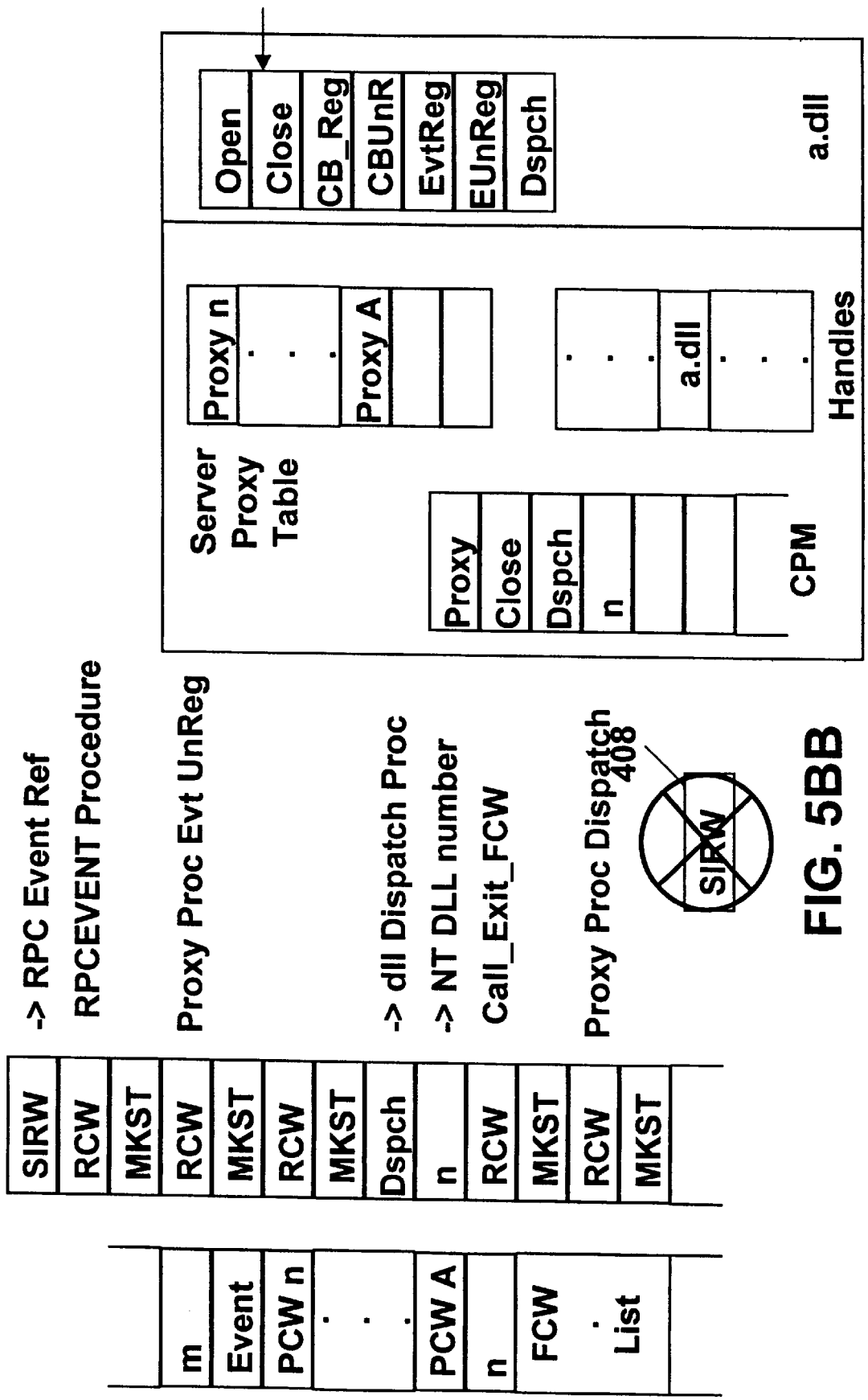
Figure 5B:
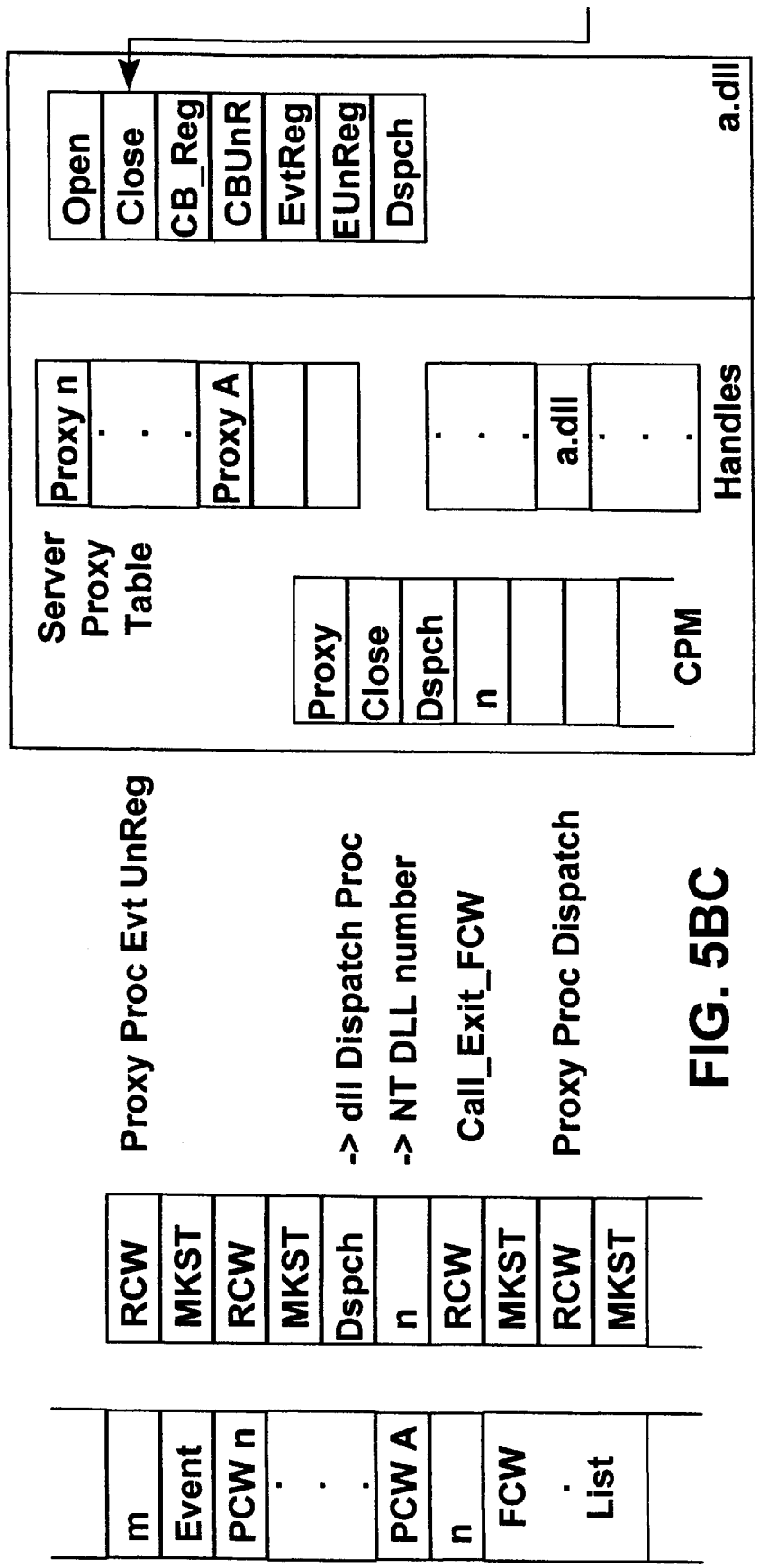
Figure 5B:
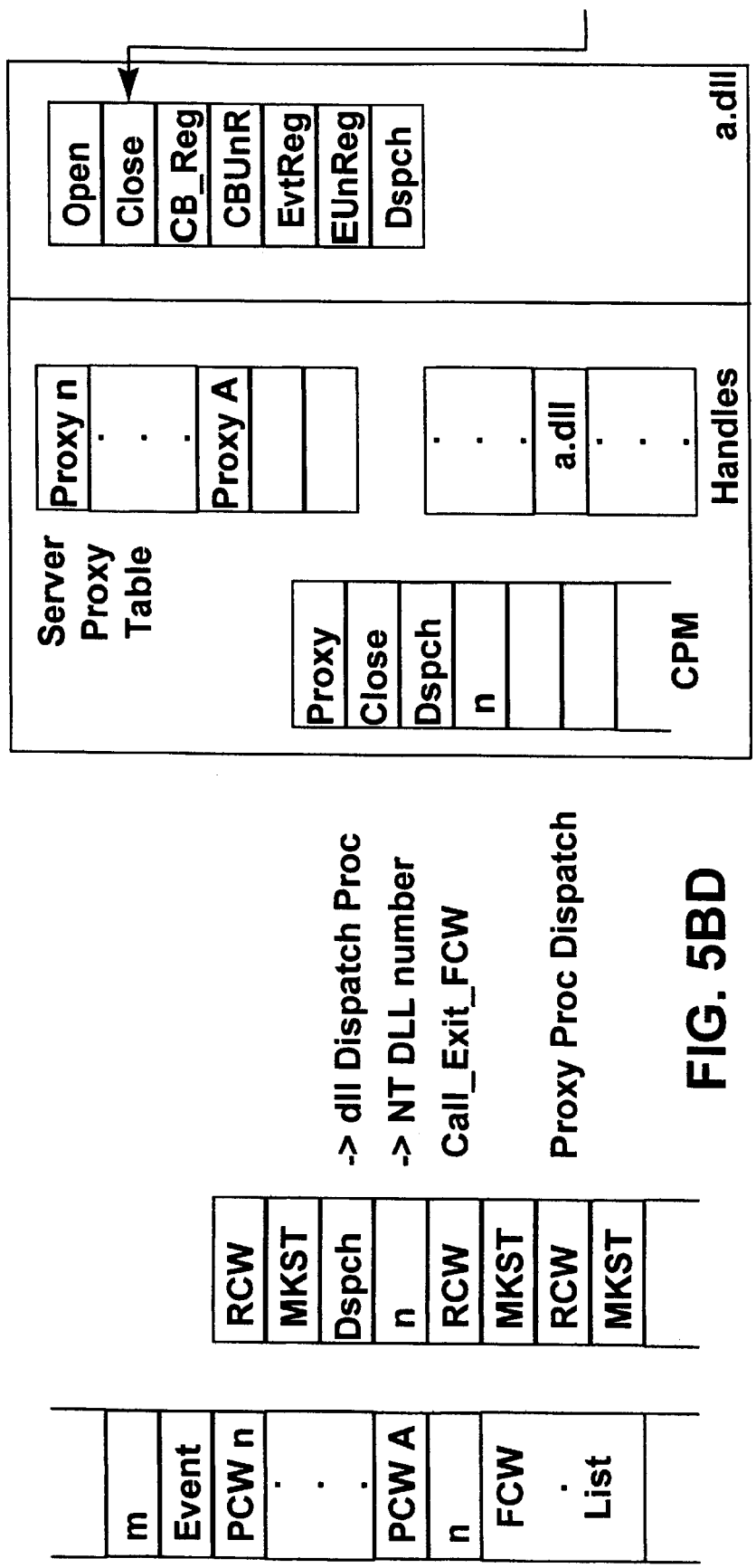
Figure 5B:
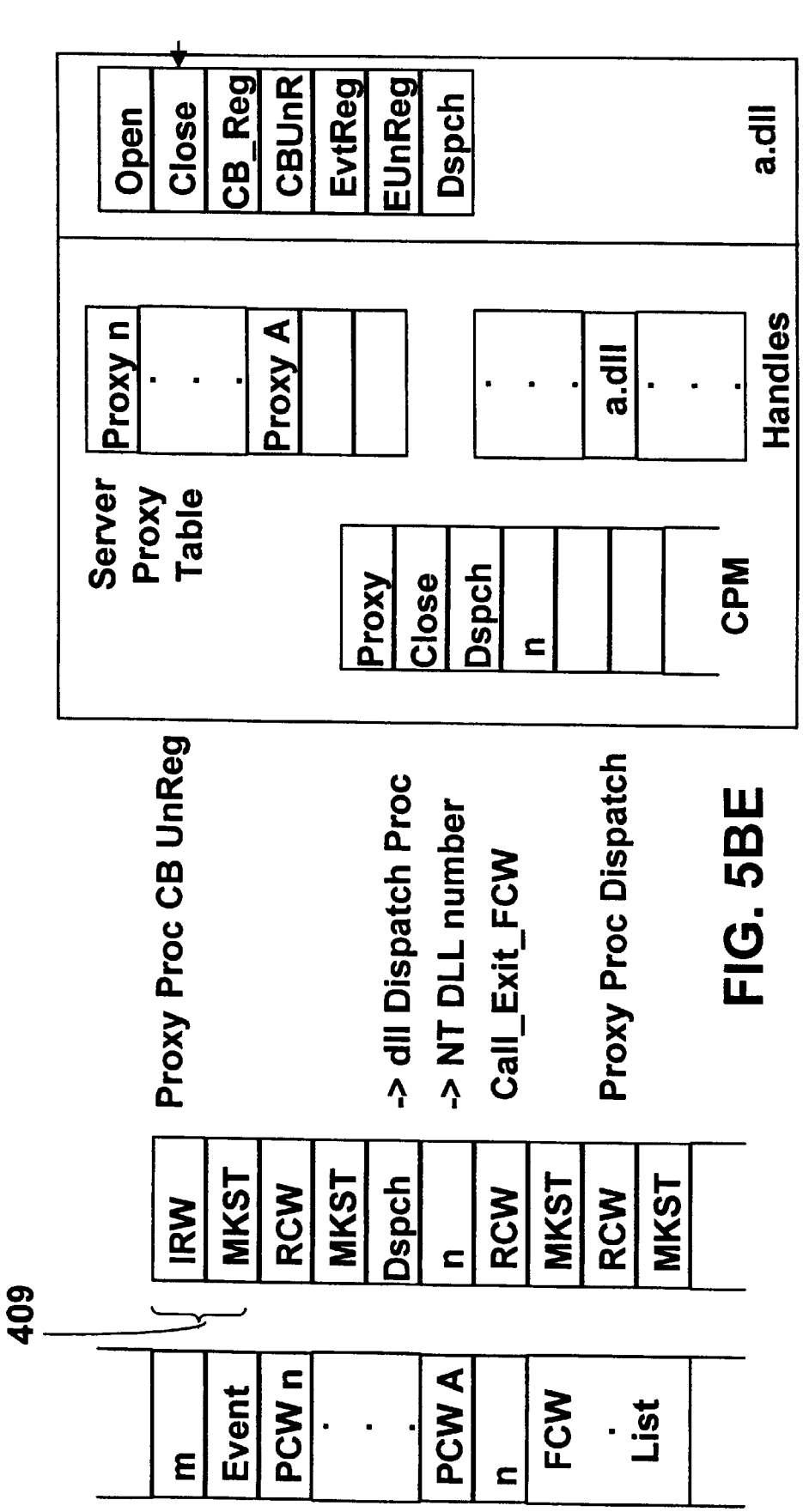
Figure 5B:
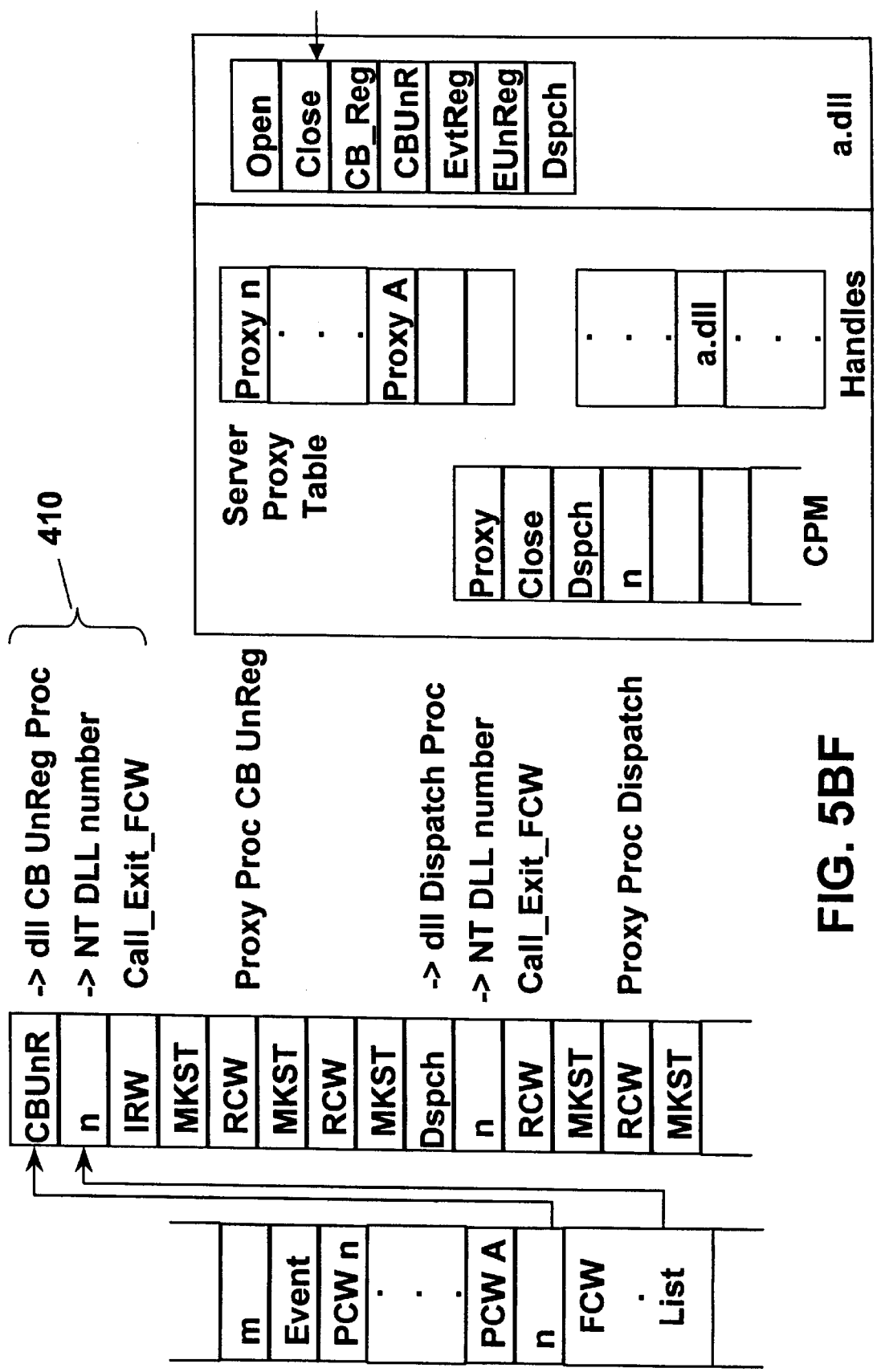
Figure 5B:
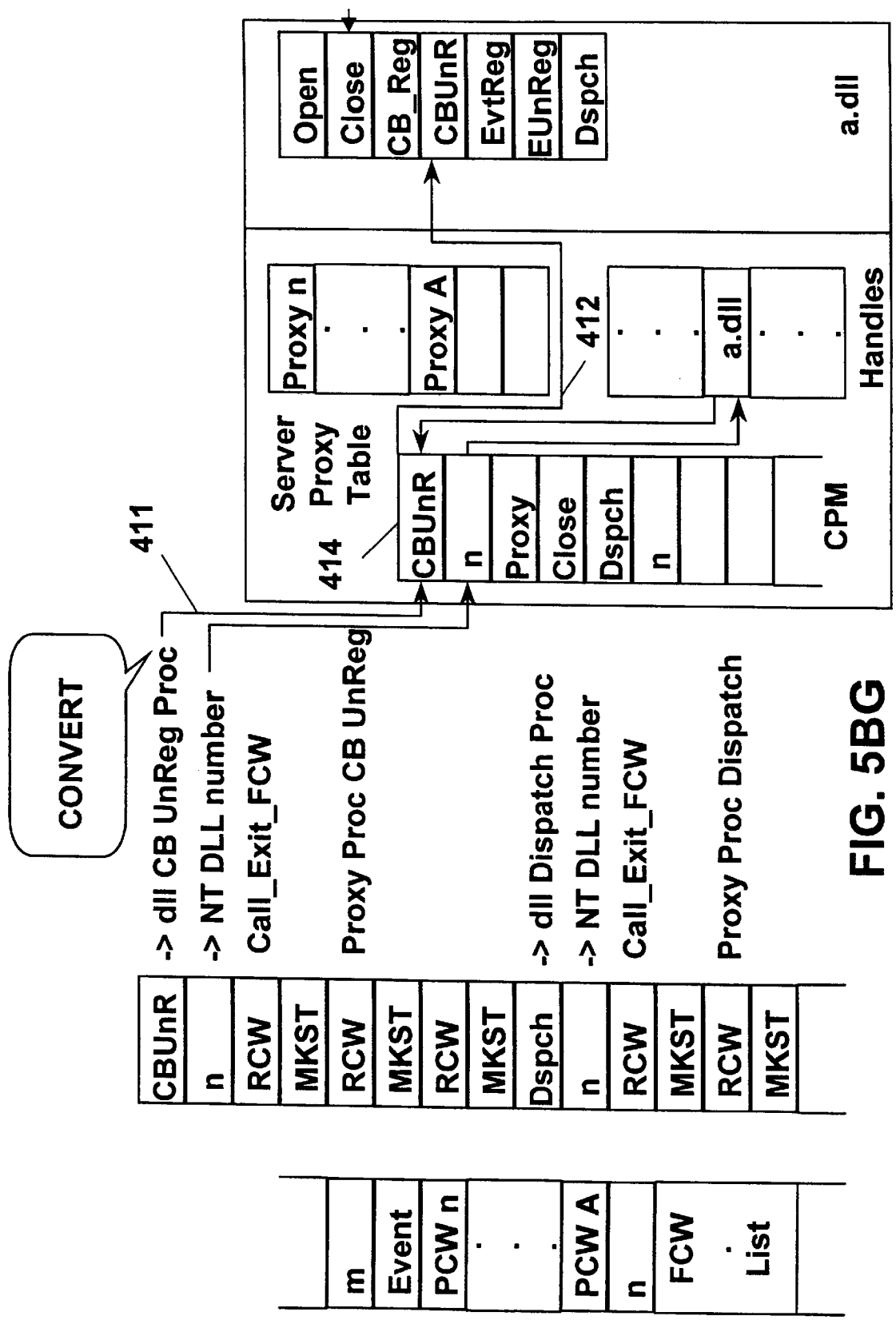
Figure 5B:
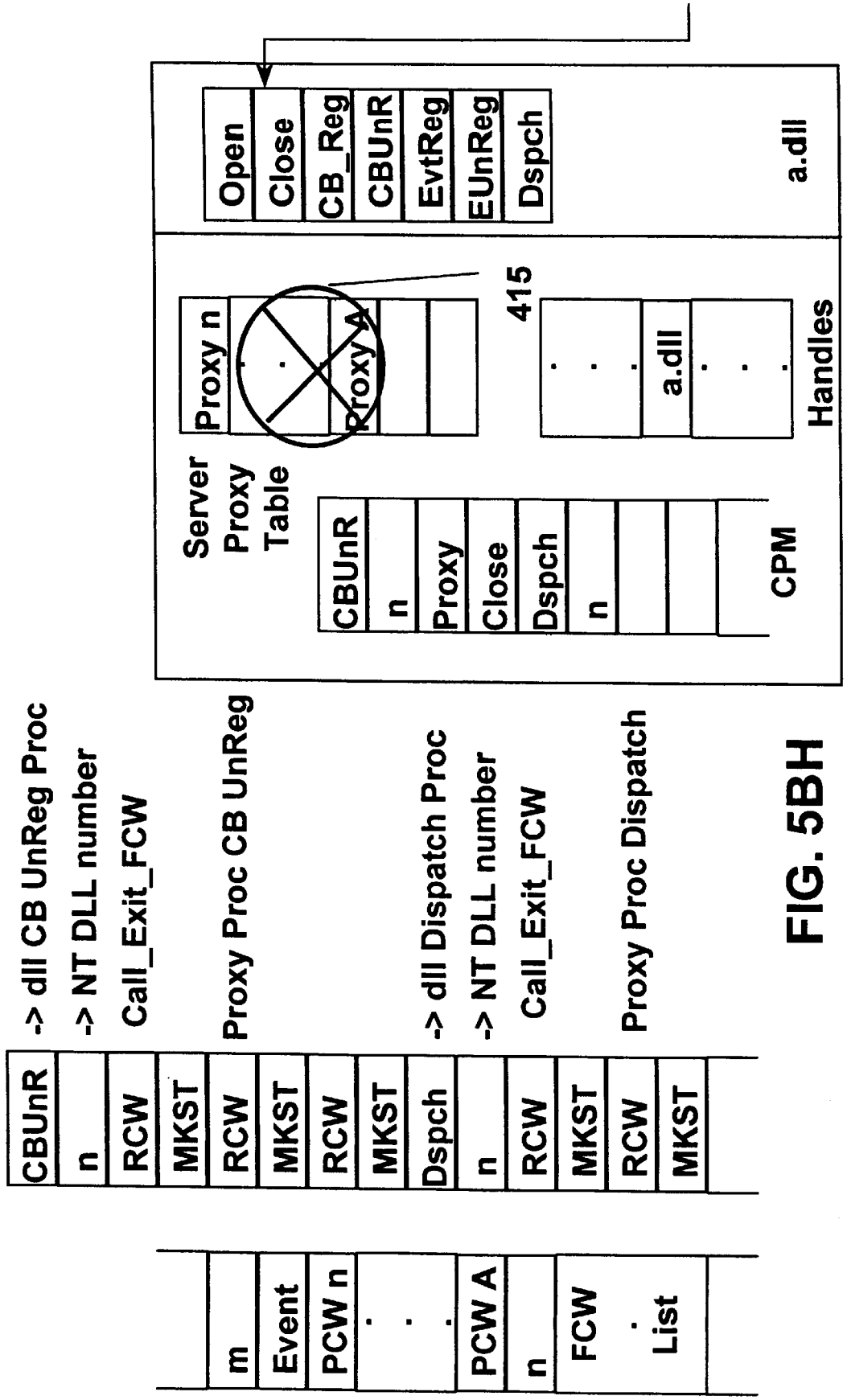
Figure 5B:
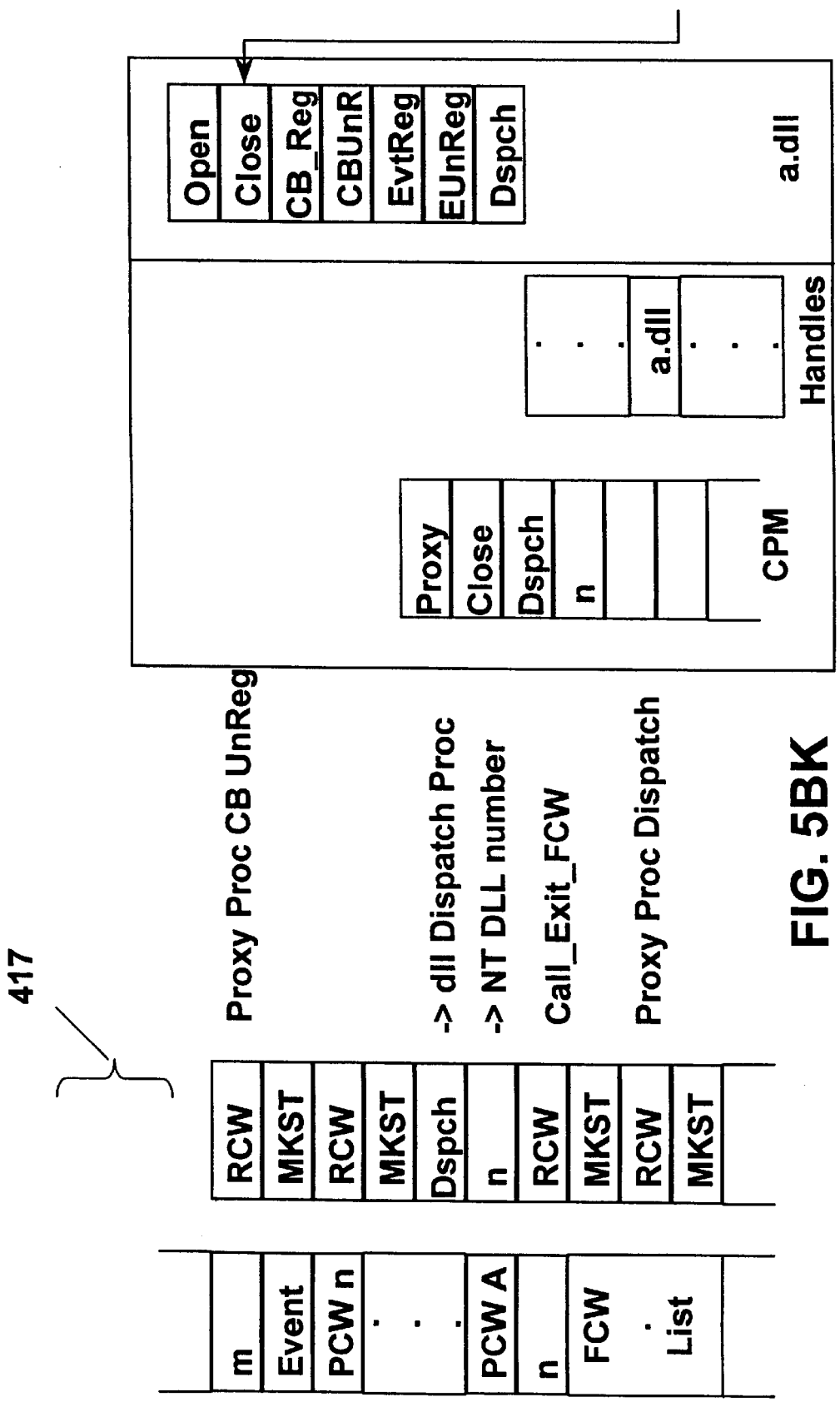
Figure 5B:
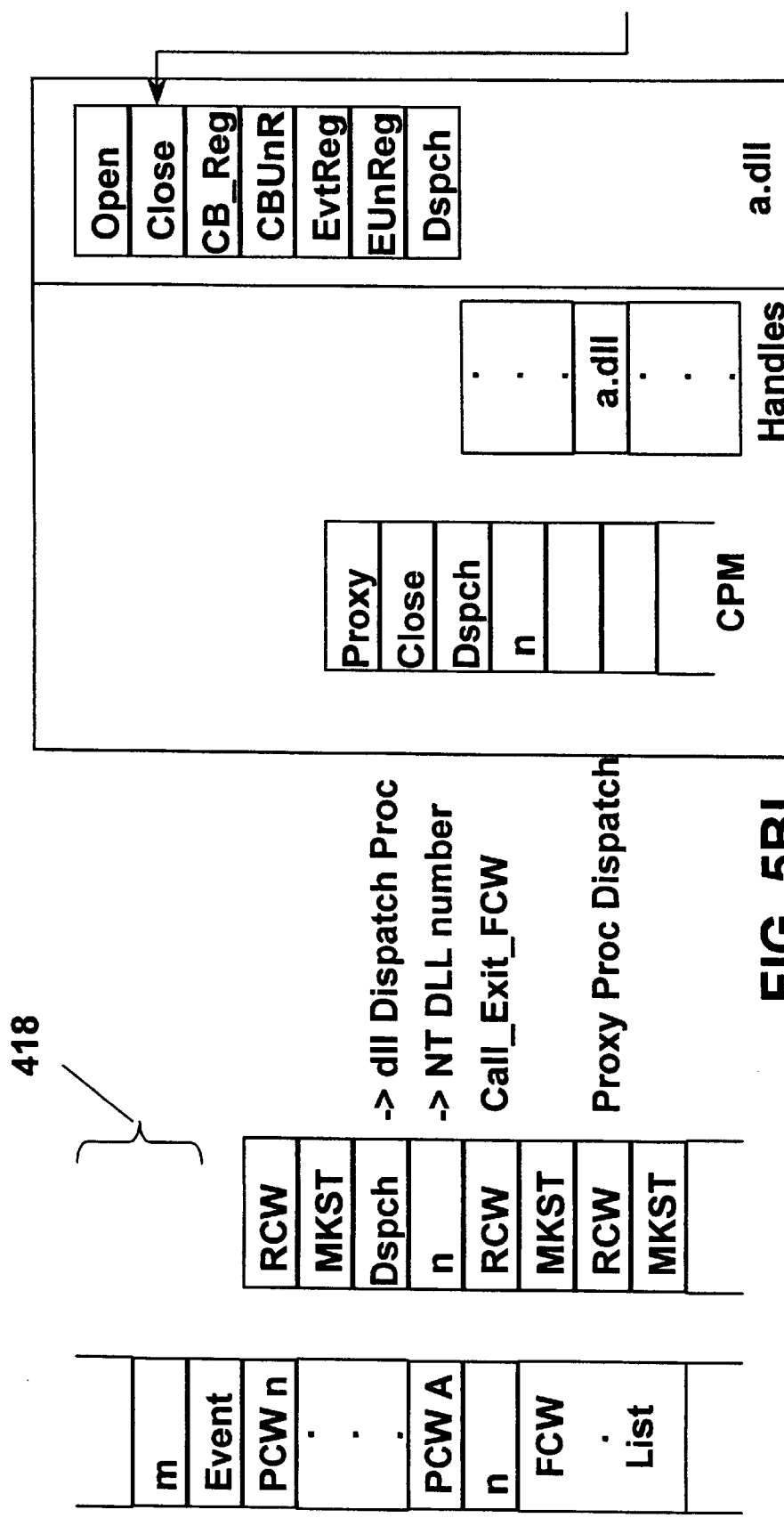
Figure 5B:
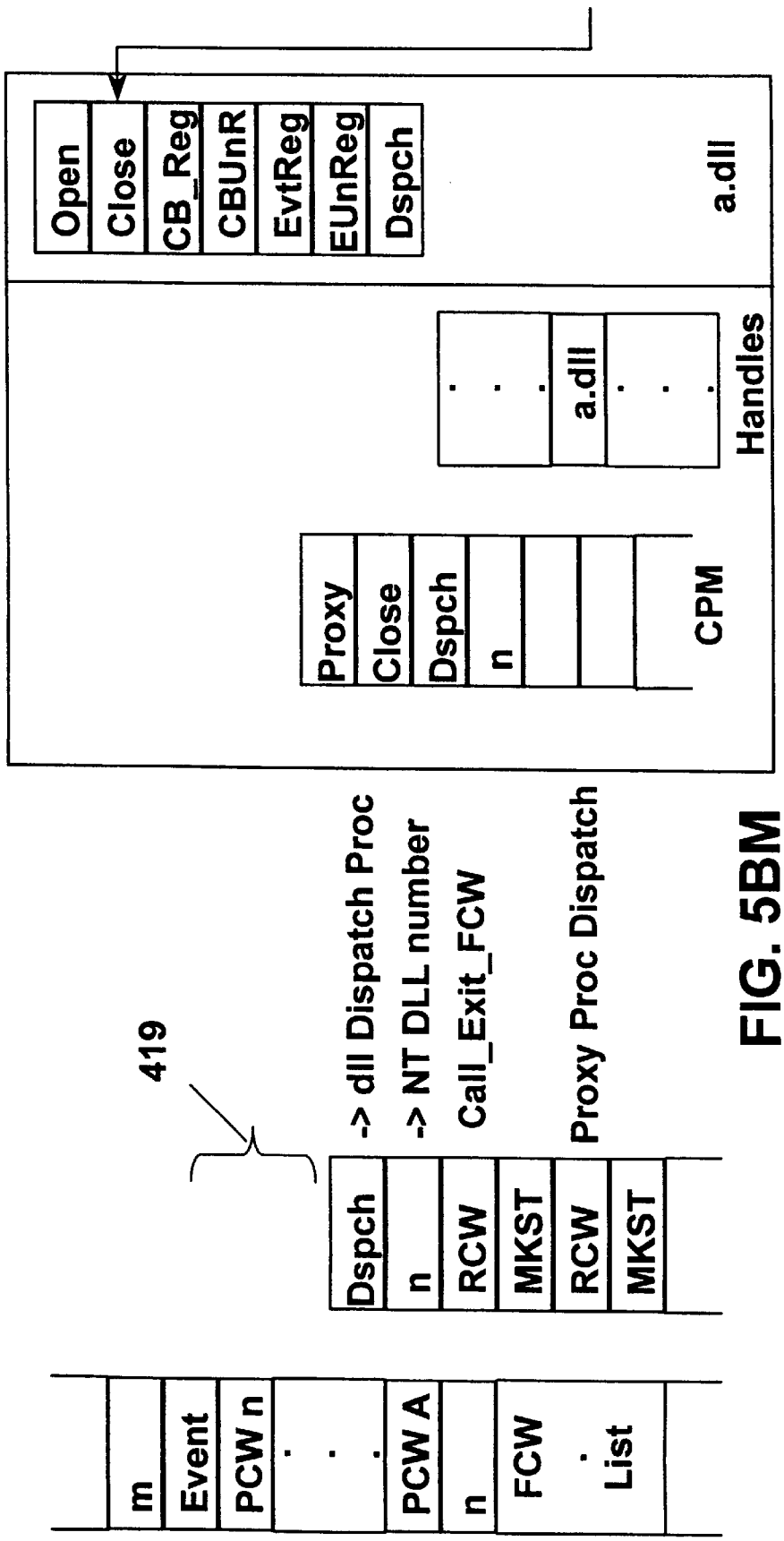
Figure 5B:
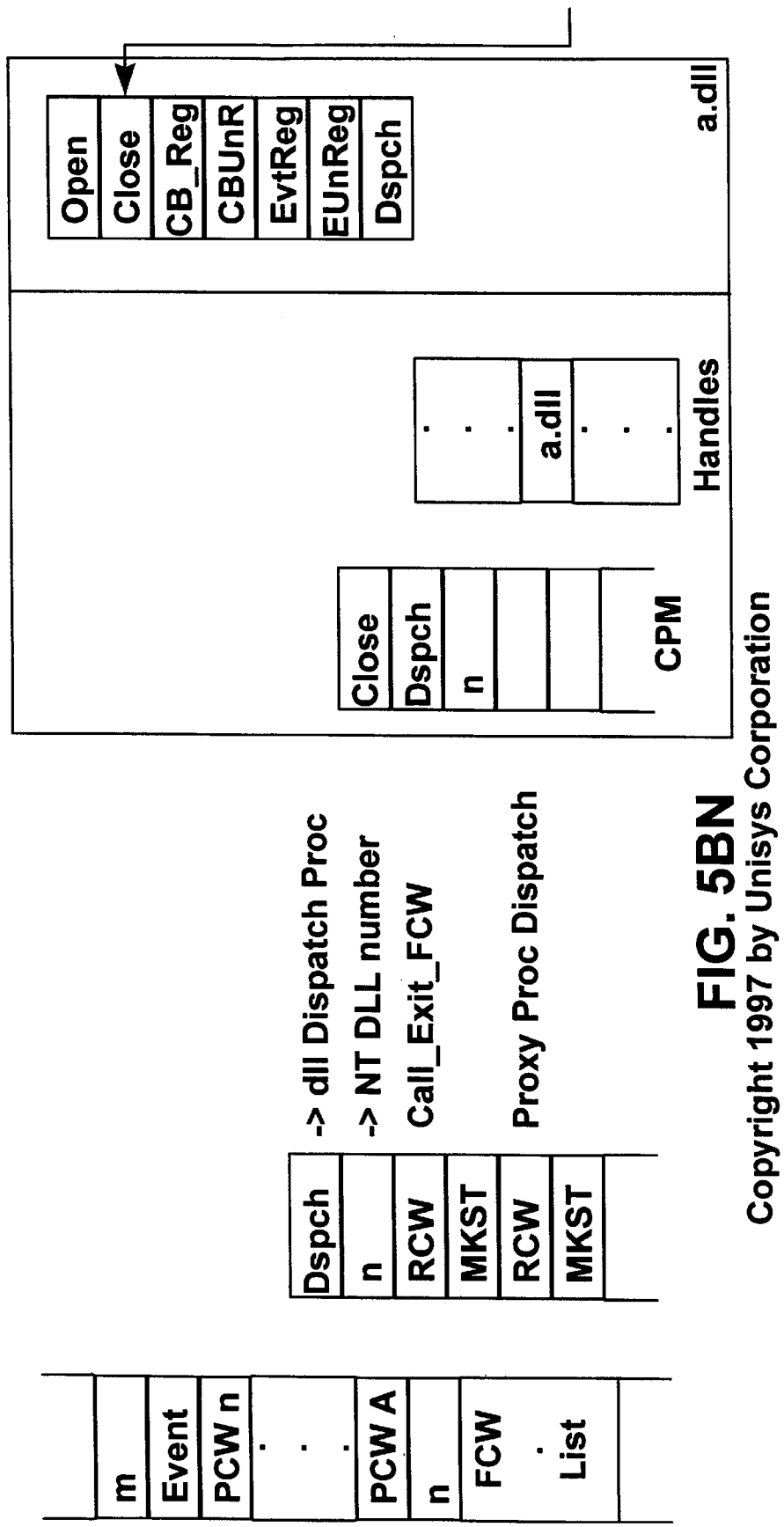
Figure 5B:
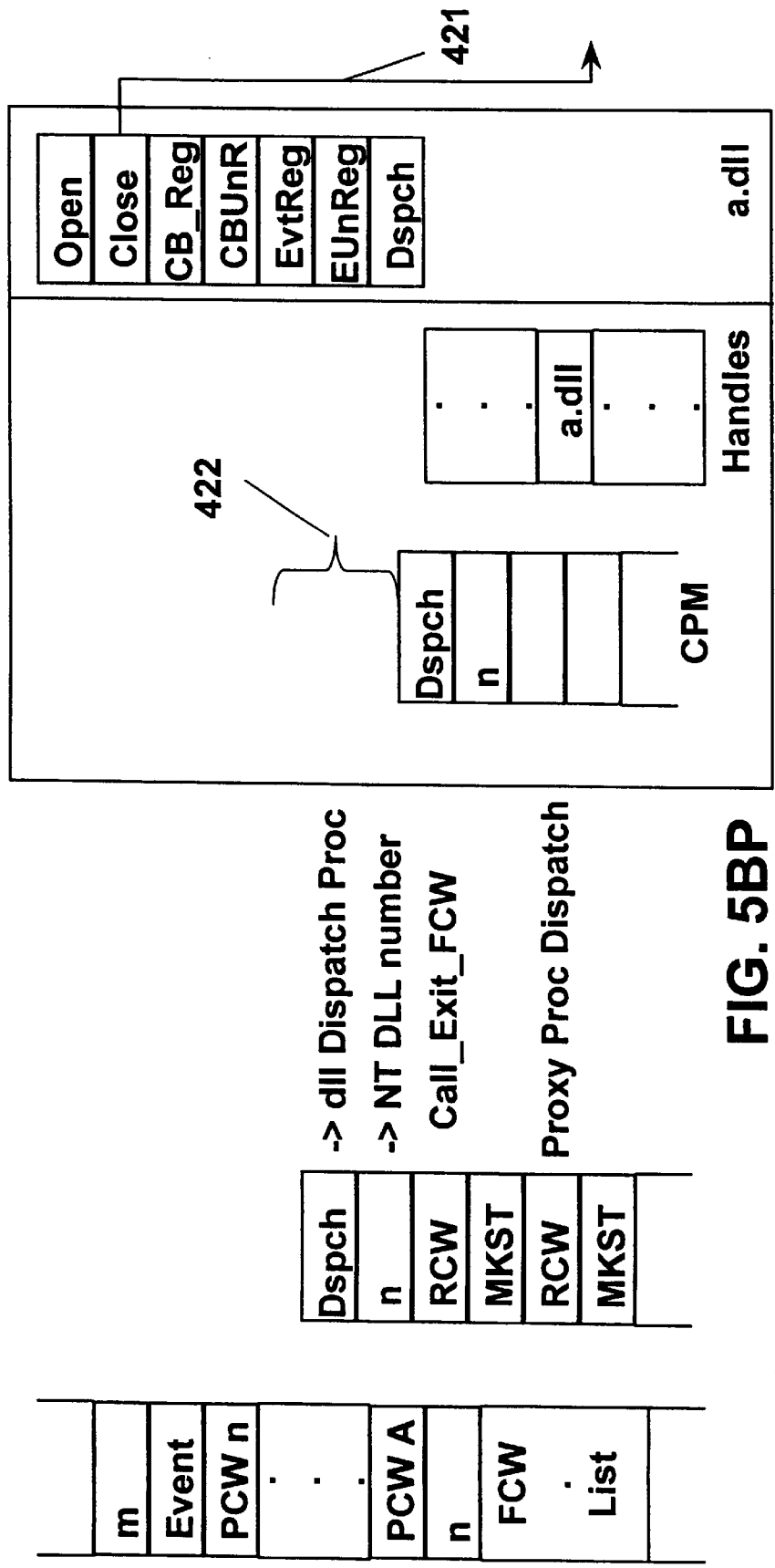
Figure 5B:
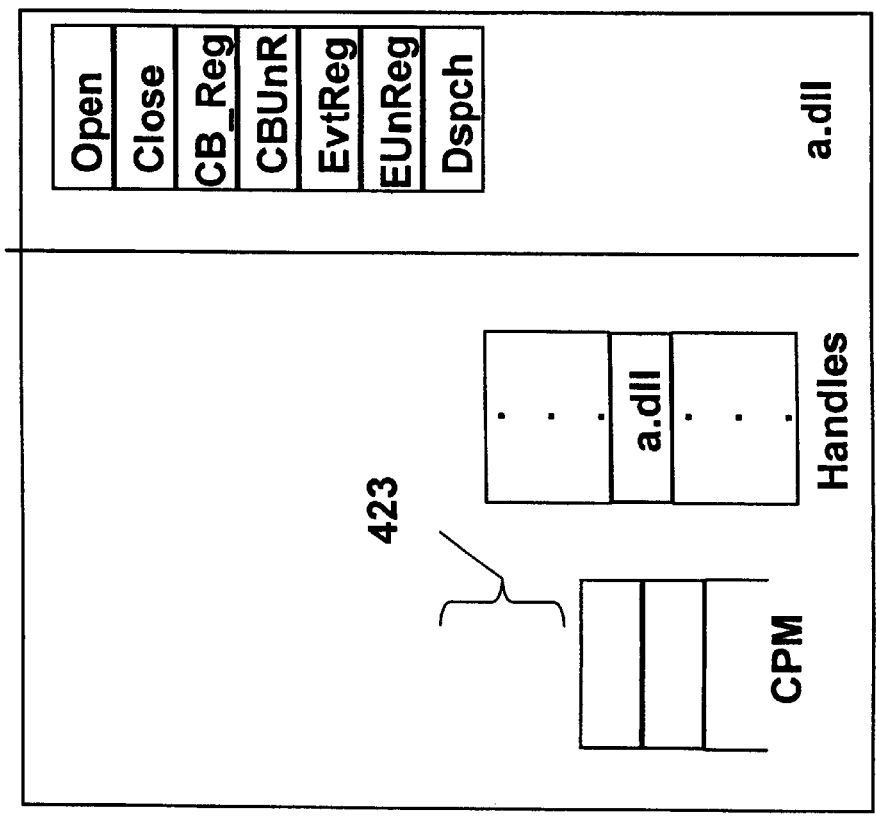
Figure 5B:
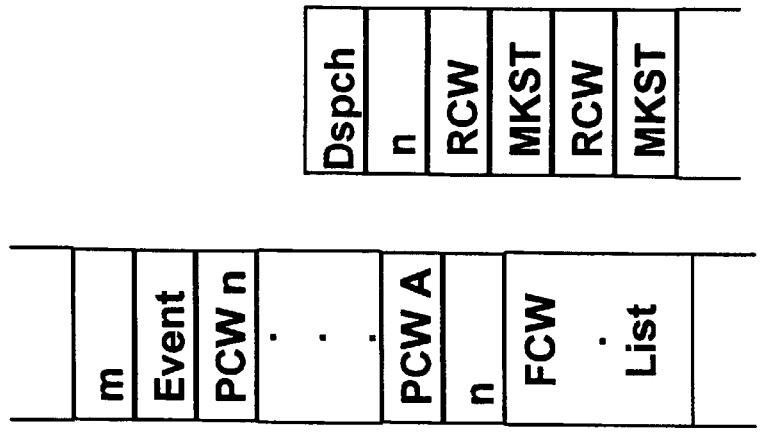
Figure 5B:
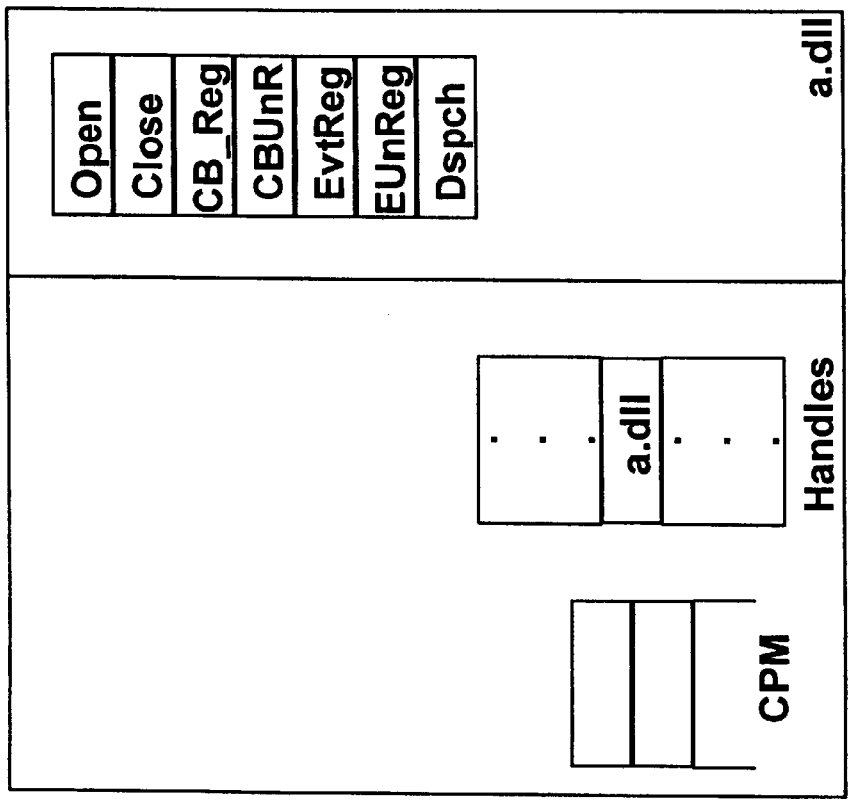
Figure 5B:
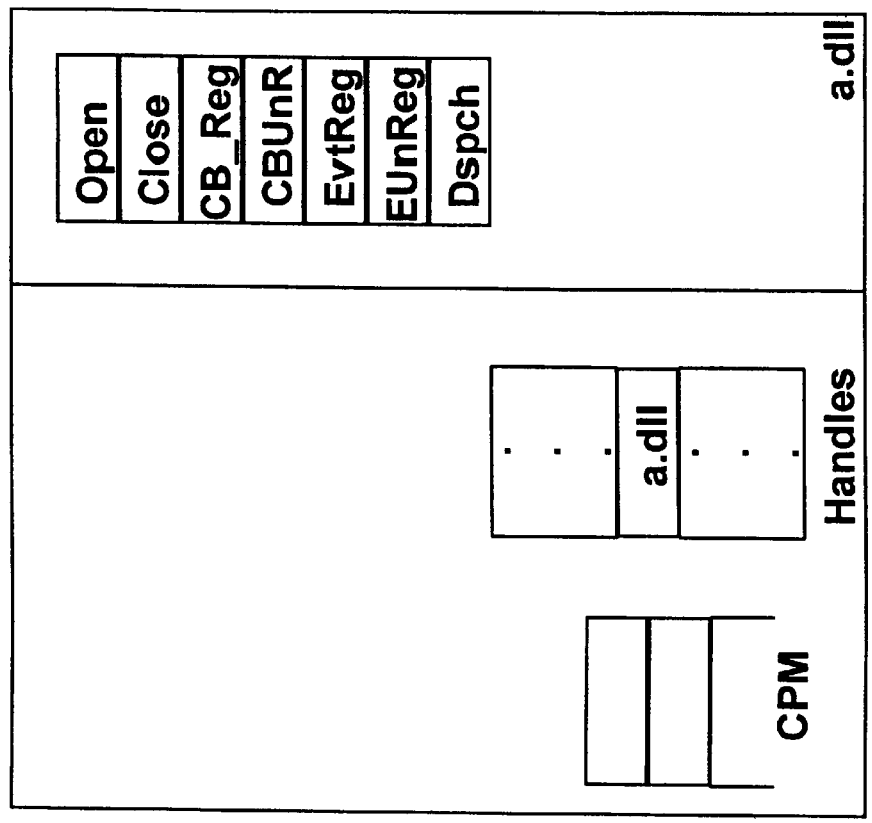
Figure 5B:
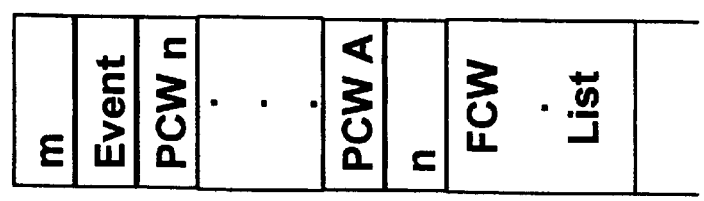
Figure 5B:
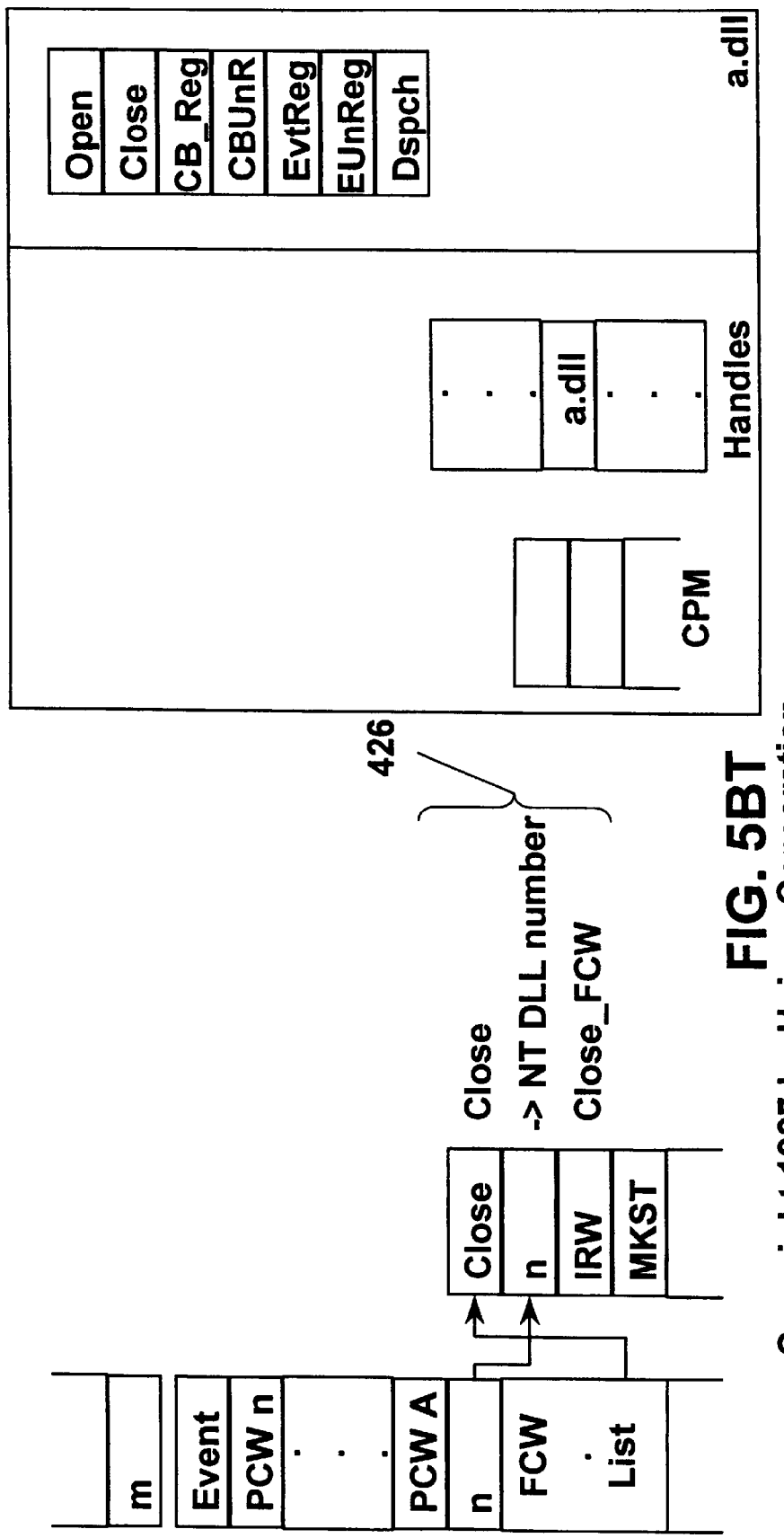
Figure 5B:
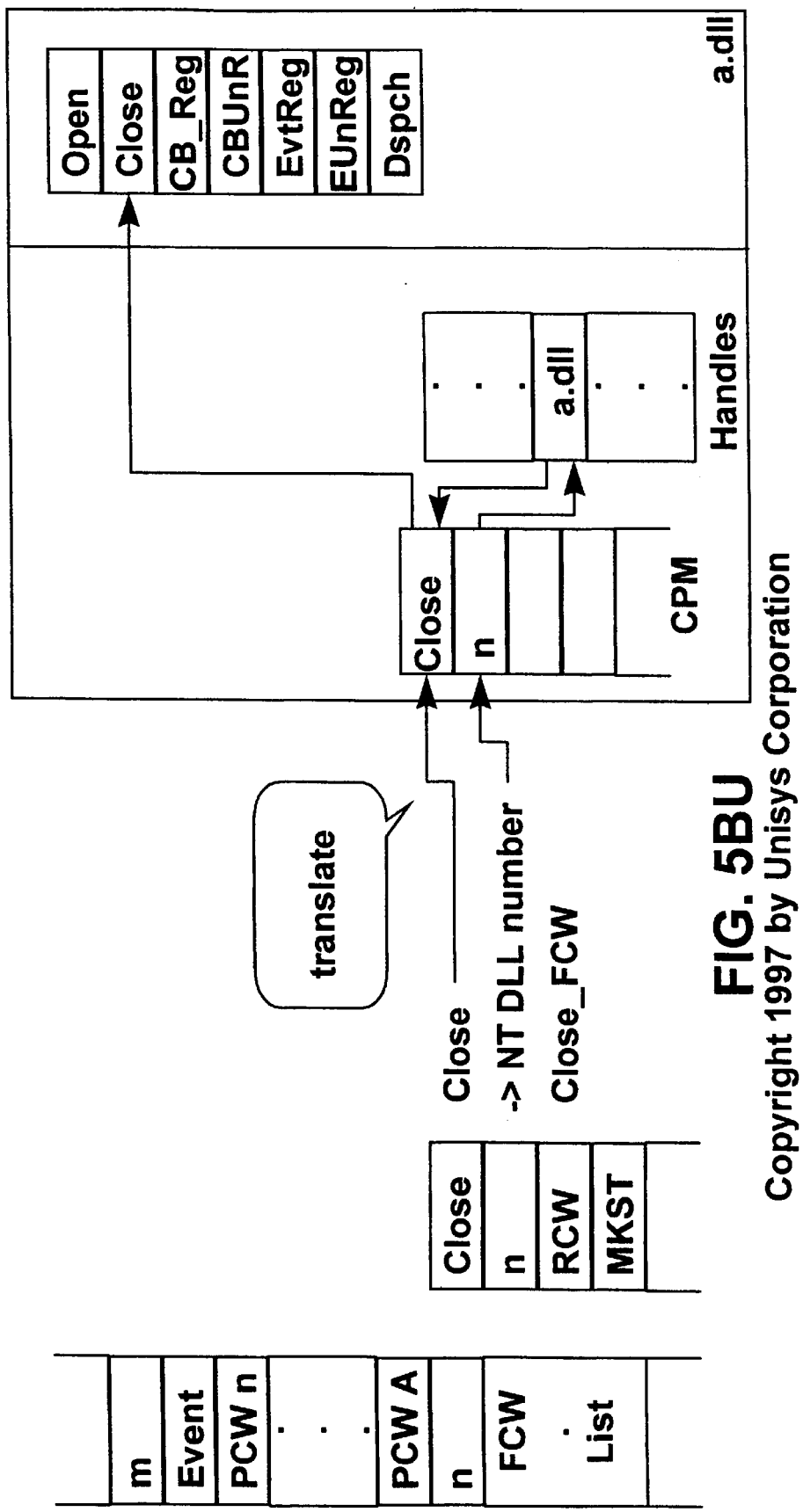
Figure 5B:
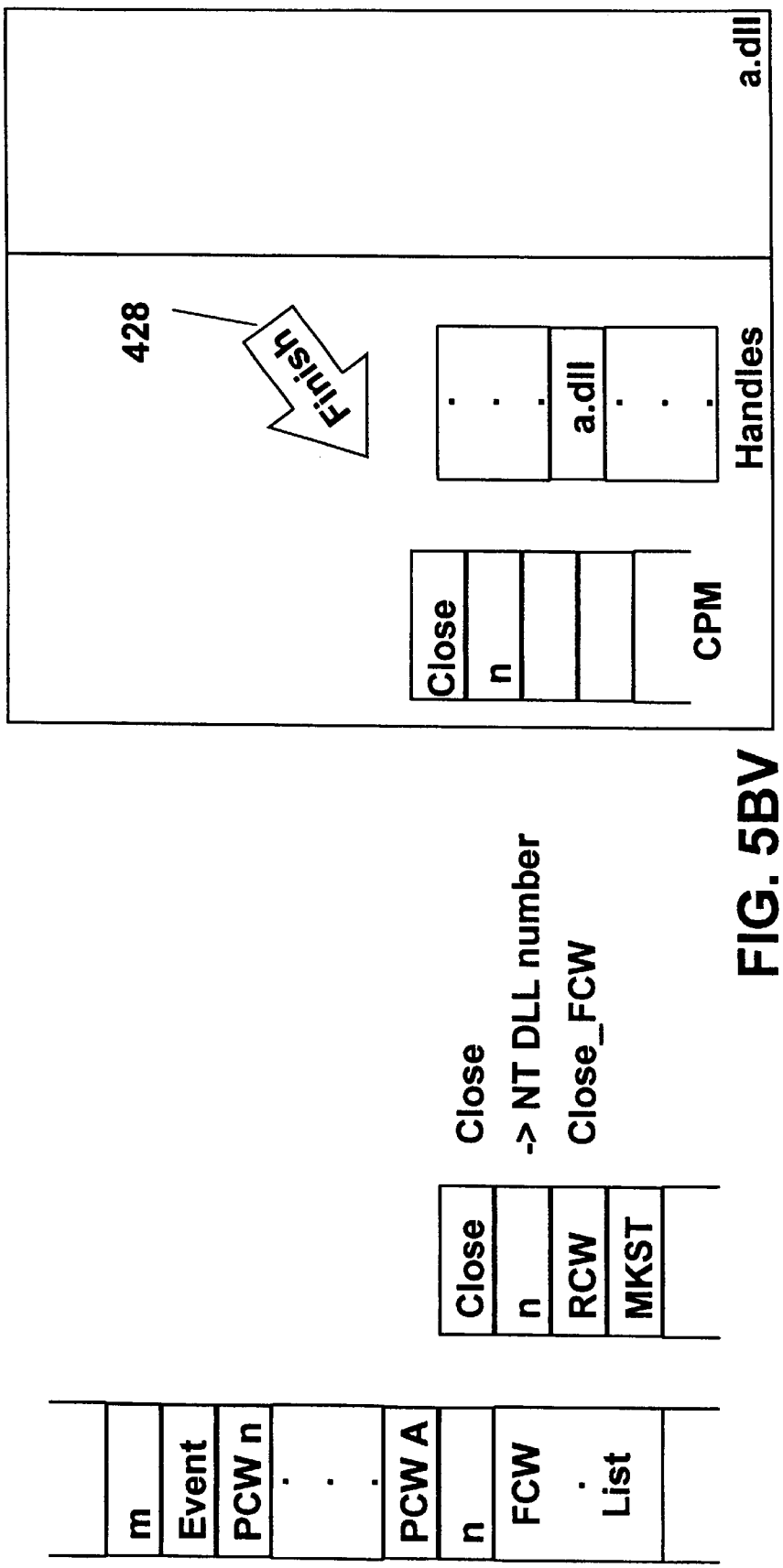
Figure 5B:
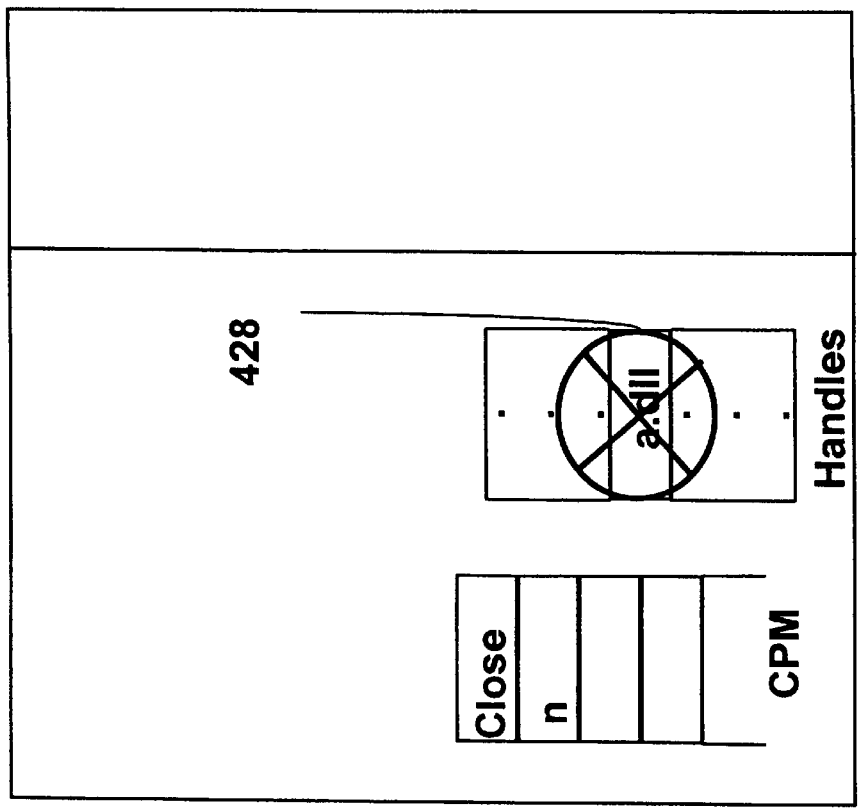
Figure 5B:
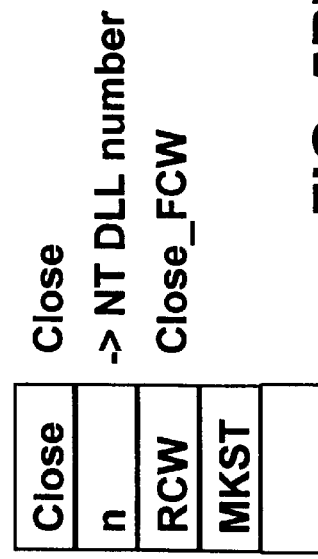
Figure 5B:
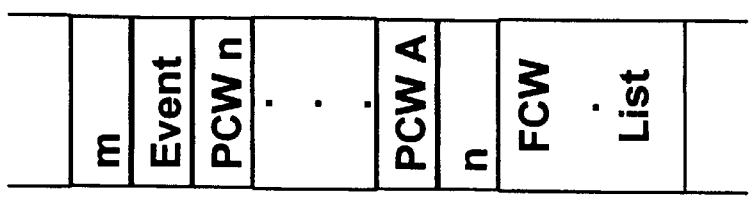
Figure 5B:
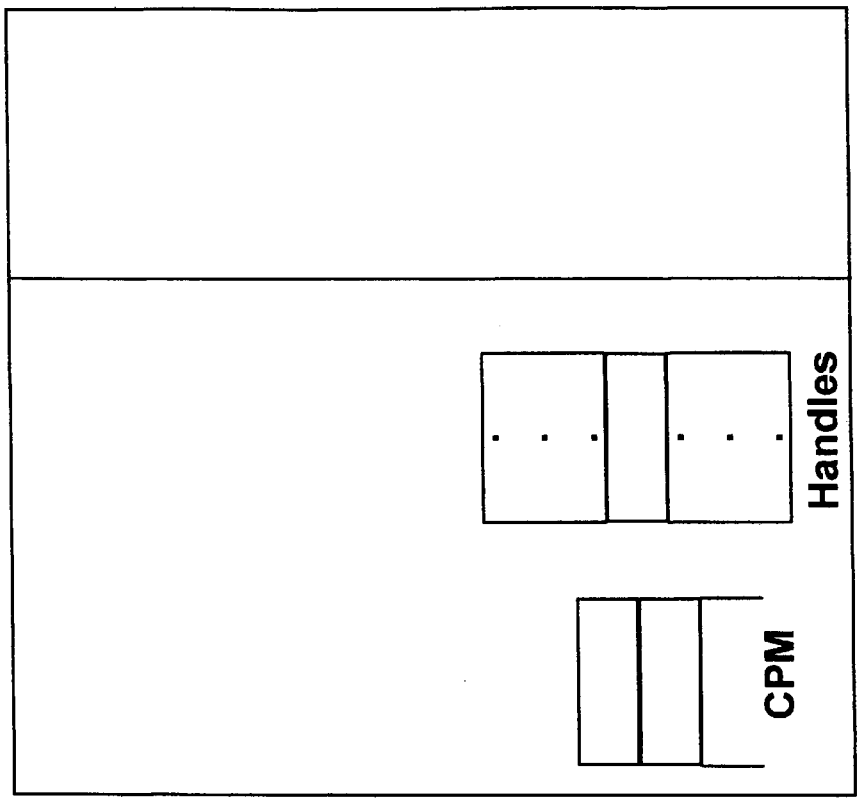
Figure 5B:
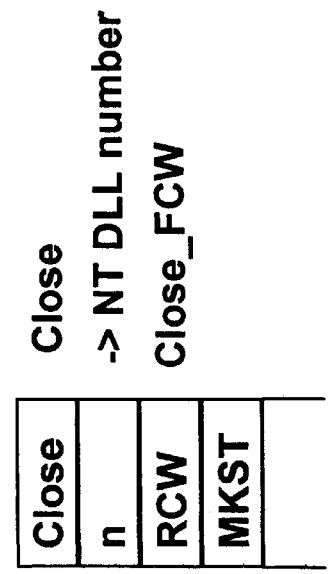
Figure 5B:
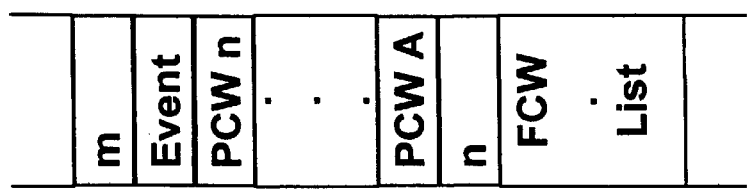
Figure 5B:
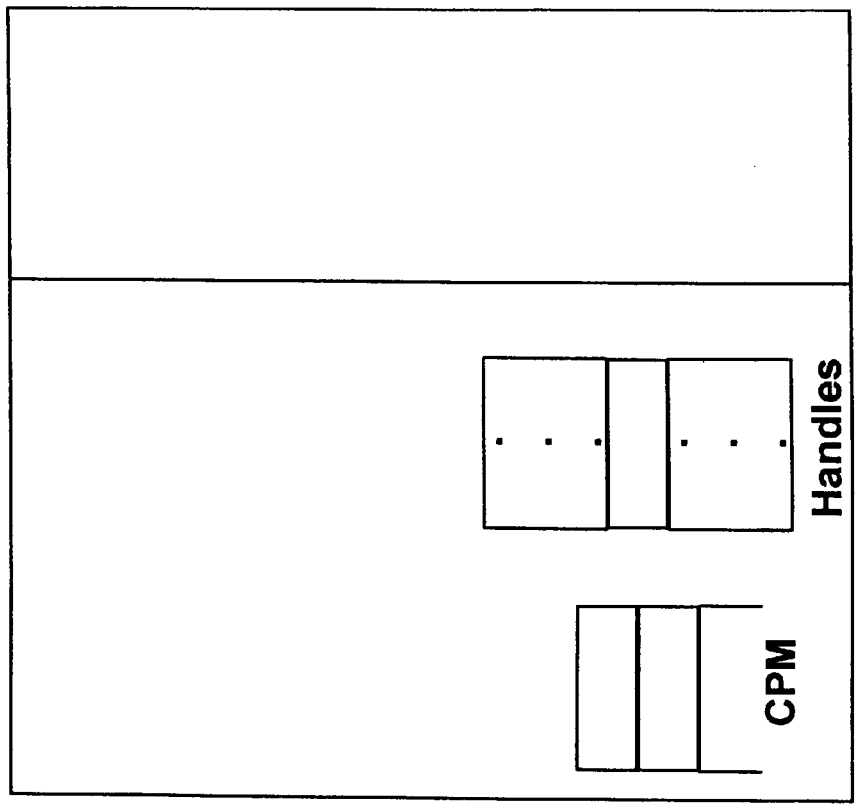
Figure 5B:
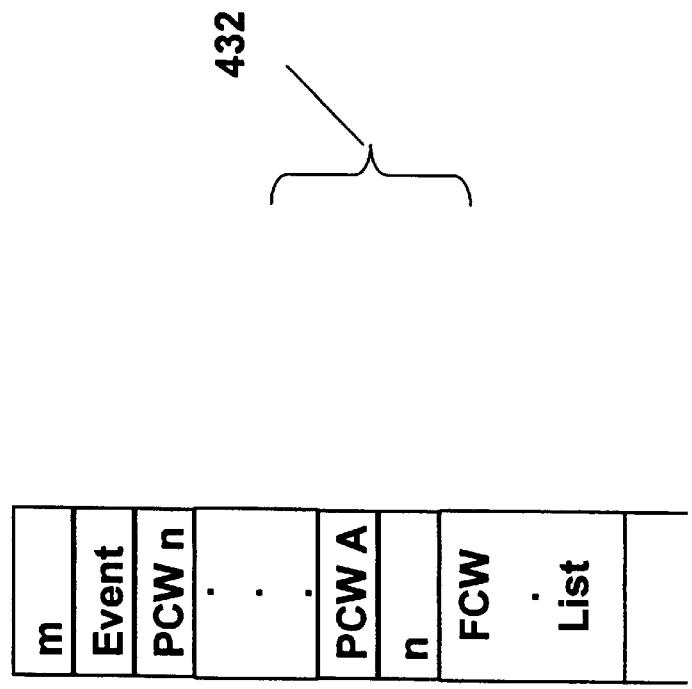

At a later time, the Client Program is scheduled to run on the CPU 114 by using its scheduling mechanisms (see FIGS. 5U and 5V). This happens because the event that the Client Program has been waiting on has happened. The Client Program immediatel y calls the Dispatch Proxy Procedure (block 165/365, FIG. 5W). The Dispatch Proxy Procedure calls the Call_Exit_FCW Protocol Procedure (block 166/366, FIG. 5X). Entry into the Call_$_{Exit}$_FCW Protocol Procedure transfers control to the NT Operating System (block 167/367, FIG. 5Z).

Under control of the Windows NT Operating System running on the CPU 109, the Windows NT Operating System calls the Dispatch Stub Procedure in the Server Program DLL. The Server Program DLL and Stub Procedures are identified by the two parameters to the Protocol Procedure (block 168/368, FIG. 5Z). Following this, the Dispatch Stub Procedure calls the Server Program Proxy Procedure (block 169/369, FIG. 5AA) that was previously called by the Windows NT calling program. The process illustration continues in FIG. 4F as denoted by a connector N.

Referring now to FIG. 4F at the connector N and under control of the Windows NT, the Dispatch Server Procedure calls the Stub Procedure for the Call-Back Procedure (block 169/369, FIG. 5AA). Next, the Server Proxy Procedure converts the input parameters from Windows NT format to MCP format and builds a stack activation record on top of the Call_Exit_FCW Procedure (block 171/371, FIG. 5AB). Under control of the MCP Operating System, the stack activation record is entered, and the Client Program Server Function begins executing. The Client Program Server Function performs functions (which may include calling into the NT Server DLL again). Eventually, the Client Program Server Function exits or returns. This exit or return is noticed by the CPU 114, which returns control back to the Windows NT Operating System (block 172/372, FIG. 5AC). The Server Program Proxy Procedure then converts the output parameters from MCP format to NT format as data is moved from the MCP section of the memory 118 to the NT section of Memory (block 173/373, FIG. 5AC). The Server Program Proxy Procedure also converts any result value from MCP format to NT format as the result (if any) is moved from the MCP section of the memory 118 to the Windows NT section of memory (block 173/373, FIG. 5AC). The Server Program Proxy Procedure then exits (block 174/374, FIG. 5AD). The process illustration continues in FIG. 4G as denoted by a connector P. However, at the same time the Dispatch Stub Procedure exits which returns control back to MCP (block 178/378, FIG. 5AE). Next, under control of CPU 114 and the MCP operating system, the Call Exit FCW procedure exits (block 195/395, FIG. 5AF). After this, the Dispatch Proxy procedure exits (block 196/396, FIG. 5AG). This branch of the process continues at the connector Q in FIG. 4E (see FIG. 5AH), which was described hereinabove.

Referring now to FIG. 4G at the connector P and under control of the Windows NT, the results are returned to the calling program, which resumes normal execution (block 180/380, FIG. 5AC). Next an inquiry is made as to whether or not there are any more Server Function Calls (diamond 181). If the answer to this inquiry is yes, then a branch is taken back to FIG. 4A at the beginning block 131 (as denoted by a connector Z). On the other hand, if the answer to this inquiry is no, then the Calling Program calls the Server Program Close Proxy Procedure (block 182/382, FIG. 5AJ). Next, the Server Program Close Proxy Procedure causes a CPU asynchronous interrupt, thereby passing an event number as the P2 parameter (block 183/383, FIG. 5AJ).

Under control of the MCP Operating System, the asynchronous interrupt in the MCP causes the event identified by the P2 parameter (block 184/384, FIG. 5AJ). Following this, the Client Program wakes up on the event and calls the Dispatch Proxy Procedure (block 185/385, FIGS. 5AL, 5AM and 5AN). The Dispatch Proxy Procedure then calls the Call_Exit_FCW Protocol Procedure (block 186/386, FIG. 5AP). Entry into the Call_Exit_FCW Protocol Procedure transfers control to the NT Operating System (block 187/387, FIG. 5AR). The process illustration continues with reference to FIG. 4H at a connector S.

Referring now to FIG. 4H at the connector S, the CPU 109 calls the Dispatch Stub Procedure in the DLL.

The DLL and Stub Procedures are identified by the two parameters to the Protocol Procedure (block 188/388, FIG. 5AR). Next, the Dispatch Stub Procedure calls the Server Program Close Proxy Procedure (block 189/389, FIG. 5AS). The Server Program Close Proxy Procedure then calls the Client Program Close Proxy Procedure (block 190/390, FIG. 5AT). This transfers control to CPU 114 under control of the MCP operating system. The Client Program Close Proxy Procedure calls the Event Unregistration Proxy Procedure (block 197). The event Unregistration Proxy Procedure calls the Call FCW Exit protocol procedure (block 198). The call FCW protocol procedure transfers control to CPU 109 under control of the Windows NT Operating System (block 199). The process illustration continues with reference to FIG. 4J at a connector T.

Referring now to FIG. 4J at the connector T and under control by the Windows NT Operating System, the CPU 109 calls the Event Un-Registration Stub Procedure in the DLL (block 201/401, FIG. 5AW). The Event Un-Registration Stub Procedure calls the Event Un-Registration Server Program Procedure (block 202/402, FIG. 5AW). Next, the Event Un-Registration Server Program Procedure unregisters the event by erasing the reference to it from the NT DLL part of memory (block 203/403, FIG. 5AX). The Event Un-Registration Server Program Procedure exits to the Event Un-Registration Stub Procedure, and the Event Un-Registration Stub Procedure then exits (block 204/404, FIG. 5AY). Control is returned to the MCP Operating System where the CPU 114 cuts the MCP stack back to the Event Un-Registration Proxy Procedure (block 205/405, FIG. 5AZ). The Event Un-Registration Proxy Procedure then exits (block 206). Next, the Client Program calls RPCEvent to un-register the event (block 207/407, FIG. 5BA). The RPCEvent removes the SIRW from the global MCP Operating System array (block 208/408, FIG. 5BB). The Client Program then calls the Call-Back Un-Registration Proxy Procedure (block 209/409, FIG. 5BE). Following this, the Call-Back Un-Registration Proxy Procedure calls the Call_Exit_FCW Protocol Procedure (block 210/410, FIG. 5BF). Entry into this Procedure transfers control to the NT Operating System running on the CPU 109 (block 211/411, FIG. 5BG). Under control of the Windows NT Operating System, NT calls the Call-Back Un-Registration Stub Procedure in the DLL (block 212/412, FIG. 5BG). The process illustration continues with reference to FIG. 4K at a connector V.

Figure 4K:
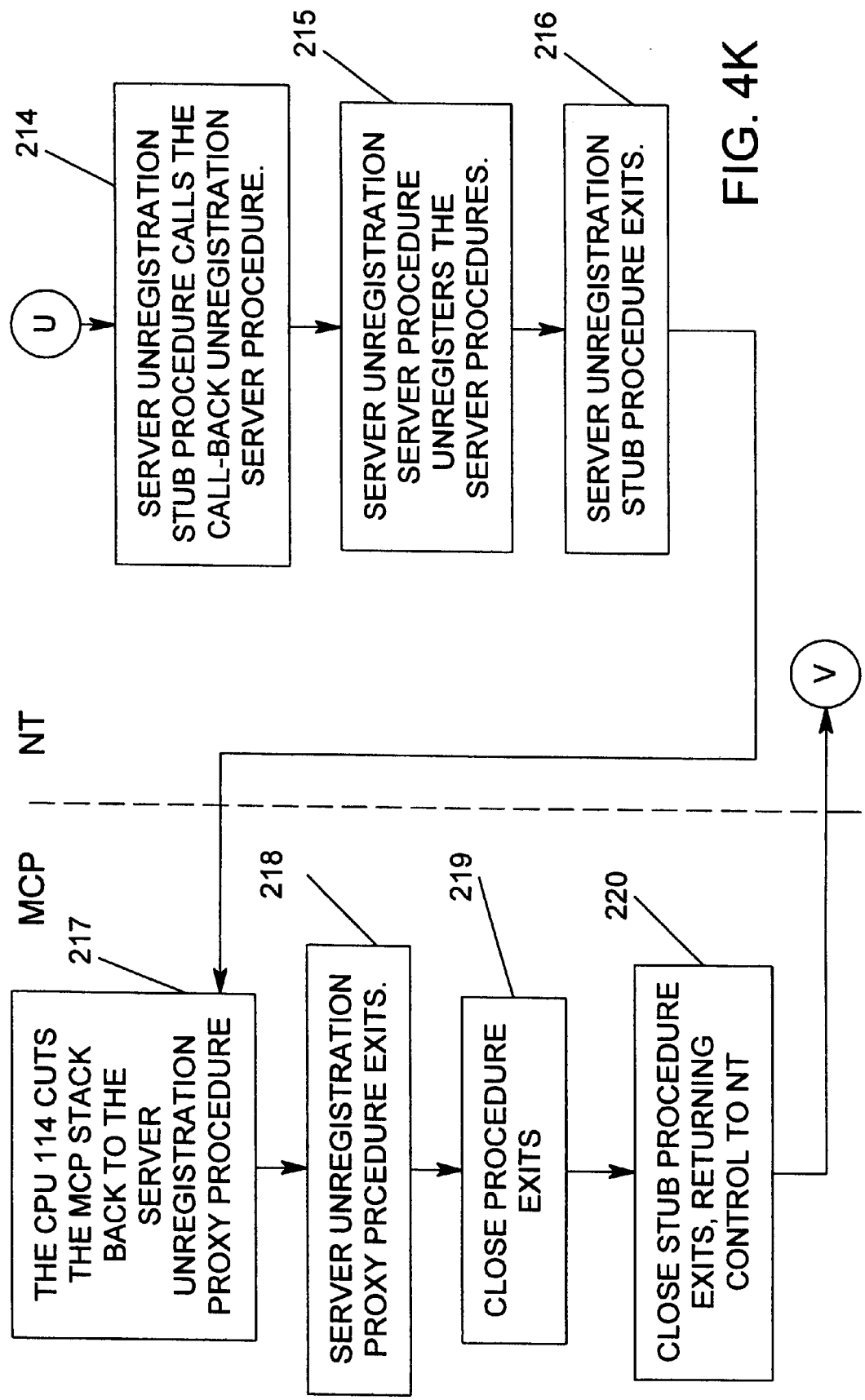
Figure 4L:
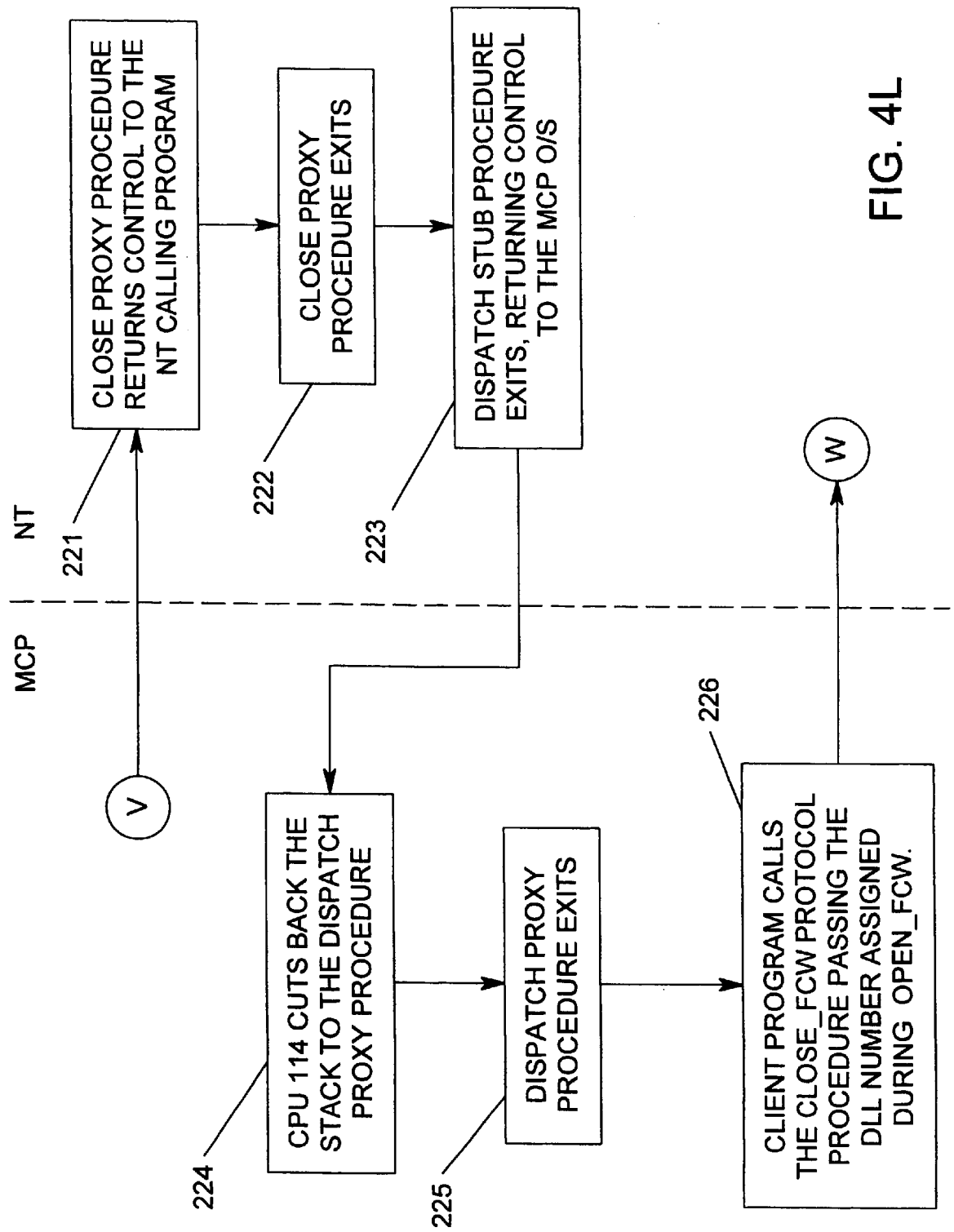

Referring now to FIG. 4K at the connector V and under control of the Windows NT Operating System, the Call-Back Un-Registration Stub Procedure calls the Call-Back Un-Registration Proxy Procedure (block 214/414, FIG. 5BG). Next, the Call-Back Un-Registration Server Procedure un-registers the Call-Back Procedures (block 215/415, FIG. 5BH). The Call-Back Un-Registration Stub Procedure then exits (block 216/416, FIG. 5BJ). Control is returned to the MCP Operating System wherein the CPU 114 cuts the MCP stack back to the Call-Back Unregistration Proxy Procedure (block 217/417, FIG. 5BK). Next, the Call-Back Un-Registration Proxy Procedure exits (block 218/418, FIG. 5BL) and the Close Procedure exits (block 219/419, FIG. 5BM). The Close Stub Procedure then exits, returning control to the Windows NT operating system (block 220/420, FIG. 5BN). The process description continues with reference to FIG. 4L at a connector V.

Referring now to FIG. 4L at the connector V and under control of the Windows NT Operating System, the Close Proxy Procedure returns control to the NT calling program (block 221/421, FIG. 5BP). Next, the Close Proxy Procedure exits, returning control to the Dispatch Stub Procedure (block 222/422, FIG. 5BP). After this, the Dispatch Stub Procedure exits (block 223/423, FIG. 5BQ), returning control to the MCP Operating System where CPU 114 cuts back the stack to the Dispatch Proxy Procedure (block 224/424, FIG. 5BR). Next, the Dispatch Proxy Procedure exits returning control to the Client Program (block 225/425, FIG. 5BS). The Client Program then calls the Close_FCW Protocol Procedure for passing thereto the DLL number assigned during the Open_FCW (block 226/426, FIG. 5BT). The process illustration continues with reference to FIG. 4M at a connector W.

Figure 4M:
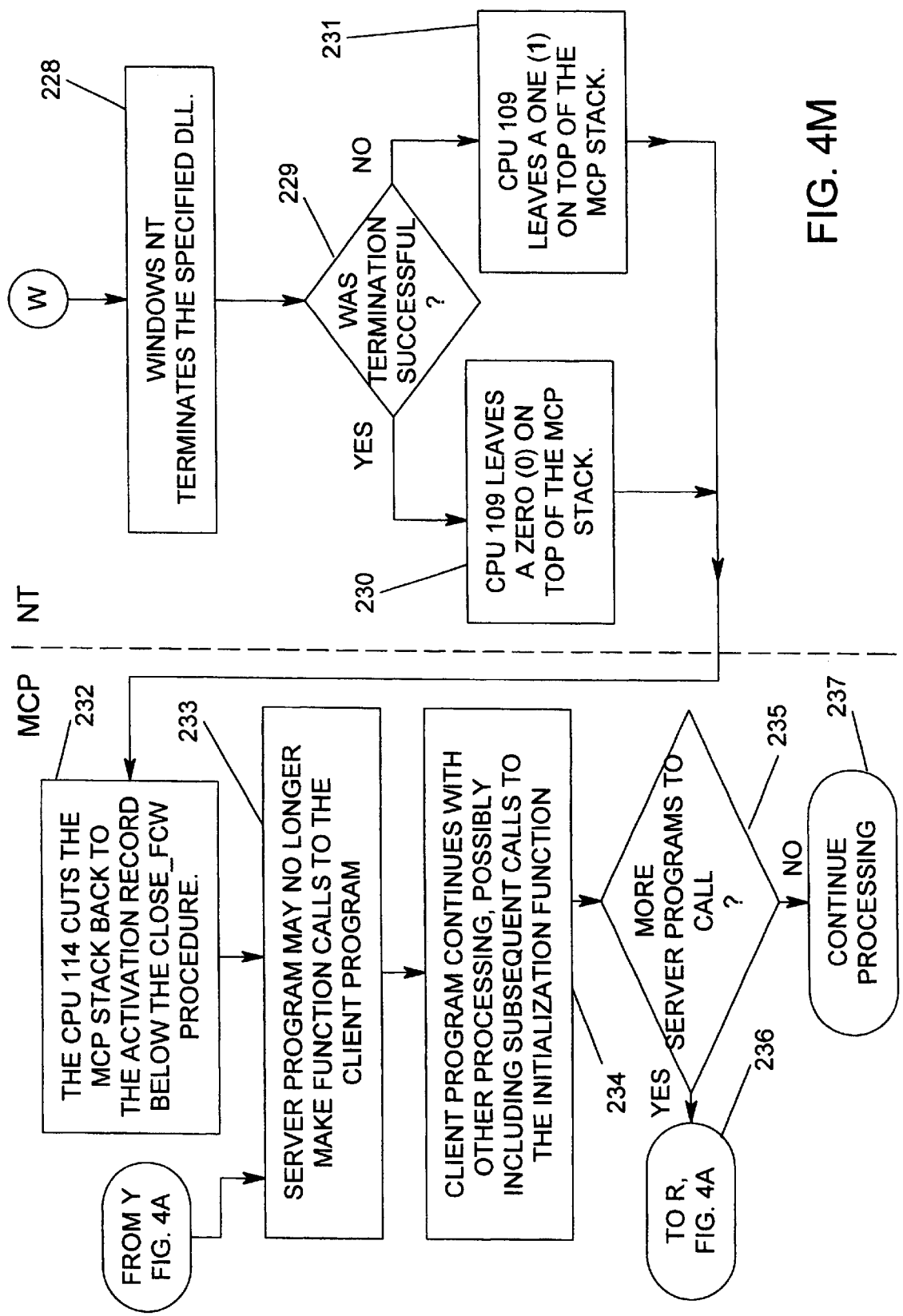

Referring now to FIG. 4M at the connector W and under control of the Windows NT Operating System, the CPU 109 terminates the specified DLL (block 228/428, FIGS. 5BU, 5BV and 5BW). Next, an inquiry is made as to whether or not the termination was successful (diamond 229). If it was successful, then the CPU 109 leaves a zero (0) on top of the MCP Server Program stack (block 230). On the other hand, if the termination was not successful, then the CPU 109 leaves a one (1) on top of the MCP Server Program stack (block 231). Following either the step depicted by the block 230 or the block 231 the Close Procedure exits and control is returned to the MCP operating system (see FIG. 5BX) where the CPU 114 cuts the MCP stack back to the activation record below the Close_FCW Procedure (232/432, FIG. 5BY). At this point the Client Program may no longer make function calls to the Server Program (block 233). The Client Program then continues with other processing, possibly including subsequent calls to the initialization function (block 234). Next, an inquiry is made as to whether or not there are more Server Programs to be called (diamond 235). If the answer to this inquiry is yes, then a return is made back to the beginning block 131 as denoted by a bubble 236. On the other hand, if there are no more Server Programs to be called, the Client Program continues with other processing (bubble 237).

Referring now to FIGS. 5A through 5BX (intentionally excluding letters I and O), the individual steps of the method of the present invention are illustrated graphically. It should be noted that the diagrams in the FIGS. 5A through 5BX represent parts of the Programs stored in the memory 118 and are divided in a similar manner to that used for FIGS. 4A through 4L. That is, the MCP operating system is shown on the left-hand side of each sheet and the Windows NT operating system is shown on the right-hand of each sheet. With reference to FIG. 5C, there is shown on the left-hand side of the sheet an MCP Program Stack 239. On the right-hand side of the sheet is shown an NT Procedure Call Stack 240, a DLL Handle Stack 241, a Server Proxy Table 242 and a Protocol Procedure Table 243, all of which are stored within the NT section 244 of the memory 118. The remaining drawings are divided up in a similar manner.

At this juncture of the description it is noted that the designations of Client Program in the O/S I, or Server Program in the O/S II is determined by which program makes a call to an initialization Generated Function. The program that makes such a call is designated the Client Program, and the other program is designated the Server Program. The designation is transient, and only applicable during the duration of each step of the above-described process. Either program may be both a Client Program and a Server Program at different times, as determined by the functions declared in the Interface Definition Language. In this way, it is possible for a program in the O/S I to call functions resident in a program in the O/S II, and for the same program in the O/S II to call functions resident in the program in the O/S I. That is, the programs may alternate the roles of Client Program and Server Program.

Further, these role reversals may be interleaved. That is, a program acting as a Server Program may begin acting as a Client Program, while still in the role of a Server Program. This process is known as callbacks in External Procedure Calls, and occurs when a called server function (while processing) calls a function resident in the original program that called the server function. Further, these call-back functions may be nested. That is, a program acting as a Client Program, and then acting as a Server Program during the scope of the Client Program call, may then act again as a Client Program during the scope of the server function execution. In this way, function calls may proceed back and forth between the programs, each building on the other, to an arbitrary depth. When calls are made in this fashion, most recently invoked functions are always completed and exited prior to any earlier invoked functions being completed. That is, functions are completed in a last-invoked first-completed fashion.

While there has been shown what is considered the preferred embodiment of the present invention, it will be manifest that many changes and modifications can be made therein without departing from the essential spirit and scope of the invention. It is intended, therefore, in the annexed claims, to cover all such changes and modifications which fall within the true scope of the invention.

What is claimed is:

1. In a heterogeneous computer system having at least two CPU's and a common memory completely accessible by at least one of said CPUs and being disposed for storing at least two different operating systems that actively run simultaneously and concurrently control resources of said heterogeneous computer system, a method for performing external procedure calls between a first program stored in said common memory and being executed by a first one of said CPU's under control of a first one of said two operating systems and a second program stored in said common memory and being executed by a second one of said CPU's under control of a second one of said two operating systems, said method comprising the steps of:

a. said first program initiating said second program via a CPU-to-CPU signal bus between said at least two CPU's;
   b. said second program calling a specific function located in said first program via said CPU-to-CPU signal bus;
   c. said second program storing parameters, if any, in a second program stack having a portion thereof within said common memory;
   d. said first program fetching directly from said second program stack said parameters, if any, and converting them from a format compatible with said second operating system to a format compatible with said first operating system;
   e. said first program performing said specific function;
   f. said first program converting results of the preceding step, if any, from a format compatible with said first operating system back to a format compatible with said second operating system;
   g. said first program storing in a first program stack in having a portion thereof within said common memory said results to said second program; and,
   h. said second program fetching from said first program stack said results, if any.

2. The method as in claim 1 wherein said step of initiating said second program further includes said first program calling a protocol procedure and passing thereto an identification of said second program.

3. The method as in claim 2 wherein said step of initiating further includes indicating to said first program if said second program fails to respond to an attempt to initiate operation thereof.

4. The method as in claim 3 further including said first program continuing with processing without accessing said second program.

5. The method as in claim 1 further including the step of said second program suspending operation while awaiting an indication that processing of said specific function has been completed.

6. The method as in claim 1 wherein said step of calling a specific function further includes calling a proxy procedure for identifying said specific function to be performed.

7. The method as in claim 6 further including said proxy procedure fetching from said common memory a protocol procedure for invoking said first program to perform said specific function.

8. The method as in claim 7 wherein said step of calling a specific function further includes said protocol procedure being executed by said second CPU transferring control to said first CPU for fetching from said common memory a stub procedure for invoking said function.

9. The method as in claim 8 wherein said step of calling a specific function further includes said protocol procedure fetching from said common memory said stub procedure for converting said parameters, if any.

10. The method as in claim 7 wherein said step of converting results, if any, from a format compatible with said first operating system, to a format compatible with said second operating system further includes said protocol procedure performing the conversion.

11. The method as in claim 8 wherein said step of converting results, if any, from a format compatible with said first operating system, to a format compatible with said second operating system further includes said stub procedure performing the conversion.

12. The method as in claim 1 further including the step of repeating steps b through h for each occurrence that said second program makes a call to said first program to perform a function.

13. The method as in claim 1 and following step h thereof, further including the step of terminating operation of said second program if there are no more pending calls.

14. The method as in claim 13 further including the step of repeating all of the steps of claim 1 when there are more server programs to be called.

15. The method as in claim 1, where in step f thereof, said second program converting results of step e thereof from a format compatible with said first operating system to a format compatible with said second operating system.

16. In a heterogeneous computer system having at least two CPU's and a common memory completely accessible by at least one of said CPUs and being disposed for storing at least two different operating systems that actively run simultaneously and concurrently control resources of said heterogeneous computer system, a method for performing external procedure calls from a first program stored in said common memory and being executed by a first one of said CPU's under control of a first one of said two operating systems to a second program stored in said common memory and being executed by a second one of said CPU's under control of a second one of said two operating systems, said method comprising the steps of:

a. said first program fetching from said common memory a protocol procedure and passing to said second operating system an identification of said second program;

b. said second operating system attempting to initiate said second program identified in the preceding step and if successful indicating the same to said first program;

c. said second program fetching from said common memory a proxy procedure for calling a specific function in said first program;

d. said second program storing parameters, if any, in a second program stack having a portion thereof within said common memory for disposal to said first program;

e. said proxy procedure fetching from said common memory a protocol procedure for invoking said first program to perform a specific function;

f. said protocol procedure fetching from said common memory a specific stub procedure in said first program for performing said specific function;

g. said stub procedure fetching said parameters directly from said second program stack and converting said parameters, if any, from a format compatible with said second operating system to a format compatible with said first operating system;

h. placing said converted parameters in an activation record for said specific function in a first program stack having a portion thereof within said common memory;

i. said first program performing said specific function and storing the results, if any, in said first program stack;

j. said stub procedure fetching from said first program stack said results of the preceding steps, if any, and converting them from a format compatible with said first operating system back to a format compatible with said second operating system;

k. said first program storing in said second program, stack said results; and, l. said second program fetching from said second program stack said results.

17. A method as in claim 16 wherein said step of attempting to initiate said second program is unsuccessful and indicating such result to said first program.

18. A method as in claim 16 wherein said first program continues with processing without accessing said second program.

19. A method as in claim 16 further including the step of said second program suspending operation while awaiting an indication that processing of said function has been completed.

20. A method as in claim 16 further including the step of repeating steps c through j for each occurrence that said second program makes a call to said first program to perform a function.

21. A method as in claim 16 and following step j thereof, further including the steps of said first operating system attempting to terminate said first program; determining if the preceding step was successful; and if so, said first program performing any required termination processing and returning an indication to said second operating system that termination was successful and said first program exiting operation.

22. A method as in claim 21 further including said second program resuming normal processing.

23. A method as in claim 22 wherein said second program terminates function calls to said first program.

24. A method as in claim 23 further including the step of determining if more first program calls are required by said second program, and if so, repeating all the steps of claim 16.

25. The method as in claim 16, where in step g thereof, said second program converting results of step f thereof from a format compatible with said second operating system back to a format compatible with said first operating system.

* * * * *